(12) United States Patent
Belmont et al.

(10) Patent No.: US 6,740,151 B2
(45) Date of Patent: *May 25, 2004

(54) REACTION OF CARBON BLACK WITH DIAZONIUM SALTS, RESULTANT CARBON BLACK PRODUCTS AND THEIR USES

(75) Inventors: James A. Belmont, Acton, MA (US); Robert M. Amici, Berlin, MA (US); Collin P. Galloway, Chelmsford, MA (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/139,264

(22) Filed: May 3, 2002

(65) Prior Publication Data

US 2003/0095914 A1 May 22, 2003

Related U.S. Application Data

(63) Continuation of application No. 09/257,237, filed on Feb. 25, 1999, now Pat. No. 6,494,946, which is a continuation of application No. 09/105,007, filed on Jun. 26, 1998, now Pat. No. 6,042,643, which is a continuation of application No. 08/572,525, filed on Dec. 14, 1995, now Pat. No. 5,851,280, which is a continuation-in-part of application No. 08/356,660, filed on Dec. 15, 1994, now abandoned.

(51) Int. Cl.$^7$ ............................. C09D 1/00; C09D 11/00
(52) U.S. Cl. .................. 106/31.6; 106/31.75; 106/472; 106/473; 106/476; 106/478; 106/499; 162/181.9; 423/449.2; 423/449.9; 524/496
(58) Field of Search ............................. 106/31.6, 31.75, 106/472, 473, 476, 478, 499; 162/181.9; 423/449.2, 449.9; 524/496

(56) References Cited

U.S. PATENT DOCUMENTS

| | | |
|---|---|---|
| 2,121,535 A | 6/1938 | Amon |
| 2,156,591 A | 5/1939 | Jacobson |
| 2,502,254 A | 3/1950 | Glassman |
| 2,514,236 A | 7/1950 | Glassman |
| 2,625,492 A | 1/1953 | Young |
| 2,793,100 A | 5/1957 | Weihe |
| 2,833,736 A | 5/1958 | Glaser |
| 2,867,540 A | 1/1959 | Harris |
| 3,011,902 A | 12/1961 | Jordan |
| 3,025,259 A | 3/1962 | Watson et al. |
| 3,043,708 A | 7/1962 | Watson et al. |
| 3,335,020 A | 8/1967 | Aboytes et al. |
| T860,001 I4 | 3/1969 | Gessler et al. |
| 3,479,300 A | 11/1969 | Rivin et al. |
| 3,528,840 A | 9/1970 | Aboytes |
| 3,607,813 A | 9/1971 | Purcell |
| 3,674,670 A | 7/1972 | Erikson et al. |
| 3,686,111 A | 8/1972 | Makhlouf et al. |
| 3,846,141 A | 11/1974 | Ostergren et al. |
| 3,876,603 A | 4/1975 | Makhlouf et al. |
| 4,003,751 A | 1/1977 | Carder |
| 4,006,031 A | 2/1977 | Ferch et al. |
| 4,014,833 A | 3/1977 | Story |
| 4,014,844 A | 3/1977 | Vidal et al. |
| 4,061,830 A | 12/1977 | Greenberg |
| 4,176,361 A | 11/1979 | Kawada et al. |
| 4,204,871 A | 5/1980 | Johnson et al. |
| 4,204,876 A | 5/1980 | Bowden |
| 4,290,072 A | 9/1981 | Manusukhani |
| 4,293,394 A | 10/1981 | Darlington et al. |
| 4,308,061 A | 12/1981 | Iwahashi et al. |
| 4,328,041 A | 5/1982 | Wilson |
| 4,442,256 A | 4/1984 | Miller |
| 4,451,597 A | 5/1984 | Victorius |
| 4,476,270 A | 10/1984 | Brasen et al. |
| 4,478,905 A | 10/1984 | Neely, Jr. |
| 4,503,174 A | 3/1985 | Vasta |
| 4,503,175 A | 3/1985 | Houze et al. |
| 4,525,521 A | 6/1985 | DewHariog |
| 4,525,570 A | 6/1985 | Blum et al. |
| 4,530,961 A | 7/1985 | Nguyen et al. |
| 4,544,687 A | 10/1985 | Schupp et al. |
| 4,555,535 A | 11/1985 | Bednarek et al. |
| 4,556,427 A | 12/1985 | Lewis |
| 4,597,794 A | 7/1986 | Ohta et al. |
| 4,605,596 A | 8/1986 | Fry |
| 4,620,993 A | 11/1986 | Suss et al. |
| 4,620,994 A | 11/1986 | Suss et al. |
| 4,650,718 A | 3/1987 | Simpson et al. |
| 4,659,770 A | 4/1987 | Vasta |
| 4,665,128 A | 5/1987 | Cluff et al. |
| 4,680,204 A | 7/1987 | Das et al. |
| 4,681,811 A | 7/1987 | Simpson et al. |
| 4,692,481 A | 9/1987 | Kelly |
| 4,710,543 A | 12/1987 | Chattha et al. |
| 4,713,427 A | 12/1987 | Chattha et al. |

(List continued on next page.)

FOREIGN PATENT DOCUMENTS

| | | |
|---|---|---|
| DE | 2426266 A | 12/1975 |
| DE | 3170748 | 7/1985 |

(List continued on next page.)

OTHER PUBLICATIONS

Belmont et al., U.S. patent application Ser. No. 08/356,664, filed Dec. 15, 1994.

(List continued on next page.)

Primary Examiner—Peter D. Mulcahy

(57) ABSTRACT

Processes for preparing a carbon black product having an organic group attached to the carbon black. In one process at least one diazonium salt reacts with a carbon black in the absence of an externally applied electric current sufficient to reduce the diazonium salt. In another process at least one diazonium salt reacts with a carbon black in a protic reaction medium. Carbon black products which may be prepared according to process of the invention are described as well as uses of such carbon black products in plastic compositions, rubber compositions, paper compositions, and textile compositions.

45 Claims, No Drawings

U.S. PATENT DOCUMENTS

| | | |
|---|---|---|
| 4,719,132 A | 1/1988 | Porter, Jr. |
| 4,727,100 A | 2/1988 | Vasta |
| 4,741,780 A | 5/1988 | Atkinson |
| 4,752,532 A | 6/1988 | Starka |
| 4,764,430 A | 8/1988 | Blackburn et al. |
| 4,770,706 A | 9/1988 | Pietsch |
| 4,789,400 A | 12/1988 | Sciodar et al. |
| 4,798,745 A | 1/1989 | Martz et al. |
| 4,798,746 A | 1/1989 | Claar et al. |
| 4,808,656 A | 2/1989 | Kania et al. |
| 4,820,751 A | 4/1989 | Takeshita et al. |
| 4,840,674 A | 6/1989 | Schwarz |
| 4,853,037 A | 8/1989 | Johnson et al. |
| 4,883,838 A | 11/1989 | Jung et al. |
| 4,908,397 A | 3/1990 | Barsotti et al. |
| 4,914,148 A | 4/1990 | Hille et al. |
| 4,927,868 A | 5/1990 | Schimmel et al. |
| 4,975,474 A | 12/1990 | Barsotti et al. |
| 4,994,520 A | 2/1991 | Mori et al. |
| 5,008,335 A | 4/1991 | Pettit, Jr. |
| 5,017,435 A | 5/1991 | Barsotti et al. |
| 5,026,755 A | 6/1991 | Kveglis et al. |
| 5,051,464 A | 9/1991 | Johnson |
| 5,064,719 A | 11/1991 | Den Hartog et al. |
| 5,066,733 A | 11/1991 | Martz et al. |
| 5,076,843 A | 12/1991 | Acitelli et al. |
| 5,093,391 A | 3/1992 | Barsotti et al. |
| 5,093,407 A | 3/1992 | Komai et al. |
| 5,100,470 A | 3/1992 | Hindagolla et al. |
| 5,106,417 A | 4/1992 | Hauser et al. |
| 5,109,055 A | 4/1992 | Nagasaki et al. |
| 5,114,477 A | 5/1992 | Mort et al. |
| 5,122,552 A | 6/1992 | Johnson |
| 5,130,004 A | 7/1992 | Johnson et al. |
| 5,130,363 A | 7/1992 | Scholl et al. |
| 5,141,556 A | 8/1992 | Matrick |
| 5,152,801 A | 10/1992 | Altermatt et al. |
| 5,159,009 A | 10/1992 | Wolff et al. |
| 5,168,106 A | 12/1992 | Babcock et al. |
| 5,173,111 A | 12/1992 | Krishnan et al. |
| 5,179,191 A | 1/1993 | Jung et al. |
| 5,182,355 A | 1/1993 | Martz et al. |
| 5,184,148 A | 2/1993 | Suga et al. |
| 5,190,582 A | 3/1993 | Shinozuka et al. |
| 5,200,164 A | 4/1993 | Medalia et al. |
| 5,204,404 A | 4/1993 | Werner, Jr. et al. |
| 5,206,295 A | 4/1993 | Harper et al. |
| 5,221,581 A | 6/1993 | Palmer et al. |
| 5,229,452 A | 7/1993 | Green et al. |
| 5,232,974 A | 8/1993 | Branan, Jr. et al. |
| 5,236,992 A | 8/1993 | Bush |
| 5,242,751 A | 9/1993 | Hartman |
| 5,266,361 A | 11/1993 | Schwarte et al. |
| 5,266,406 A | 11/1993 | Den Hartog et al. |
| 5,276,097 A | 1/1994 | Hoffmann et al. |
| 5,281,261 A | 1/1994 | Lin |
| 5,286,286 A | 2/1994 | Winnik et al. |
| 5,288,788 A | 2/1994 | Shieh et al. |
| 5,290,848 A | 3/1994 | Palmer et al. |
| 5,302,197 A | 4/1994 | Wickramanayke et al. |
| 5,310,778 A | 5/1994 | Shor et al. |
| 5,314,945 A | 5/1994 | Nickle et al. |
| 5,314,953 A | 5/1994 | Corcoran et al. |
| 5,319,044 A | 6/1994 | Jung et al. |
| 5,320,738 A | 6/1994 | Kaufman |
| 5,324,790 A | 6/1994 | Manring |
| 5,334,650 A | 8/1994 | Serdiuk et al. |
| 5,336,716 A | 8/1994 | Kappes et al. |
| 5,336,753 A | 8/1994 | Jung et al. |
| 5,352,289 A | 10/1994 | Weaver et al. |
| 5,356,973 A | 10/1994 | Taljan et al. |
| 5,366,828 A | 11/1994 | Struthers |
| 5,401,313 A | 3/1995 | Supplee et al. |
| 5,554,739 A | 9/1996 | Belmont ...................... 534/885 |
| 5,559,169 A | 9/1996 | Belmont et al. ............. 523/215 |
| 5,571,311 A | 11/1996 | Belmont et al. .......... 108/20 R |
| 5,575,845 A | 11/1996 | Belmont et al. ............... 108/71 |

FOREIGN PATENT DOCUMENTS

| | | | |
|---|---|---|---|
| EP | 0006190 | 1/1980 | |
| EP | 272127 | 6/1988 | |
| EP | 433239 | 6/1991 | |
| EP | 0 441 987 | 8/1991 | |
| EP | 420152 | 2/1994 | |
| EP | 636591 | 2/1995 | |
| FR | 1164786 | 10/1958 | |
| FR | E 72775 | 4/1960 | |
| FR | 1204131 | 4/1960 | |
| FR | 1215895 | 4/1960 | |
| FR | 1331889 A | 7/1963 | |
| FR | 2477593 | 11/1981 | |
| FR | 2564489 | 5/1987 | |
| FR | 2607529 | 6/1988 | |
| GB | 862018 | 3/1961 | |
| GB | 1191872 | 5/1970 | |
| JP | 59/80467 | 5/1984 | |
| JP | 59122555 | 7/1984 | ............. C09C/1/56 |
| JP | 60115665 | 6/1985 | ............. C09C/1/56 |
| JP | 01/275666 | 11/1989 | |
| JP | 05/271365 | 1/1993 | |
| JP | 5339516 | 12/1993 | |
| JP | 06/025572 | 2/1994 | |
| JP | 6025572 | 2/1994 | |
| JP | 6067421 | 3/1994 | |
| JP | 6073235 | 3/1994 | |
| WO | WO 91/15425 | 10/1991 | |
| WO | WO 92/13983 | 8/1992 | |

OTHER PUBLICATIONS

Belmont et al., U.S. patent application Ser. No. 08/356,462, filed Dec. 15, 1994.

Belmont et al.. U.S. patent application Ser. No. 08/356,459, filed Dec. 15, 1994.

Belmont et al., U.S. patent application Ser. No. 08/356,460, filed Dec. 15, 1994.

Belmont, U.S. patent application Ser. No. 08/356,653, filed Dec. 15, 1994.

Belmont et al., U.S. patent application Ser. No. 08/572,542, filed Dec. 14, 1995.

Belmont et al., U.S. patent application Ser. No. 08/572,336, filed Dec. 14, 1995.

Belmont et al., U.S. patent application Ser. No. 08/573,545, filed Dec. 14, 1995.

S. Wolff et al., "The Influence of Modified carbon Blacks on Viscoelastic Compound Properties" Kautschuk & Gummi, Kunststoffe 44, Jahrgang, Nr. 10/91, pp. 941–947.

C. Bourdillon, "Immobilization of glucose oxidase on a carbon surface derivatized by electrochemical reduction of diazonium salts" J. Electroanal. Chem., 336 (1992) 113–123.

S. E. Moschopedis et al., "The Reaction of Diazonium Salts with Humic Acids and Coals: Evidence for Activated Methylene Bridges in Coals and Humic Acids" Fuel 43(4) at pp. 299–298 (1964).

Ullmann's Encyclopedia of Industrial Chemistry, Vol. A8, pp. 508–509.

J. B. Donnet et al., "Chimie Superficielle Et Sites Priviléciés Des Charres Fines" Conference presentes aux Journees du Cacutahoue, Conference Internationale des Arts Chimiques, 22–23, pp. 5–12, (Jun. 1969).

V. A. Garten et al., "Nature of Chemisorptive Mechanisms In Rubber Reinforcement", Commonwealth Scientific and Industrial Research Organ., Div. Of Industrial Chem., Melbourne, Australia, pp. 596–609.

J.W. Watson, "Chemical Abstracts of Reinforcement", Compounding Research Dept., Dunlop Research Center, Dunlop Rubber Co., pp. 987–999.

K. Ohkita, et al., "The Reaction Of Carbon Black Surface With 2,2–Diphenyl–1–picrylhydrazyl", CAR. Vol. 10, No. 5, (1972) pp. 631–636.

M.L. Studebaker et al., "Oxygen–Containing Groups On The Surface Of Carbon Black", Industrial and Eng. and Chem., Vol. 48, No. 1, pp. 162–166.

T. Yamaguchi et al., "Novel Carbon Black/Rubber Coupling Agent", Kautschuk and Gummi, Kunststoffe 42, Jahrgang Nr. 5/89, pp. 403–409.

J.B. Donnett et al., "Aroxylic Structure Of The Quinone Groups And Of The Free Radicals Present On Carbo Black Surfaces", Rev. Gen. Cacutchous Plasticques, Vol. 42, No. 3, (1965), pp. 389–392. (w/Abstract).

J.B. Donnett et al., "Radical Reactions And Surface Chemistry of Carbon Black", Bull. Soc. Chim. (1960) (Abstract only).

RAPRA Abstract 432845: Compounding Heat Resistant Non–Black EPDM Rubber, PPG Industries.

RAPRA Abstract 41762, D. C. Edwards, "Review: Polymer–Filler Interactions In Rubber Reinforcement", J. Mat. Sci., Vol. 25, No. 10, (1990) pp. 4175–4185.

Gregory, Peter, "Ink Jet Printing", High–Technology Applications of Organic Colorants, Chapter 9, (1991).

RAPRA Abstract 403202, D. Siller, "Organotitanate, Zirconate Effect on Elastomers", Rubb. Plast. News, Vol. 19, No. 24, (1990), pp. 14–27.

RAPRA Abstract 390600, H. Okamoto, "Application of Coupling Agents To Elastomers", Nippon Gomu Kyckaishi, Vol. 62, No. 12, (1989) pp. 819–833.

RAPRA Abstract 394030, P. Flink et al., "Mechanical Properties Of Natural Rubber/Grafted Cellulose Fibre Composites", Brit. Polym. J., Vol. 22, No. 2, 1990,. pp. 147–153.

Tsubokawa et al., "Grafting Onvc Carbon Black Having Few Funtional Group" Shikizai Kyokaisha, Vol. 66, No. 5, (1993) (Abstract only).

R.H. Leach et al., "The Printing Processes", The Printing Ink Manual, Chapter 2, Fourth Edition.

R.H. Leach et al., "Gravure Inks", The Printing Ink Manual, Chapters 8–10, Fifth Edition (1988).

N. Tsubokawa, "Functionalizatoin Of Carbon Black By Surface Grafting Of Polymers", Dept. Of Material and Chemical Eng., pp. 417–420.

Ink Jet Printing; 1994 Overview and Outlook Supplied, Chapter 7, Andreatola, Ink Jet Ink Technology, pp. 533–534.

Major Michael J., "Formulating The Future of Automotive Coatings", Modern Paint and Coatings, pp. 34–36, (1991).

Greenfield, David, "Fewer Formulation Options Lead to Emphasis on Familiar", Modern Paint and Coatings, pp. 40–42, (1992).

Schrantz, Joe, "Automotive Coatings", Modern Paint and Coatings pp. 22–31, (1994).

"Regulations Focus Formulator Attention on Additives", Modern Paint and Coatings, pp. 32–36, (1994).

Sherrer, Robert, "Coloration Of Ink Jet Inks", BLS Ink Jet Printing Conference, Oct. 10–12, (1994), Monterey CA.

Allen, Ross, "Thermal Ink Jet Printing Trends and Advances", BLS Ink Jet Printing Conference, Oct. 10–12, (1994), Monterey, CA.

Schneider, John, "Continuous Ink Jet", BLS Ink Jet Printing Conference Oct. 10–12 (1994) Monterey, CA.

Abstract 388935, R. Mushack, "Light–Colored Fillers In Polymers", Gummi Fas. Kinst., Vol. 42, No. 11, (1989), pp. 584–592.

Abstract 301034, J.Y. Germain et al., "Carbon Black Is Better With Silica" Rubb. World, Vol. 193, No. 1, (1985), pp. 51–54.

Abstract 343229, "White And Black Fillers For Rubber Compounds", Ind.d. Gomma, Vol. 30, No. 12, (1986) pp. 23–54.

Abstract 177481, L. Corbelli, "Ethylene–Propylene Rubbers", London Applied Science Publishers Ltd., (1981) Chapter 4, pp. 87–129.

Abstract 105633, G. Sucerman et al., "Putting Performance Into Thermosets With Titanium Coupling Agents", Cleveland, Ohio, (1976), pp. 106–113.

Abstract 056893, M.W. Ranney et al., "Applications For Silane Coupling Agents In The Automotive Industry", Kaut. U. Gummi Kunst., Vol. 28, No. 10, (1975), pp. 597–608.

Abstract 002608, H.E. Haxe et al., "Ground Rice Hull Ash As A Filler For Rubber", Philadelphia, Paper No. 8, (1974), pp. 41, Preprint .012.

Abstract 000937, G.M. Cameron et al., "Reduction Of Hear Build–Up In Mineral–Filled Elastomers Through The Use Of Silane Coupling Agents", Gothenburg, (44) (1973) Ser. Sec. 013.

Abstract 36056110, "Putting Performance Into Thermosets With Titanium Coupling Agents", G. Sugerman et al., High Performance Plast. National Tech. Conference, Soc. Plast. Eng.

J. Am. Chem. Soc. 1992, 114, 5883–5884.

H. Zoeheidi et al., "Role Of Oxygen Surface Groups In Catalysts Of Hydrogasification of Carbon Black By Potassium Carbonate," Carbon Vol. 25, No. 6, (1987), pp. 809–819.

J.D. Robert et al., "Basic Principles Of Organic Chemistry," p. 1080.

Derwent Publications Ltd., Database WPI Week 8002, AN 80–0330C; SU.A.,659 523, Apr. 1979, Abstract.

Derwent Publications Ltd., Database WPI Week 9423, AN 94–189154; JP 61–28517A, May 1994, Abstract.

Derwent Publications Ltd., Database WPI Week 9524, AN 95–183086; JP,A.07 102 116, Apr. 1995, Abstract.

Patent Abstracts of Japan, Vol. 95, No. 4, JP,A,07 102116, Apr. 1995, Abstract.

Derwent Publications Ltd., Database WPI Week 8651, AN 86–335147; JP 61–250 042, Nov. 1986, Abstract.

PCT International Search Report, Application No. PCT/US 95/16195 Mailing Date: Apr. 19, 1996.

PCT International Search Report, Application No. PCT/US 95/16452, Mailing Date: Apr. 17, 1996.

PCT International Search Report, Application No. PCT/US 95/01154, Mailing Date: Apr. 29, 1996.

PCT International Search Report, Application No. PCT/US 95/16291, Mailing Date: Apr. 26, 1996.

Derwent Abstract No. 82–28019E, Oct. 17, 1979; SU,A,834 062.

S. Wolf, et al., "The Influence of Modified Carbon Blacks on Viscoelastic Compound Properties," presented at the ikt/irc '91, Essen (Feg. Rep. Of Germany, Jun. 24–27, 1991 (7 pp.).

EPO Opposition Notice dated May 7, 2003.

English Translation of Notice of Opposition dated Apr. 24, 2003.

N. L. Allinger et al., "Organische Chemie", 1980, p. 292.

N. Tsubokawa "Functionalization of Carbon Black by Surface Grafting of Polymers", Prog. Polym. Sci., vol. 17, pp. 417–470, 1992.

N. Tsubokawa et al., "Grafting onto Carbon Black by the Reaction of Reactive Carbon Black Having Epoxide Groups with Several Polymers", Journal of Polymer Science: Part A: Polymer Chemistry, vol. 27, pp. 1701–1712, 1980.

REACTION OF CARBON BLACK WITH DIAZONIUM SALTS, RESULTANT CARBON BLACK PRODUCTS AND THEIR USES

This application is a continuation of U.S. patent application Ser. No. 09/257,237 filed Feb. 25, 1999, now U.S. Pat. No. 6,494,946, which is a continuation of U.S. patent application Ser. No. 09/105,007, filed Jun. 26, 1998, now U.S. Pat. No. 6,042,643, which is a continuation of prior U.S. patent application Ser. No. 08/572,525 filed Dec. 14, 1995, now U.S. Pat. No. 5,851,280, which is a continuation-in-part of U.S. patent application Ser. No. 08/356,660, filed Dec. 15, 1994, now abandoned, and are incorporated in their entirety by reference herein.

FIELD OF THE INVENTION

This invention relates to a process for the preparation of carbon black products. The process involves reacting a diazonium salt with a carbon black to yield a carbon black product having an organic group attached to the carbon black. The invention also relates to new carbon black products and their uses.

BACKGROUND OF THE INVENTION

Much effort has been expended over the last several decades to modify the surface chemistry of carbon black. While it is possible to deposit physically adsorbed material onto the surface of carbon black, permanently changing the surface chemistry of carbon black is substantially more difficult.

Some processes for chemically changing the surface of carbon black are known and used commercially. For example, it is well known that a carbon black surface can be oxidized with a variety of treating agents. Surface oxidation is used to make some commercial products. Sulfonation using sulfuric acid or chlorosulfuric acid and halogenation of a carbon black surface are also known. Some known methods for grafting polymers to the carbon black surface are reviewed by Tsubakowa in Polym. Sci., Vol. 17, pp 417–470, 1992. See also U.S. Pat. No. 4,014,844 which grafts polymers onto carbon black by contacting the carbon black with the polymer and heating.

U.S. Pat. No. 3,479,300 describes carbon catalyst compositions and a process for their production. The catalyst compositions are prepared by treating carbon particles with an alkali or alkaline earth metal and subsequently treating the resulting carbon/metal composition with a solvating ether. The carbon portions of the catalytic compositions can be reacted with various reagents, including organic compounds, to produce carbon compositions.

U.S. Pat. No. 3,043,708 describes modified carbon blacks having hydrocarbon groups chemically attached to the surface of the carbon black. The modified carbon blacks are prepared by reacting carbon black with an alkylating agent in the presence of a Friedel-Crafts type reaction catalyst. The hydrocarbon groups which reportedly can attach to the surface of the carbon black include aliphatic and aromatic groups. A modified carbon black containing aryl groups attached to the surface of a carbon black is reported as being preparable by reacting a halogenated carbon black with an aromatic hydrocarbon in the presence of a Friedel-Crafts type catalyst. U.S. Pat. No. 3,025,259 describes rubber compositions containing the modified carbon blacks of U.S. Pat. No. 3,043,708.

U.S. Pat. No. 3,335,020 describes modified carbon blacks where the carbon black is treated with benzene which is then polymerized on the carbon black. To prepare these modified carbon blacks, benzene and carbon black are mixed with a Lewis Acid catalyst under anhydrous conditions for about ten minutes. The benzene on the carbon black is then polymerized to parapolyphenyl by means of a combination co-catalyst-oxidizing agent and is reportedly thereby bonded to the carbon black.

U.S. Pat. Nos. 2,502,254 and 2,514,236 describe the manufacture of pigments containing carbon black. U.S. Pat. No. 2,502,254 reports that highly dispersed pigments suitable for mass pigmentation of viscose can be obtained by generating an azo pigment in the presence of carbon black. The pigment is produced by coupling a diazotized amine and another usual intermediate for a yellow, orange, or red pigment in the presence of carbon black in one or the other of the aqueous solutions of which the mixing brings about the coupling. U.S. Pat. No. 2,514,236 reports that this process can also prepare a chocolate brown pigment by coupling one molecular proportion of a tetrazotized benzidine with two molecular proportions of an arylmethyl pyrazolone in the presence of carbon black.

PCT Patent Application No. WO 92/13983 describes a process for modifying the surfaces of carbon-containing materials by electrochemical reduction of diazonium salts. The process is reportedly applicable, in particular, to carbon plates and carbon fibers for composite materials. Carbon-containing materials modified by the process are also described. Electrochemical reduction of diazonium salts containing functionalized aryl radicals to covalently modify carbon surfaces is also described in Delmar et al., J. Am. Chem. Soc. 1992, 114, 5883–5884.

According to WO 92/13983, the process for modifying the surface of a carbon-containing material consists of grafting an aromatic group to the surface of this material by electrochemical reduction of a diazonium salt including this aromatic group. The carbon-containing material is placed in contact with a diazonium salt solution in an aprotic solvent and is negatively charged with respect to an anode which is also in contact with the diazonium salt solution. Use of a protic solvent is reported to prevent the electrochemical process from producing the intended product as a result of reducing the diazonium triple bond to yield a hydrazine.

Despite the technology discussed above, there remains a need to modify the surface chemistry of carbon black and impart desired properties to the carbon black.

SUMMARY OF THE INVENTION

Accordingly, the present invention relates to processes for preparing a carbon black product having an organic group attached to the carbon black. One process comprises the step of reacting at least one diazonium salt with a carbon black in the absence of an externally applied electric current sufficient to reduce the diazonium salt. Another process comprises the step of reacting at least one diazonium salt with a carbon black in a protic reaction medium.

Other embodiments of the invention relate to novel carbon black products, which may be prepared according to a process of the invention. The carbon black products may be used in the same applications as conventional carbon blacks. Such uses include, but are not limited to, plastic compositions, aqueous inks, aqueous coatings, rubber compositions, paper compositions, and textile compositions.

The description which follows sets out additional features and advantages of the invention. These functions will be apparent from that description or may be learned by practice of the invention as described. The objectives and other advantages will be realized and attained by the processes, products, and compositions particularly pointed out in the description below and the appended claims.

DETAILED DESCRIPTION

Processes for Preparing a Carbon Black Product

A first embodiment of the invention provides processes for preparing a carbon black product having an organic group attached to the carbon black. One process involves the reaction of at least one diazonium salt with a carbon black in the absence of an externally applied current sufficient to reduce the diazonium salt. That is, the reaction between the diazonium salt and the carbon black proceeds without an external source of electrons sufficient to reduce the diazonium salt. Mixtures of different diazonium salts may be used in the process of the invention. This process can be carried out under a variety of reaction conditions and in any type of reaction medium, including both protic and aprotic solvent systems or slurries.

In another process, at least one diazonium salt reacts with a carbon black in a protic reaction medium. Mixtures of different diazonium salts may be used in this process of the invention. This process can also be carried out under a variety of reaction conditions.

Preferably, in both processes, the diazonium salt is formed in situ. If desired, in either process, the carbon black product can be isolated and dried by means known in the art. Furthermore, the resultant carbon black product can be treated to remove impurities by known techniques. The various preferred embodiments of these processes are discussed below and are shown in the examples.

Any carbon black may be used in the processes of this invention. The resulting carbon black products are useful in applications known for conventional carbon blacks. The properties of the carbon blacks are selected based upon the intended application. More importantly, the processes of this invention can be used to provide carbon black products having advantageous properties not associated with conventional carbon blacks.

The processes of the invention can be carried out under a wide variety of conditions and in general are not limited by any particular condition. The reaction conditions must be such that the particular diazonium salt is sufficiently stable to allow it to react with the carbon black. Thus, the processes can be carried out under reaction conditions where the diazonium salt is short lived. As the examples below illustrate, the reaction between the diazonium salt and the carbon black occurs, for example, over a wide range of pH and temperature. The processes can be carried out at acidic, neutral, and basic pH. Preferably, the pH ranges from about 1 to 9. The reaction temperature may preferably range from 0° C. to 100° C.

Diazonium salts, as known in the art, may be formed for example by the reaction of primary amines with aqueous solutions of nitrous acid. A general discussion of diazonium salts and methods for their preparation is found in Morrison and Boyd, *Organic Chemistry*, 5th Ed., pp. 973–983, (Allyn and Bacon, Inc. 1987) and March, *Advanced Organic Chemistry: Reaction, Mechanisms, and Structures*, 4th Ed., (Wiley, 1992). According to this invention, a diazonium salt is an organic compound having one or more diazonium groups.

In the processes of the invention, the diazonium salt may be prepared prior to reaction with the carbon black or, more preferably, generated in situ using techniques known in the art. In situ generation also allows the use of unstable diazonium salts such as alkyl diazonium salts and avoids unnecessary handling or manipulation of the diazonium salt. In particularly preferred processes of this invention, both the nitrous acid and the diazonium salt are generated in situ. Each of these variations is shown in the examples below.

A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as for example isoamylnitrite or ethylnitrite. The acid may be any acid, inorganic or organic, which is effective in the generation of the diazonium salt. Preferred acids include nitric acid, $HNO_3$, hydrochloric acid, HCl, and sulfuric acid, $H_2SO_4$.

The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt.

Generating the diazonium salt in the presence of excess HCl may be less preferred than other alternatives because HCl is corrosive to stainless steel. Generation of the diazonium salt with $NO_2/H_2O$ has the additional advantage of being less corrosive to stainless steel or other metals commonly used for reaction vessels. Generation using $H_2SO_4$/$NaNO_2$ or $HNO_3/NaNO_2$ are also relatively non-corrosive.

In general, generating a diazonium salt from a primary amine, a nitrite, and an acid requires two equivalents of acid based on the amount of amine used. In an in situ process, the diazonium salt can be generated using one equivalent of the acid. When the primary amine contains a strong acid group, adding a separate acid may not be necessary in the processes of the invention. The acid group or groups of the primary amine can supply one or both of the needed equivalents of acid. When the primary amine contains a strong acid group, preferably either no additional acid or up to one equivalent of additional acid is added to a process of the invention to generate the diazonium salt in situ. A slight excess of additional acid may be used. One example of such a primary amine is para-aminobenzenesulfonic acid (sulfanilic acid). Others are shown in the examples below.

In general, diazonium salts are thermally unstable. They are typically prepared in solution at low temperatures, such as 0–5° C., and used without isolation of the salt. Heating solutions of some diazonium salts may liberate nitrogen and form either the corresponding alcohols in acidic media or the organic free radicals in basic media.

However, to accomplish the process of the invention, the diazonium salt need only be sufficiently stable to allow reaction with the carbon black. Thus, the processes of the present invention can be carried out with some diazonium salts otherwise considered to be unstable and subject to decomposition. Some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

The processes of the invention can be accomplished by adding the reagents to form the diazonium salt in situ, to a suspension of carbon black in the reaction medium, for example, water. Thus, a carbon black suspension to be used may already contain one or more reagents to generate the diazonium salt and the process of the invention accomplished by adding the remaining reagents. Some permutations of such processes are shown in the examples below.

Reactions to form a diazonium salt are compatible with a large variety of functional groups commonly found on organic compounds. Thus, only the availability of a diazonium salt for reaction with a carbon black limits the processes of the invention.

The processes of this invention can be carried out in any reaction medium which allows the reaction between the diazonium salt and the carbon black to proceed. Preferably, the reaction medium is a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF), acetonitrile, and benzonitrile. For a discussion of protic and aprotic solvents see Morrison and Boyd, *Organic Chemistry*, 5th Ed., pp. 228–231, (Allyn and Bacon, Inc. 1987).

The processes of this invention are preferably carried out in a protic reaction medium, that is, in a protic solvent alone or a mixture of solvents which contains at least one protic solvent. Preferred protic media include, but are not limited to water, aqueous media containing water and other solvents, alcohols, and any media containing an alcohol, or mixtures of such media.

According to the processes of the invention, the reaction between a diazonium salt and a carbon black can take place with any type of carbon black, for example, in fluffy or pelleted form. In one embodiment designed to reduce production costs, the reaction occurs during a process for forming carbon black pellets. For example, a carbon black product of the invention can be prepared in a dry drum by spraying a solution or slurry of a diazonium salt onto a carbon black. Alternatively, the carbon black product can be prepared by pelletizing a carbon black in the presence of a solvent system, such as water, containing the diazonium salt or the reagents to generate the diazonium salt in situ. Aqueous solvent systems are preferred. Accordingly, another embodiment of the invention provides a process for forming a pelletized carbon black comprising the steps of: introducing a carbon black and an aqueous slurry or solution of a diazonium salt into a pelletizer, reacting the diazonium salt with the carbon black to attach an organic group to the carbon black, and pelletizing the resulting carbon black having an attached organic group. The pelletized carbon black product may then be dried using conventional techniques.

In general, the processes of the invention produce inorganic by-products, such as salts. In some end uses, such as those discussed below, these by-products may be undesirable. Several possible ways to produce a carbon black product according to a process of the invention without unwanted inorganic by-products or salts are as follows:

First, the diazonium salt can be purified before use by removing the unwanted inorganic by-product using means known in the art. Second, the diazonium salt can be generated with the use of an organic nitrite as the diazotization agent yielding the corresponding alcohol rather than an inorganic salt. Third, when the diazonium salt is generated from an amine having an acid group and aqueous $NO_2$, no inorganic salts are formed. Other ways may be known to those of skill in the art.

In addition to the inorganic by-products, a process of the invention may also produce organic by-products. They can be removed, for example, by extraction with organic solvents. Other ways may be known to those of skill in the art.

Carbon Black Products

The reaction between a diazonium salt and a carbon black according to a process of this invention forms a carbon black product having an organic group attached to the carbon black. The diazonium salt may contain the organic group to be attached to the carbon black. Thus, the present invention relates to carbon black products having an organic group attached to the carbon black, particularly those prepared by a process of this invention. It may be possible to produce the carbon black products of this invention by other means known to those skilled in the art.

The organic group may be an aliphatic group, a cyclic organic group, or an organic compound having an aliphatic portion and a cyclic portion. As discussed above, the diazonium salt employed in the processes of the invention can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, indolyl, and the like). As the steric hinderance of a substituted organic group increases, the number of organic groups attached to the carbon black from the reaction between the diazonium salt and the carbon black may be diminished.

When the organic group is substituted, it may contain any functional group compatible with the formation of a diazonium salt. Preferred functional groups include, but are not limited to, R, OR, COR, COOR, OCOR, carboxylate salts such as COOLi, COONa, COOK, COO$^-$NR$_4^+$, halogen, CN, NR$_2$, SO$_3$H, sulfonate salts such as SO$_3$Li, SO$_3$Na, SO$_3$K, SO$_3^-$NR$_4^+$, OSO$_3$H, OSO$_3^-$ salts, NR(COR), CONR$_2$, NO$_2$, PO$_3$H$_2$, phosphonate salts such as PO$_3$HNa and PO$_3$Na$_2$, phosphate salts such as OPO$_3$HNa and OPO$_3$Na$_2$, N=NR, NR$_3^+$X$^-$, PR$_3^+$X$^-$, S$_k$R, SSO$_3$H, SSO$_3^-$ salts, SO$_2$NRR', SO$_2$SR, SNRR', SNQ, SO$_2$NQ, CO$_2$NQ, S-(1,4-piperazinediyl)-SR, 2-(1,3-dithianyl) 2-(1,3-dithiolanyl), SOR, and SO$_2$R. R and R', which can be the same or different, are independently hydrogen, branched or unbranched $C_1$–$C_{20}$ substituted or unsubstituted, saturated or unsaturated hydrocarbon, e.g., alkyl, alkenyl, alkynyl, substituted or unsubstituted aryl, substituted or unsubstituted heteroaryl, substituted or unsubstituted alkylaryl, or substituted or unsubstituted arylalkyl. The integer k ranges from 1–8 and preferably from 2–4. The anion X$^-$ is a halide or an anion derived from a mineral or organic acid. Q is (CH$_2$)$_w$, (CH$_2$)$_x$O(CH$_2$)$_z$, (CH$_2$)$_x$NR(CH$_2$)$_z$, or (CH$_2$)$_x$S(CH$_2$)$_z$, where w is an integer from and x and z are integers from 1 to 6.

The carbon black product can comprise a carbon black and at least one organic group having a) an aromatic group and b) a cationic group, wherein at least one aromatic group of the organic group is attached to the carbon black. The organic group can be, for example X⁻ R₃N⁺CH₂COAr, wherein R is a substituted or unsubstituted $C_1$–$C_{10}$ alkyl, Ar is phenylene or naphthylene, and X⁻ is a halide or an anion derived from a mineral or organic acid.

A preferred organic group is an aromatic group of the formula $A_yAr$—, which corresponds to a primary amine of the formula $A_yArNH_2$. In this formula, the variables have the following meanings: Ar is an aromatic radical such as an aryl or heteroaryl group. Preferably, Ar is selected from the group consisting of phenyl, naphthyl, anthracenyl, phenanthrenyl, biphenyl, pyridinyl, benzothiadiazolyl, and benzothiazolyl; A is a substituent on the aromatic radical independently selected from a preferred functional group described above or A is a linear, branched or cyclic hydrocarbon radical (preferably containing 1 to 20 carbon atoms), unsubstituted or substituted with one or more of those functional groups; and y is an integer from 1 to the total number of —CH radicals in the aromatic radical. For instance, y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl.

In the above formula, specific examples of R and R' are $NH_2$—$C_6H_4$—, $CH_2CH_2$—$C_6H_4$—$NH_2$, $CH_2$—$C_6H_4$—$NH_2$, and $C_6H_5$.

Another preferred set of organic groups which may be attached to the carbon black are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group of the organic group is directly attached to the carbon black. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Examples of these acidic groups and their salts are discussed above. Most preferably, the organic group is a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo) naphthyl group or a salt thereof. A preferred substituted sulfophenyl group is hydroxysulfophenyl group or a salt thereof.

Specific organic groups having an ionizable functional group forming an anion (and their corresponding primary amines for use in a process according to the invention) are p-sulfophenyl (p-sulfanilic acid), 4-hydroxy-3-sulfophenyl (2-hydroxy-5-amino-benzenesulfonic acid), and 2-sulfoethyl (2-aminoethanesulfonic acid). Other organic groups having ionizable functional groups forming anions are shown in the examples below.

Amines represent examples of ionizable functional groups that form cationic groups. For example, amines may be protonated to form ammonium groups in acidic media. Preferably, an organic group having an amine substituent has a pKb of less than 5. Quaternary ammonium groups (—$NR_3^+$) and quaternary phosphonium groups (—$PR_3^+$) also represent examples of cationic groups. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and even quaternized aromatic amines, can also be used as the organic group. Thus, N-substituted pyridinium compounds, such as N-methylpyridyl, can be used in this regard. Examples of organic groups include, but are not limited to, $(C_5H_4N)C_2H_5^+$, $C_6H_4(NC_5H_5)^+$, $C_6H_4COCH_2N(CH_3)_3^+$, $C_6H_4COCH_2(NC_5H_5)^+$, $(C_5H_4N)CH_3^+$, and $C_6H_4CH_2N(CH_3)_3^+$.

An advantage of the carbon black products having an attached organic group substituted with an ionic or an ionizable group is that the carbon black product may have increased water dispersibility relative to the corresponding untreated carbon black. As shown in the Examples, water dispersibility of a carbon black product increases with the number of organic groups attached to the carbon black having an ionizable group or the number of ionizable groups attached to a given organic group. Thus, increasing the number of ionizable groups associated with the carbon black product should increase its water dispersibility and permits control of the water dispersibility to a desired level. It can be noted that the water dispersibility of a carbon black product containing an amine as the organic group attached to the carbon black may be increased by acidifying the aqueous medium.

Because the water dispersibility of the carbon black products depends to some extent on charge stabilization, it is preferable that the ionic strength of the aqueous medium be less than 0.1 molar. More preferably, the ionic strength is less than 0.01 molar.

When such a water dispersible carbon black product is prepared by a process of the invention, it is preferred that the ionic or ionizable groups be ionized in the reaction medium. The resulting product solution or slurry may be used as is,or diluted prior to use. Alternatively, the carbon black product may be dried by techniques used for conventional carbon blacks. These techniques include, but are not limited to, drying in ovens and rotary kilns. Overdrying, however, may cause a loss in the degree of water dispersibility.

In addition to their water dispersibility, carbon black products having an organic group substituted with an ionic or an ionizable group may also be dispersible in polar organic solvents such as dimethylsulfoxide (DMSO), and formamide. In alcohols such as methanol or ethanol, use of complexing agents such as crown ethers increases the dispersibility of carbon black products having an organic group containing a metal salt of an acidic group.

Aromatic sulfides encompass another group of preferred organic groups. Carbon black products having aromatic sulfide groups are particularly useful in rubber compositions. These aromatic sulfides can be represented by the formulas $Ar(CH_2)_qS_K(CH_2)_rAr'$ or $A$—$(CH_2)_qS_K(CH_2)_rAr''$ wherein Ar and Ar' are independently substituted or unsubstituted arylene or heteroarylene groups, Ar'' is an aryl or heteroaryl group, k is 1 to 8 and q and r are 0–4. Substituted aryl groups would include substituted alkylaryl groups. Preferred arylene groups include phenylene groups, particularly p-phenylene groups, or benzothiazolylene groups. Preferred aryl groups include phenyl, naphthyl and benzothiazolyl. The number of sulfurs present, defined by k preferably ranges from 2 to 4. Particularly preferred aromatic sulfide groups are bis-para-$(C_6H_4)$—$S_2$—$(C_6H_4)$— and para-$(C_6H_4)$—$S_2$—$(C_6H_5)$. The diazonium salts of these aromatic sulfide groups may be conveniently prepared from their corresponding primary amines, $H_2N$—Ar—$S_k$—Ar'—$NH_2$ or $H_2N$—Ar—$S_k$—Ar".

Another preferred set of organic groups which may be attached to the carbon black are organic groups having an aminophenyl, such as $(C_6H_4)$—$NH_2$, $(C_6H_4)$—$CH_2$—$(C_6H_4)$—$NH_2$, $(C_6H_4)$—$SO_2$—$(C_6H_4)$—$NH_2$.

Uses of the Carbon Black Products

The carbon black products of this invention may be used in the same applications as conventional carbon blacks. The organic groups attached to the carbon black, however, can be used to modify and improve the properties of a given carbon black for a particular use. If desired these organic groups attached to the carbon black may also be chemically changed using means known in the art into other groups for a particular use. For example, an acid group can be converted to its salt or its amide.

Carbon black products according to the invention have been prepared and evaluated in a number of end use applications. These uses include, for example, plastic compositions, aqueous inks, aqueous coatings, rubber compositions, paper compositions and textile compositions. The following paragraphs describe these uses generally and examples of each are shown below.

The carbon black products of this invention may be used as pigments or colorants in a plastic material. The carbon black products of the invention can also be used to impart conductivity to a plastic material. The carbon black products of the invention may give an increased rate of dispersion or improved quality of dispersion over the corresponding untreated carbon blacks. These improvements offer an economic advantage in plastic manufacture and in value of the finished product, respectively. As shown in Examples 47–62, using carbon black products of the invention may improve impact strength of the plastic. Thus, the invention relates to an improved plastic composition comprising a plastic and a carbon black, the improvement comprising the use of a carbon black product according to the invention.

As with conventional carbon blacks, the carbon black products can be used with a variety of plastics, including but not limited to plastics made from thermoplastic resins, thermosetting resins, or engineered materials, for example, composites. Typical kinds of thermoplastic resins include: (1) acrylonitrile-butadiene-styrene (ABS) resins; (2) acetals; (3) acrylics; (4) cellulosics; (5) chlorinated polyethers; (6) fluorocarbons, such as polytetrafluoroethylene (TFE), polychlorotrifluoroethylene (CTFE), and fluorinated ethylene propylene (FEP); (7) nylons (polyamides); (8) polycarbonates; (9) polyethylenes (including copolymers); (10) polypropylenes (including copolymers); (11) polystyrenes; (12) vinyls (polyvinyl chloride); (13) thermoplastic polyesters, such as polyethylene terephthalate or polybutylene terephthalate; (14) polyphenylene ether alloys; and blends and alloys of the above with rubber modifiers. Typical thermosetting resins include: (1) alkyds; (2) allylics; (3) the aminos (melamine and urea); (4) epoxies; (5) phenolics; (6) polyesters; (7) silicones; and (8) urethanes.

Generally, the carbon black product is added like any other pigment to the plastic used to form a plastic premix. This can be done, for example, in a dry mix or a melt stage. The carbon black products of the invention may be used in combination with other conventional additives in plastic compositions. According to the invention, the term plastic composition includes, but is not limited to, any plastic material, article, goods, surface, fabric, sheet, and the like For example, plastic materials include automotive parts, siding for homes, liners for swimming pools, roofing materials, packaging materials, and any variety of other household or industrial items.

The carbon black products of this invention are also useful in aqueous ink formulations. The water-dispersible carbon black products discussed above are particularly preferred for this use. Thus, the invention provides an improved ink composition comprising water and a carbon black, the improvement comprising the use of a carbon black product according to the invention. Other known aqueous ink additives may be incorporated into the aqueous ink formulation.

In general, an ink consists of four basic components: (1) a colorant or pigment, (2) a vehicle or varnish which functions as a carrier during printing, (3) additives to improve printability drying, and the like, and (4) solvents to adjust viscosity, drying and the compatibility of the other ink components. For a general discussion on the properties, preparation and uses of aqueous inks, see The Printing Manual, 5th Ed., Leach et al, Eds. (Chapman and Hall, 1993). Various aqueous ink compositions are also disclosed, for example, in U.S. Pat. Nos. 2,833,736, 3,607,813, 4,104,833, 4,308,061, 4,770,706, and 5,026,755.

The carbon black products of the invention, either as predispersion or as a solid, can be incorporated into an aqueous ink formulation using standard techniques. Use of a water dispersible carbon black product of the invention provides a significant advantage and cost savings by reducing or eliminating the milling steps generally used with other conventional carbon blacks.

Flexographic inks represent a group of aqueous ink compositions. Flexographic inks generally include a colorant, a binder, and a solvent. The carbon black products of the invention, particularly the water-dispersible carbon products, are useful as flexographic ink colorants. Example 101 shows the use of a carbon black product of the invention in an aqueous flexographic ink formulation.

The carbon black products of the invention can be used in aqueous news inks. For example, an aqueous news ink composition may comprise water, the carbon black products of the invention, a resin and conventional additives such as antifoam additives or a surfactant.

The carbon black products of the invention may also be used in aqueous coating compositions such as paints or finishes. The use of the water dispersible carbon black products discussed above in such coating compositions is preferred. Thus, an embodiment of the invention is an improved aqueous coating composition comprising water, resin and a carbon black, the improvement comprising the use of a carbon black product according to the invention. Other known aqueous coating additives may be incorporated the aqueous coating compositions. See, for example, McGraw-Hill Encyclopedia of Science & Technology, 5th Ed. (McGraw-Hill, 1982). See also U.S. Pat. Nos. 5,051,464, 5,319,044, 5,204,404, 5,051,464, 4,692,481, 5,356,973, 5,314,945, 5,266,406, and 5,266,361.

The carbon black products of the invention, either as a predispersion or as a solid, can be incorporated into an aqueous coating composition using standard techniques. Use of a water dispersible carbon black product provides a significant advantage and cost savings by reducing or eliminating the milling steps generally used with other conventional carbon blacks. Examples 102 and 103 below show the use of carbon black products according to the invention in aqueous automotive topcoat formulations.

The carbon black products of the invention may also be used in paper compositions. Preferred carbon black products for this use are the water dispersible carbon black products discussed above. Accordingly, the invention relates to an improved paper product comprising paper pulp and a carbon black, the improvement comprising the use of a carbon black according to the invention.

The carbon black products of the invention, either as a solid or a predispersion, can be incorporated into paper pulp using standard papermaking techniques as with conventional carbon blacks. Use of a water dispersible carbon black product discussed above may provide a significant advantage and cost savings by reducing or eliminating the steps generally used to disperse other conventional carbon blacks. Example 100 shows a paper product using a carbon black product according to the invention.

The paper products of the invention may incorporate other known paper additives such as sizing agents, retention aids, fixatives, fillers, defoamers, deflocculating agents, and the like. Advantageously, the water dispersible carbon black products discussed above are retained more efficiently at low loading levels when compared to the untreated carbon black when retention aids and acidic or alkaline sizing agents are used.

The carbon black products of the invention may also be used, as with conventional carbon blacks, as pigments, fillers, and reinforcing agents in the compounding and preparation of rubber compositions. Accordingly, the invention relates to an improved rubber composition containing rubber and a carbon black, the improvement comprising the use of a carbon black product according to the invention. The properties of the carbon black are important factors in determining the performance of the rubber composition containing a carbon black.

Carbon blacks, for example, are useful in the preparation of rubber vulcanizates such as those in tires. It is generally desirable in the production of tires to utilize carbon blacks which produce tires with satisfactory abrasion resistance and hysteresis performance. The treadwear properties of a tire are related to abrasion resistance. The greater the abrasion resistance, the greater the number of miles the tire will last without wearing out. The hysteresis of a rubber compound means the difference between the energy applied to deform a rubber compound, and the energy released as the rubber compound recovers to its initial undeformed state. Tires with lower hysteresis values reduce rolling resistance and therefore are able to reduce the fuel consumption of the vehicle utilizing the tire. Thus, it is particularly desirable to have carbon black products capable of imparting greater abrasion resistance and lower hysteresis in tires.

The carbon black products of this invention are useful in both natural and synthetic rubber compositions or mixtures of natural and synthetic rubbers. Carbon black products containing aromatic sulfides as the organic group, which are discussed above, are preferred for this use. Particularly preferred for use in rubber compositions are carbon black products having an attached aromatic sulfide organic group of the formula —$(C_6H_4)$—$S_k$—$(C_6H_4)$—, where k is an integer from 1 to 8, and more preferably where k ranges from 2 to 4. The carbon black products of the invention can be used in rubber compositions which are sulfur-cured or peroxide-cured.

The carbon black products may be mixed with natural or synthetic rubbers by normal means, for example by milling. Generally, amounts of the carbon black product ranging from about 10 to about 250 parts by weight can be used for each 100 parts by weight of rubber in order to impart a significant degree of reinforcement. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

Among the rubbers suitable for use with the present invention are natural rubber and its derivatives such as chlorinated rubber. The carbon black products of the invention may also be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinylpyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1.

The rubber compositions of the present invention can therefore contain an elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3 butadiene, acrylonitrile, ethylene, propylene, and the like. It is preferred that these elastomers have a glass transition point (Tg), as measured by DSC, between $-120°$ C. and $0°$ C. Examples of such elastomers include poly(butadiene), poly(styrene-co-butadiene), and poly(isoprene).

Advantageously, the carbon black products of the present invention can impart improved abrasion resistance and/or reduced hysteresis to rubber compositions containing them. Examples 104–116 show the use of carbon black products of the invention in various rubber compositions and various properties of those compositions.

The carbon black products of this invention may also be used to color fibers or textiles. Preferred carbon black products for this use are the water dispersible carbon black products discussed above. Accordingly, the invention relates to improved fiber and textile compositions comprising a fiber or textile and a carbon black, the improvement comprising the use of a carbon black according to the invention. Fibers suitable for use comprise natural and synthetic fibers such as cotton, wool, silk, linen, polyester and nylon. Textiles suitable for use comprise natural and synthetic fibers such as cotton, wool, silk, linen, polyester and nylon.

Preferably natural fibers and textiles comprising cotton, wool, silk and linen are used.

The carbon black products of the present invention may be colored by means known in the art to color fibers and textiles with, for example, direct and acid dyes. For a general discussion of coloring with dyes, see Kirk-Othmer Encyclopedia of Chemical Technology, Vol 8 pp 280–350 "Dyes, Application and Evaluation" (John Wiley and Sons, 1979). Use of a water dispersible carbon black product discussed above provides a method for coloring these materials with a lightfast colorant.

The following examples are intended to illustrate, not limit, the claimed invention.

EXAMPLES

Analytical Methods

Unless otherwise specified, BET nitrogen surface areas obtained according to ASTM D-4820 are used for surface area measurements. CTAB areas and iodine numbers are used occasionally and were obtained according to ASTM D-3765 and D-1510, respectively. DBPA data were obtained according to ASTM D-2414.

Volatile content was determined as follows. A carbon black sample was dried to constant weight at 125° C. A 45 mL sample of the dry carbon black was placed in a covered 50 mL crucible that had been dried at 950° C. and heated in a muffle furnace for 7 minutes at 950° C. The volatile content is expressed as the percentage of weight lost by the carbon sample.

The following procedure was used in various Examples below to determine the aqueous residue of carbon black products according to this invention and untreated carbon blacks. The carbon black product (5 g) was shaken with 45 g of water for 5 minutes. The resulting dispersion was poured through a screen and rinsed with water until the washings were colorless. A 325 mesh screen was used unless indicated otherwise. After drying the screen, the weight of residue on the screen was determined and expressed as a percentage of the carbon black product used in the test.

For the Examples relating to rubber compositions, modulus, tensile strength, and elongation were determined according to ASTM D-412. Shore A hardness was determined according to ASTM D-2240-86.

The abrasion data on the rubber compositions were determined using an abrader which is based on a Lambourn type machine. Abrasion rates (cubic centimeter/centimeter travel) were measured at 14% and 21% slip. The slip is based on the relative velocity between the sample wheel and grindstone. In the following examples, the abrasion index is the ratio of the abrasion rate of a control composition divided by the abrasion rate of a rubber composition prepared with a carbon black product of the invention.

Tan δ was measured with a Rheometrics Dynamic Spectrometer Model RDS-2 at a constant frequency of 10 Hz, a constant temperature, and in the shear mode of strain. Strain sweeps were run from 0.2% to 120% DSA. Measurements were taken at five points per decade and the maximum Tan δ was reported.

Bound rubber was determined as follows: A 0.5 g sample of an uncured rubber composition containing a rubber and a known amount of a carbon black was placed in a wire cage and submerged in toluene at room temperature. After standing for one day, the sample was placed in fresh toluene, and allowed to stand for three additional days at room temperature. The sample was then removed, dried in an oven, and weighed. The weight of the carbon black was subtracted from weight of the sample before and after toluene treatment to give a value for the amount of rubber in each sample. The weight of the sample after toluene treatment, adjusted for the weight of the carbon black and other insoluble ingredients in the composition, represents the amount of insoluble rubber remaining. Bound rubber was expressed as the percentage of the weight of insoluble rubber in the sample after standing in toluene versus the amount of rubber in the original sample.

Example 1

Preparation of a Carbon Black Product With Preformed Diazonium Salt

This example illustrates the preparation of a carbon black product of the present invention. A pelleted carbon black with a surface area of 230 m$^2$/g and a DBPA of 64 ml/100 g was used. An aqueous solution of 4-bromobenzenediazonium chloride was prepared from 0.688 g of 4-bromoaniline, 0.300 g of sodium nitrite, 1.38 g of concentrated HCl and 2.90 g of water at <5° C. This solution was added to a suspension of 10 g of the pelleted carbon black in 60 g of water at room temperature. Bubbles were released. After stirring for 60 minutes, the resulting carbon black product was removed by filtration, washed with water and subjected to Soxhlet extraction with tetrahydrofuran (THF) overnight. Analysis of the carbon black product after extraction showed that it contained 2.49% bromine, compared to <0.01% for the untreated pelleted carbon black prior to use in this example. This corresponds to 78% of the bromophenyl groups being attached to the carbon black product. Therefore, the carbon black product has 0.31 mmol/g of attached bromophenyl groups.

Examples 2–4

Preparation of a Carbon Black Product With Preformed Diazonium Salt

These examples illustrate additional methods for the preparation of carbon black products of the present invention. The pelleted carbon black used in Example 1 was used in Examples 2–4. An aqueous solution of 4-bromobenzenediazonium chloride was prepared from 0.688 g of 4-bromoaniline, 0.300 g of sodium nitrite, 1.38 g of concentrated HCl and 2.90 g of water at <5° C. This solution was added to a suspension of 10 g of the pelleted carbon black in 60.5 g of a 0.826% NaOH solution at the temperature indicated. Bubbles were released. After stirring for the time indicated in the following table, the resulting carbon black product was removed by filtration, washed with water and subjected to Soxhlet extraction with THF overnight. Bromine analysis of the product after extraction showed that a substantial fraction of the bromophenyl groups had been attached to the carbon black product. This shows that the preparation of carbon black products according to the invention can be carried our at different times, temperatures and pHs.

| Example | Temperature, C. | Time, min. | Bromine, % | Portion of bromophenyl retained, % | Bromophenyl groups, mmol/g |
|---|---|---|---|---|---|
| 2 | <5 | 5 | 1.88 | 59 | 0.24 |
| 3 | <5 | 60 | 2.15 | 67 | 0.27 |
| 4 | Ambient | 60 | 2.45 | 77 | 0.31 |

Example 5

Preparation of a Carbon Black Product With a Diazonium Salt Generated in Situ This example further illustrates the preparation of a carbon black product of the present invention. A fluffy carbon black with a surface area of 560 m2/g, a DBPA of 90 ml/100 g and a volatile content of 9.5% was used. Fifty grams of the fluffy carbon black were added to a solution of 8.83 g of sulfanilic acid dissolved in 420 g of water. The resulting suspension was cooled to room temperature. Nitrogen dioxide (5.16 g) was dissolved in 30 g of ice cold water, and then added to the fluffy carbon black suspension over a period of several minutes and stirred rapidly, to produce 4-sulfobenzenediazonium inner salt in situ, which reacts with the fluffy carbon black. The resulting dispersion was dried in an oven at 125° C., leaving only the carbon black product. The carbon black product contained 1.94% sulfur after Soxhlet extraction with ethanol overnight, compared to 0.24% sulfur for the untreated carbon black. This corresponds to attaching 52% of the p-C6H4SO3— groups to the carbon black product. Therefore, the carbon black product had 0.53 mmol/g of attached p-$C_6H_4SO_3$— groups.

Example 6

Preparation of a Carbon Black Product

This example illustrates another method for the preparation of a carbon black product of the present invention. Sulfanilic acid (2.13 g) was dissolved in 90 g of water with stirring and heating. Ten grams of a carbon black with a CTAB surface area of 350 m2/g and a DBPA of 120 ml/100 g were added. The mixture was cooled to room temperature and isobutyl nitrite (1.27 g) was added. Bubbles were released. 4-Sulfobenzene diazonium hydroxide inner salt was generated in situ and it reacted with the carbon black. The mixture was stirred for 30 minutes, and dried in an oven at 125° C. A sample of the resulting carbon black product that had been subjected to Soxhlet extraction with ethanol overnight contained 2.02% sulfur, compared to 0.5% for the untreated carbon black. Therefore, the carbon black product had 0.48 mmol/g of attached p-$C_6H_4SO_3$— groups.

Example 7

Preparation of a Carbon Black Product in an Aprotic Solvent

This example illustrates the preparation of a treated carbon black product of the present invention in an aprotic solvent. A 0.1 M solution of tetrabutylammonium hexafluorophosphate in anhydrous acetonitrile was prepared and allowed to stand overnight over 3A molecular sieves. A 5.4% solution of chlorobenzenediazonium hexafluorophosphate in anhydrous acetonitrile was prepared and allowed to stand overnight over 3A molecular sieves. A carbon black with a surface area of 230 m2/g and a DBPA of 70 ml/100 g was dried at 150° C. under nitrogen for 4 hours. The carbon black (10 g) was stirred into 80 mL of the tetrabutylammonium hexafluorophosphate solution. The diazonium solution (21 g) was added, and the mixture was stirred for four hours. The carbon black product was recovered by filtration and was washed with anhydrous acetonitrile. All operations up to this point were carried out in a dry box under an argon atmosphere. A sample of the carbon black product that was subjected to Soxhlet extraction overnight with THF and dried had a chlorine content of 0.76%, compared to 0.02% for the untreated carbon black. Therefore, the carbon black product had 0.21 mmol/g of attached chlorophenyl groups.

Example 8

Preparation of a Carbon Black Product in an Aprotic Solvent

This example illustrates the preparation of a treated carbon black product of the present invention in an aprotic solvent. A carbon black with a surface area of 230 m2/g and a DBPA of 70 ml/100 g was heated at 950° C. under nitrogen for one hour. A 0.1 M solution of tetrabutylammonium tetrafluoroborate in anhydrous benzonitrile was prepared and allowed to stand overnight over 3A molecular sieves. Using glassware dried at 160° C. under argon, the carbon black (6 g) was stirred into 50 mL of the tetrabutylammonium tetrafluoroborate solution. 4-Bromobenzenediazonium tetrafluoroborate was added, and the mixture was stirred for 15 minutes. The carbon black product was recovered by filtration and was washed twice with anhydrous benzonitrile and twice with hexanes. Except for the initial drying of the carbon black, all operations up to this point were carried out under an argon atmosphere in a dry box. A sample of the carbon black product that was subjected to Soxhlet extraction overnight with THF and dried had a bromine content of 0.85%, compared to <0.01% for the untreated carbon black. Therefore, the carbon black product had 0.11 mmol/g of attached bromophenyl groups.

Example 9

Preparation of a Carbon Black Product With a Diazonium Salt Generated in Situ This example illustrates another method for the preparation of a carbon black product of the present invention. A fluffy carbon black with a surface area of 560 m2/g, a DBPA of 90 ml/100 g and a volatile content of 9.5% was used. Fifty grams of the fluffy carbon black were added to a solution of 8.83 g of sulfanilic acid dissolved in 420 g of water. The resulting suspension was cooled to 30° C. and 4.6 g of concentrated nitric acid was added. An aqueous solution containing 3.51 g of sodium nitrite was then added gradually with stirring, forming 4-sulfobenzenediazonium hydroxide inner salt in situ, which reacts with the fluffy carbon black. The resulting product was dried in an oven at 125° C., leaving the carbon black product. The carbon black product contained 1.97% sulfur after Soxhlet extraction with ethanol overnight, compared to 0.24% sulfur for the untreated fluffy carbon black. This corresponds to attaching 53% of the p-$C_6H_4SO_3$— groups to the carbon black product. Therefore, the carbon black product had 0.54 mmol/g of attached p-$C_6H_4SO_3$— groups.

Example 10

Preparation of a Carbon Black Product With an Aliphatic Diazonium Salt

This example shows another method for the preparation of a carbon black product of the present invention. A fluffy carbon black with a surface area of 230 m2/g and a DBPA of 70 ml/100 g was used. Twenty grams of this black were added to a solution of 4.9 g of 2-aminoethanesulfonic acid in 180 g of water. Concentrated nitric acid (4.32 g) was added. A solution of 3.33 g of sodium nitrite in 15 g of water was added slowly with stirring, forming 2-sulfoethanediazonium nitrate in situ, which reacted with the fluffy carbon black. A large quantity of bubbles evolved. The product was dried in an oven at 135° C., leaving a carbon black product. The resulting carbon black product contained 1.68% sulfur after Soxhlet extraction with ethanol overnight, compared to 0.4% for the untreated fluffy carbon black. This corresponds to attaching 20% of the $C_2H_4SO_3$— groups to the carbon black product. Therefore, the carbon black product had 0.40 mmol/g of attached $C_2H_4SO_3$— groups.

Example 11

Preparation of a Carbon Black Product With a Benzyldiazonium Salt

This example shows another method for the preparation of a carbon black product of the present invention. A suspension of 0.676 g of 4-bromobenzyl amine, 0.60 g of concentrated HCl, 30 g of water and 10.22 g of the untreated carbon black used in Example 7 was prepared in an ice bath. An aqueous solution containing 0.269 g of sodium nitrite was added and the resulting suspension was stirred for 15 minutes, forming 4-bromophenylmethanediazonium chloride in situ, which reacted with the untreated carbon black. The product was filtered off, and was subjected to Soxhlet extraction with THF overnight. The resulting carbon black product contained 0.26% bromine, compared to <0.01% for the untreated carbon black product. This shows that 9% of the bromobenzyl groups used in the example became attached to the carbon black product. Therefore, the carbon black product had 0.031 mmol/g of attached bromobenzyl groups.

Example 12

Preparation of a Carbon Black Product

This example illustrates the preparation of a carbon black product of the present invention. Ten grams of a carbon black with a surface area of 230 m2/g and a DBPA of 70 ml/100 g was added to a stirring solution of 0.8 g 4-bromobenzamide and 90 ml of acetone in 90 g of water. Concentrated HCl (0.87 g) was added followed by 0.33 g of $NaNO_2$. $BrC_6H_4CON_2^+$ was formed in situ, which reacted with the carbon black. After stirring for 30 minutes, the mixture was allowed to stand overnight and was then dried in an oven at 125° C. A sample of the product that had been subjected to Soxhlet extraction with THF overnight and dried contained 0.22% bromine, compared to <0.01% bromine for the unreacted carbon black.

Example 13

Preparation of a Carbon Black Product With a Preformed Diazonium Salt in a Pin Pelletizer This example shows another method for the preparation of a carbon black product of the present invention. A pin pelletizer was charged with 400 g of a fluffy carbon black with a surface area of 80 m2/g and a DBPA of 85 ml/100 g. A cold suspension of 4-sulfobenzenediazonium hydroxide inner salt prepared from 27.1 g of the sodium salt of sulfanilic acid, 10.32 g of sodium nitrite, 29.0 g of concentrated HCl and 293.5 g of water and was added to the pelletizer. After pelletizing for 2 minutes, the sample was removed and dried at 115° C. to constant weight. Soxhlet extraction with ethanol overnight gave a carbon black product containing 1.1% sulfur, compared against 0.8% for the untreated carbon black. This shows that 27% of the $p$-$C_6H_4SO_3$— groups were attached to the carbon black product. Therefore, the carbon black product had 0.09 mmol/g of attached $p$-$C_6H_4SO_3$— groups.

Example 14

Preparation of a Carbon Black Product in a Pin Pelletizer With a Diazonium Salt Generated in Situ This example illustrates another method for preparing a carbon black product of the present invention. A pin pelletizer was charged with 200 g of a carbon black with a CTAB surface area of 350 m2/g and a DBPA of 120. A solution of 44.2 g of sodium sulfanilate in 95 g of water at 70° C. was added and the pelletizer was run for one minute. Twenty grams of water was added followed by 39.6 g of concentrated nitric acid. The pelletizer was run for an additional minute. Twenty grams of water was added followed by a solution of 16.76 g of sodium nitrite in 35 g of water, forming 4-sulfobenzenediazonium hydroxide inner salt in situ, which reacted with the carbon black. After running the pelletizer for five minutes, a solution of 11.22 g of sodium hydroxide in 35 g of water was added. The pelletizer was run for an additional two minutes and the resulting a carbon black product was subsequently dried. Soxhlet extraction with ethanol overnight gave a carbon black product with 3.3% sulfur, compared against 0.5% for the untreated carbon black. This shows that 77% of the p-C6H4SO3— groups were attached to the carbon black product. Therefore, the carbon black product had 0.88 mmol/g of attached $p$-$C_6H_4SO_3$— groups.

Example 15

Preparation of a Carbon Black Product in a Pin Pelletizer With a Diazonium Salt Generated in Situ This example further illustrates the preparation of a carbon black product of the present invention. A pin pelletizer was charged with 200 g of a carbon black product with a surface area of 560 m2/g, a DBPA of 90 ml/100 g and a volatile content of 9.5%. Water (60 g), concentrated nitric acid (25.2 g), sulfanilic acid (40.4 g) and a solution of 19.7 g of sodium nitrite in 35 g of water were added successively; the pelletizer was run for one minute after each addition. 4-Sulfobenzenediazonium hydroxide inner salt was generated in situ, and it reacted with the carbon black. After standing for five minutes, the resulting carbon black product was dried at 125° C. A sample of the carbon black product was subjected to Soxhlet extraction with ethanol overnight. It contained 2.15% sulfur compared to 0.24% for the untreated carbon black. This shows that 51% of the $p$-$C_6H_4SO_3$— groups were attached to the carbon black product. Therefore, the carbon black product had 0.60 mmol/g of attached $p$-$C_6H_4SO_3$— groups.

Example 16

Preparation of a Carbon Black Product in a Pelletizer With a Diazonium Salt Generated in Situ This example illustrates another method for the preparation of a carbon black product of the present invention. A carbon black (200 g) with a CTAB surface area of 350 m2/g and a DBPA of 120 ml/100 g and 42.4 g sulfanilic acid were placed in a pin pelletizer. After mixing for 40 seconds, a solution of 20.7 $NaNO_2$ in 150 g of water was then added. 4-Sulfobenzene diazonium hydroxide inner salt was formed in situ, which reacted with the carbon black. After mixing for 45 seconds, the resulting carbon black product was dried in an oven at 120° C. A sample of the product that had been subjected to Soxhlet extraction overnight with ethanol contained 3.47% sulfur, compared to 0.5% sulfur for the untreated carbon black product. Therefore, the carbon black product has 0.93 mmol/g of attached p-$C_6H_4SO_3$— groups.

Example 17

Preparation of a Carbon Black Product in a Continuous Pin Pelletizer With a Diazonium Salt Generated in Situ This example illustrates another method for preparing a carbon black product of the present invention. A carbon black with a CTAB surface area of 133 m2/g and a fluffy DBPA of 190 ml/100 g is introduced into a continuously operating pin pelletizer at a rate of 100 parts by weight per hour. Simultaneously, a 30% solution of sodium nitrite in water and a suspension containing 5.43% concentrated nitric acid, 8.72% sulfanilic acid and 85.9% water are introduced into the pelletizer. The sodium nitrite solution is introduced at 16 parts by weight per hour and the suspension is added at 112 parts by weight per hour. 4-Sulfobenzenediazonium hydroxide inner salt was generated in situ and it reacted with the carbon black in the pelletizer. The material leaving the pelletizer was the carbon black product. The carbon black product was dried at 125° C. A sample of the carbon black product that had been subjected to Soxhlet extraction with ethanol overnight contained 1.70% sulfur, compared to 0.42% for the untreated carbon black. Therefore, the carbon black product had 0.40 mmol/g of attached p-$C_6H_4SO_3$— groups.

Example 18

Preparation of a Carbon Black Product With a Diazonium Salt Generated in Situ

This example shows another method for preparing a carbon black product of the present invention. In this example, the acid for the diazotization reaction comes from the amine forming the diazonium salt, sulfanilic acid. As a result, no additional acid was required. Sulfanilic acid (2.12 g) was dissolved in 90 g water at 70° C. The solution was added to 10 g of a carbon black with a CTAB surface area of 350 m2/g and a DBPA of 120 ml/100 g, and cooled to room temperature. A solution of 1.04 g $NaNO_2$ in 10 g water was added with stirring. 4-Sulfobenzenediazonium hydroxide inner salt was generated in situ and it reacted with the carbon black to form the carbon black product. After stirring for 30 minutes, the resulting dispersion was dried in an oven at 120° C. A sample of the carbon black product that had been subjected to Soxhlet extraction with ethanol overnight contained 3.19% sulfur, compared to 0.5% for the untreated carbon black product. Therefore, the carbon black product had 0.84 mmol/g of attached p-$C_6H_4SO_3$— groups.

Example 19

Preparation of a Carbon Black Product With a Diazonium Salt Generated in Situ

This example illustrates another method for the preparation of a carbon black product of the present invention. In this example, the acid for the diazotization reaction comes from the amine forming the diazonium salt, sulfanilic acid. As a result, no additional acid was required. A carbon black (10 g) with a CTAB surface area of 350 m2/g and a DBPA of 120 ml/100 g was added to a boiling solution of 2.12 g sulfanilic acid in 90 g of water. A solution of 1.04 g of $NaNO_2$ in 10 g water was added cautiously. 4-Sulfobenzene diazonium hydroxide inner salt was formed in situ, which reacted with the carbon black. After stirring for about 20 min, the resulting dispersion was dried in an oven at 120° C. A sample of the product that had been subjected to Soxhlet extraction overnight with ethanol contained 3.16% sulfur, compared to 0.5% sulfur for the untreated carbon black. Therefore, the carbon black product had 0.83 mmol/g of attached p-$C_6H_4SO_3$— groups.

Examples 20–30

Aqueous Dispersibility of Carbon Black Products

These examples show that carbon black products of the present invention described in some earlier examples are more readily dispersed in water than the corresponding untreated carbon black.

| Example | Carbon Black Product | Residue of Carbon Black Product, % | Residue of untreated control, % |
|---|---|---|---|
| 20 | Example 5 | 3.0 | 6 |
| 21 | Example 6 | 0.2 | 97 |
| 22 | Example 9 | 0.12 | 6 |
| 23 | Example 10 | 2.1 | 94 |
| 24 | Example 13 | 0.07 | 81 |
| 25 | Example 14 | 0.3 | 97 |
| 26 | Example 15 | 0.26 | 6 |
| 27 | Example 16 | 0.6 | 97 |
| 28 | Example 17 | 0.02 | 36 |
| 29 | Example 18 | 0.04 | 97 |
| 30 | Example 19 | 0.01 | 97 |

Examples 31–34

Preparation and Aqueous Dispersibility of Carbon Black Products

These examples show that carbon black products prepared using several different diazonium salts are more readily dispersed in water than are the corresponding untreated carbon blacks. In all cases, the untreated carbon black used for treatment has a surface area of 230 m2/g and a DBPA of 70 ml/100 g. To prepare the carbon black product, an aniline derivative was dissolved in warm water, the untreated carbon black (CB) was added and the mixture was cooled to room temperature. Concentrated HCl was added and then a solution of sodium nitrite in water was added, forming a diazonium salt in situ, which reacts with the untreated carbon black. After stirring for 15 minutes, the resulting dispersions were dried in an oven at 125° C. Residues were determined using the method described above. The amounts of each component and results are shown in the following table. The untreated carbon black had a residue of 94%.

| Example | Aniline derivative | Aniline derivative g | HCl g | NaNO2 g | CB g | H20 g | Residue % |
|---|---|---|---|---|---|---|---|
| 31 | 5-Amino 2 Hydroxy benzene sulfonic acid | 1.89 | 1.18 | 0.85 | 10.0 | 100 | 0.06 |
| 32 | 2-Amino benzene sulfonic acid | 1.73 | 1.18 | 0.82 | 10.0 | 67 | 0.14 |
| 33 | 3-Aminobenzene sulfonic acid | 1.72 | 1.18 | 0.84 | 10.4 | 77 | 0.16 |
| 34 | 4-Aminoazobenz end-4'sulfonic acid, Na salt | 2.94 | 2.60 | 0.83 | 10.0 | 71 | 2.0 |
| Comparative | Untreated | — | — | — | — | — | 94 |

Examples 35–38

Preparation and Dispersibility of Carbon Black Products

These examples show additional carbon black products that are prepared using different diazonium salts and that are more readily dispersible in water than the corresponding untreated carbon black. All of these examples use naphthyl diazonium salts. In all cases, a carbon black with a surface area of 230 m2/g and a DBPA of 70 ml/100 g was used. A solution of 7 mmol of the naphthylamine and 0.42 g $NaNO_2$ in 10.83 g water was cooled to <5° C. The diazonium salt was formed by the addition of a cold (5° C.) solution of 1.63 g concentrated HCl in 1.63 g water, maintaining the temperature at <5° C. The reaction product was added to a stirring slurry of 10 g of the untreated carbon black in 90 g of water. After stirring for an additional 10 minutes, the dispersion was dried, leaving the carbon black product. Samples of the carbon black products that had been subjected to Soxhlet extraction overnight with ethanol were analyzed for sulfur to determine the number of attached naphthyl groups.

| Example | Naphthylamine derivative | Sulfur % | Substituted naphthyl groups, mmol/g | Residue % |
|---|---|---|---|---|
| 35 | Sodium 5-amino-2-naphthalene sulfonate | 2.15 | 0.51 | <0.01 |
| 36 | 4-Amino-5-hydroxy-2,7-naphthalene disulfonic acid, mono potassium salt | 2.77 | 0.35 | 0.02 |
| 37 | 7-Amino-1,3-naphthalene disulfonic acid, mono potassium salt | 3.09 | 0.40 | 0.01 |
| 38 | Sodium 4-amino-1-naphthalene sulfonate | 1.79 | 0.40 | 0.33 |
| Comparative | Untreated | 0.5 | — | 94 |

Example 39

Preparation and Aqueous Dispersibility of a Carbon Black Product

This example illustrates another method for the preparation of a carbon black product of the present invention and illustrates that this carbon black product was more readily dispersible in water than is the corresponding untreated carbon black. 7-Amino-1,3-naphthalenedisulfonic acid (1.5 g) was dissolved in 90 g warm water. Ten grams of a carbon black with a surface area of 230 m2/g and a DBPA of 70 ml/100 g was added, and the mixture was cooled to room temperature. A solution of 0.42 g $NaNO_2$ in 5 g water was added with stirring. The diazonium salt was formed in situ and reacted with the carbon black. Bubbles were released. The resulting dispersion was dried in an oven at 125° C., giving the carbon black product. The carbon black product had a residue of 0.85%, compared to 94% for the untreated carbon black.

Example 40

Preparation and Aqueous Dispersibility of a Carbon Black Product

This example shows that a carbon black product prepared using another diazonium salt was more readily dispersible in water than the corresponding untreated carbon black. The carbon black used for treatment had a surface area of 230 m2/g and a DBPA of 70 ml/100 g. 5-Amino-2-hydroxy-3-sulfobenzoic acid (2.33 g), 10 g of carbon black and 100 g of water were mixed in an ice bath. Cold concentrated HCl (1.18 g) was added, followed gradually by 0.85 g $NaNO_2$. The diazonium salt was formed in situ, and reacted with the carbon black. After stirring for 15 minutes, the resulting dispersion was dried in an oven at 125° C. to provide the carbon black product. The 325 mesh residue of the resulting carbon black product was 0.1%, compared to 94% for the untreated carbon black.

Example 41

Preparation and Aqueous Dispersibility of a Carbon Black Product

This example shows that a carbon black product prepared with another diazonium salt was more readily dispersible in water than the corresponding untreated carbon black. The procedure of Example 40 was followed in all respects, except that 4-amino-2'-nitro-4'-sulfodiphenyl amine (3.01 g) was used as the diazonium precursor. The resulting carbon black product had a 325 mesh residue of 0.18%, compared to 94% for the untreated carbon black.

Example 42

Preparation and Aqueous Dispersibility of a Carbon Black Product

This example shows another preparation of a carbon black product of the present invention, and that this carbon black product was more readily dispersible in water than is the correspondingly untreated carbon black. 4-Aminophenylphosphonic acid (0.90 g) was added to 10 g of ice cold water. NaOH (0.26 g) was added to dissolve the solid. A cold solution of 0.42 g $NaNO_2$ in 5 g of cold water was added. Concentrated HCl was added (3.83 g) and the solution was stirred at <10° C. for 15 minutes, forming the corresponding diazonium salt. A cold suspension of 5.02 g of a carbon black with a surface area of 230 m2/g and a DBPA of 70 ml/100 g in 36.2 g of water was added and stirred for 15 minutes. The resulting dispersion was concentrated to dryness under vacuum at room temperature giving a carbon black product. This carbon black product disperses readily in water, and had a 325 mesh residue of 2.7%, compared to 94% for the untreated carbon black. A sample of the carbon black product that was dried in an oven at 125° C. did not disperse in water. A sample of the carbon black product that had been subjected to Soxhlet extraction overnight with THF contained 1.57% phosphorous. Therefore, the carbon black product had 0.51 mmol/g of attached p-$C_6H_4PO_3$= groups.

Example 43

Preparation and Aqueous Dispersibility of a Carbon Black Product

This example illustrates the use of a diazonium salt containing a quaternary ammonium salt in the preparation of a carbon black product of the present invention and the dispersibility in water of this carbon black product. A cold solution of 3-amino-N-methyl pyridinium nitrate (11 mmol) in 30 g of water was added to a suspension of 11.0 g of a carbon black (surface area 230, DBPA 70) in 70 g of water at <10° C. Concentrated HCl (2.38 g) was added. A cold solution of 0.92 g $NaNO_2$ in 10 g water was added carefully, and the reaction mixture was stirred for 20 minutes. The diazonium salt was formed in situ, and the salt reacted with the carbon black. A solution of 0.50 g of NaOH in 10 g of water was subsequently added. The sample was dried at 130° C., giving a carbon black product. The carbon black product had a 325 mesh residue of 0.40%, compared to 94% for the untreated carbon black product.

Example 44

Preparation and Aqueous Dispersibility of a Carbon Black Product

This example further illustrates the use of a diazonium salt containing a quaternary ammonium salt in the preparation of a carbon black product of the present invention and the dispersibility in water of this carbon black product. Using a procedure analogous to that of Example 43 with 9.8 mmol 4-aminophenyl)-trimethylammonium nitrate, 10.0 g carbon black, 2.25 g concentrated HCl, 0.83 g $NaNO_2$, a carbon black product with a 325 mesh residue of 0.6% was obtained. The residue of the untreated carbon black was 94%.

Example 45

Preparation and Aqueous Dispersibility of a Carbon Black Product

This example shows that a carbon black product produced with another diazonium salt was more readily dispersible in water than the corresponding untreated carbon black. The carbon black used for treatment had a surface area of 230 m2/g and a DBPA of 70 ml/110 g. A cold (5° C.) solution of 4-carboxymethyl-benzenediazonium chloride was prepared from 0.77 g 4-aminophenylacetic acid, 9.2 g cold water, 1.35 g cold concentrated HCl and 0.44 g $NaNO_2$. The diazonium solution was added to an ice cold stirring suspension of 5.04 g of the carbon black in 35.2 g of water. Bubbles were released. After stirring for 20 minutes, the dispersion was placed in a water bath at 27° C. and stirred for an additional 20 minutes. The dispersion was dried in an oven at 120° C., leaving the carbon black product which had a 325 mesh residue of 2.5%, compared to 94% for the untreated carbon black.

Example 46

Preparation and Aqueous Dispersibility of a Carbon Black Product

This example shows that a carbon black product with another diazonium salt was more readily dispersible in water than the corresponding untreated carbon black. The carbon black used for treatment has a surface area of 230 m2/g and a DBPA of 70 ml/100 g. A pin pelletizer was charged with 200 g of the carbon black. A suspension of 80 mmol (12.7 g) sodium 4-aminobenzoate in 45 g of water, 25.7 g concentrated HCl, and a solution of 7.04 g $NaNO_2$ in 30 g of water were added to the pelletizer in succession, with one minute of mixing after the first two additions and five minutes after the last. Carboxybenzenediazonium chloride was formed in situ and it reacted with the carbon black. A solution of 7.83 g NaOH in 30 g water was added and mixing was continued for two minutes. The resulting carbon black product was dried at 120° C. and had a 325 mesh residue of 6.4%, compared to 94% for the untreated carbon black.

Examples 47–59

Preparation of Carbon Black Products and Their Use as Colorants in ABS

These examples illustrate the preparation of carbon black products of the present invention using different amines and the use of these carbon black products as colorants in ABS. A fluffy carbon black with a surface area of 230 m2/g and a DBPA of 70 ml/100 g was used in each example. A diazonium salt was prepared in an ice bath from the compound indicated, 2.2 equivalents of concentrated HCl, and 1.0 equivalents of $NaNO_2$ as a 9.65M solution. The resulting solutions were added to a suspension of 200 g of the fluffy carbon black in 3 L of water and stirred for 10 to 20 minutes. The resulting carbon black product was filtered off, washed with water twice, and dried at about 100° C. In some instances, the preparation was carried out by combining multiple batches that had been made at one half or one quarter scale.

Masterbatches were prepared by fluxing 183 g ethylene-vinyl acetate polymer (EVA) for one minute in a Brabender mixer at 110° C., adding 45.8 g of the carbon black product, and mixing for four additional minutes. Injection molded samples for evaluation were prepared by injection molding a mixture of 80 g of masterbatch and 1520 g of ABS, (acrylonitrile-butadiene-styrene copolymer resin). The final concentration of the carbon black product in the molded samples is 1%.

The impact strength of the let down material was measured with an Izod impact tester; the optical properties were measured with a Hunter colorimeter. The impact strengths obtained are expressed as a percentage of the impact strength of the unfilled ABS used. Desirable properties are high impact strength, low Hunter L values Oetter), Hunter a values near 0, and more negative Hunter b values (bluer). Generally when carbon black is added to ABS to impart color, the impact suffers as the jetness improves. The results show that the carbon black products of the invention are useful as a colorant in ABS.

| Example | Diazonium Precursor | Amount of Diazonium Precursor, mmol | Impact strength, % of unfilled ABS | Hunter L | Hunter a | Hunter b |
|---|---|---|---|---|---|---|
| 47 | Aniline | 60 | 84 | 6.4 | −0.2 | −1.3 |
| 48 | 4-Chloroaniline | 60 | 87 | 6.6 | −0.3 | −1.5 |
| 49 | 4-Aminobenzoic acid | 60 | 46 | 6.1 | −0.3 | −2.0 |
| 50 | Ethyl 4-aminobenzoate | 60 | 71 | 5.3 | −0.3 | −1.6 |
| 51 | 4-Nitroaniline | 60 | 58 | 5.0 | −0.3 | −1.5 |
| 52 | 4-Hexylaniline | 60 | 73 | 5.1 | −0.3 | −1.6 |
| 53 | 4-Tetradecylaniline | 60 | 66 | 5.7 | −0.3 | −1.7 |
| 54 | 4-(N,N Dimethyl amino) aniline | 60 | 48 | 5.7 | −0.3 | −1.7 |
| 55 | 4-Amino acetophenone | 60 | 54 | 5.1 | −0.3 | −1.6 |
| 56 | 4-Amino phenol | 80 | 50 | 4.5 | −0.2 | −1.1 |
| 57 | p-Phenylene diamine | 60 | 45 | 5.2 | −0.3 | −1.6 |
| 58 | p-Phenetidine | 60 | 63 | 5.1 | −0.3 | −1.6 |
| 59 | Reference | | 53 | 5.0 | −0.2 | −1.6 |

Examples 60–62

Preparation of Carbon Black Products and Their Use as Colorants in ABS

These examples illustrate the preparation of carbon black products of the present invention using different treating agents and the use of those carbon black products as a colorant in ABS. A fluffy carbon black with a surface area of 230 m2/g and a DBPA of 70 ml/100 g was used in each case. The procedure for Examples 47–59 was used for the preparation of the carbon black products using 60 mmol of diazonium precursor.

Masterbatches were prepared by fluxing 203.6 g ABS for two minutes in a Brabender mixer with an initial temperature of 210° C., adding 50.9 g of the carbon black product at 175° C., and mixing for three additional minutes. Injection molded samples for evaluation were prepared by injection molding a mixture of 75 g of masterbatch and 1425 g of ABS. The final concentration of the carbon black product in the molded samples was 1%.

The impact strength of the let down material was measured with an Izod impact tester; the optical properties were measured with a Hunter colorimeter. The impact strengths obtained are expressed as a percentage of the impact strength of the unfilled ABS used. Desirable properties are high impact strength, low Hunter L values (jetter), Hunter a values near 0, and more negative Hunter b values (bluer). Generally when carbon black is added to ABS to impart color, the impact suffers as the jetness improves. The results show that carbon black products of the invention are useful as a colorant in ABS.

| Example | Diazonium Precursor | Impact strength, % of unfilled ABS | Hunter L | Hunter a | Hunter b |
|---|---|---|---|---|---|
| 60 | 4-Aminophenol | 32 | 4.5 | −0.2 | −1.1 |
| 61 | p-Benzonitrile | 37 | 4.4 | −0.1 | −1.1 |
| 62 | Reference | 38 | 4.6 | −0.2 | −2.0 |

Examples 63–65

Preparation of Carbon Black Products and Their Use in Coloring Polyethylene

These examples illustrate the preparation of carbon black products of the present invention. A carbon black with a surface area of 140 m2/g and a DBPA of 114 ml/100 g was used. Cold solutions of tetradecylbenzenediazonium chloride were prepared from tetradecylaniline, concentrated HCl, NaNO2, isopropanol and water. The diazonium solution was added to 200 g carbon black in a pin pelletizer and mixed for the indicated time. Additional water #1 was added and mixing was continued for three more minutes. After addition of more water #2 and isopropanol #2 and further mixing, the resulting carbon black product was dried in an oven. A control sample was prepared by mixing the untreated carbon black in the same pelletizer with water and isopropanol, and drying.

Masterbatches were prepared by mixing 169.34 g low density polyethylene with 72.6 g of a carbon black sample in a Brabender mixer at 85° C. for five minutes. Plaques for evaluation were prepared by injection molding a mixture of 10 g of masterbatch and 1490 g of high density polyethylene. The final concentration of carbon black product was 0.2%. The optical properties of the plaques were measured with a Hunter colorimeter. The results show that the carbon black products were somewhat jetter (lower Hunter L values) than the control and are useful as a colorant for polyethylene.

| | Example 63 | Example 64 | Example 65 |
|---|---|---|---|
| Precursor | 4-Tetradecylaniline | 4-Tetradecylaniline | none |
| Precursor amount, g | 6.95 | 11.56 | — |
| HCl, g | 4.67 | 7.79 | — |
| H2O, g | 27 | 48 | — |
| Isopropanol, g | 25 | 25 | — |
| NaNO2, g | 2.07 | 3.45 | — |
| Initial mix time, min | 3 | 1 | — |
| Added water #1, g | 170 | 130 | — |
| Added water #2, g | 5 | 5 | 263 |
| Added isopropanol #2, g | — | 5 | 20 |
| Final mix time, min | 1 | 2 | 5 |
| Hunter L | 6.9 | 6.7 | 7.1 |
| Hunter a | −0.2 | −0.3 | −0.3 |
| Hunter b | 0.3 | 0.0 | 0.2 |

Example 66

Preparation of a Carbon Black Product in a Pelletizer

This example illustrates the preparation of a carbon black product of the present invention. A pelletizer was charged with 300 g of a carbon black with a surface area of 254 m2/g and a DBPA of 188 ml/100 g and 21.2 g of sulfanilic acid. After mixing for 45 seconds, 220 g of water was added. After mixing for 20 seconds, 13.2 g of concentrated nitric acid was added. After mixing for an additional 20 seconds, a solution of 10.3 g of $NaNO_2$ in 270 g of water was added. After mixing for 2 minutes, the resulting carbon black product was dried in an oven at 125° C.

Example 67

Use of a Carbon Black Product in Polypropylene

This example illustrates the use of a carbon black product of the present invention in polypropylene to impart conductivity to the polypropylene. A mixture of 263.1 g of the carbon black product of Example 66 and 881 g of polypropylene was added to a Banbury mixer at 66° C. and mixed for 5 minutes. A sample of the material was let down to a 20% carbon black product content on a two roll mill by mixing with additional polypropylene. The product had a resistivity of 68 ohm-cm, compared to 64 ohm-cm for a similar product made with the untreated carbon black used in Example 66.

Examples 68–76

Preparation of Carbon Black Products

These examples show other diazonium compounds that can be used to prepare carbon black products of the present invention. The diazonium compounds encompass a range of substitution patterns on the aromatic ring and with various electron-withdrawing or electron-donating substituents. In each case, a cold diazonium salt solution was prepared from the indicated aryl amine, $NaNO_2$ and either concentrated HCl or $HNO_3$. The diazonium solution was added to a suspension of carbon black in water and/or stirred for 15 to 20 minutes. The resulting carbon black product was isolated by filtration, washed with water, and subjected to Soxhlet extraction with THF overnight. The analyses shown below report increases from the reaction over the level contained in the appropriate untreated carbon black. The results show that a substantial fraction of the organic groups are attached to the carbon black product.

Example 77

Preparation of a Carbon Black Product Containing Aryl and Alkoxy Groups

This example illustrates the preparation of a carbon black product containing aryl and alkoxy groups. A dry sample of a carbon black with a surface area of 230 m2/g and a DBPA of 70 ml/100 g was used. Bromoethanol (30 ml) was added to a mixture of 3 g of the carbon black and 0.34 g of dry chlorobenzenediazonium hexafluorophosphate. Bubbles were released rapidly. After stirring for 30 minutes, the resulting carbon black product was filtered, subjected to Soxhlet extraction overnight with THF and dried. The carbon black product contained 0.58% Cl and 0.84% Br compared to 0.02% Cl and <0.01% Br for the untreated carbon black product. The carbon black product therefore had 0.16 mmol/g of attached chlorophenyl groups and 0.11 mmol/g of attached bromoethoxy groups.

Example 78

Preparation of a Carbon Black Product Containing Aryl and Alkoxy Groups

This example illustrates the preparation of a carbon black product containing aryl and alkoxy groups. A dry sample of a carbon black with a surface area of 230 m2/g and a DBPA of 70 ml/100 g was used. Chloroethanol (30 ml) was added to a mixture of 3 g of the carbon black and 0.32 g of dry bromobenzenediazonium tetrafluoroborate. Bubbles were released rapidly. After stirring for 30 minutes, the resulting carbon black product was filtered, subjected to Soxhlet extraction overnight with THF and dried. The carbon black product contained 0.31% Cl and 1.60% Br compared to 0.02% Cl and 0.01% Br for the untreated carbon black. The carbon black product therefore had 0.20 mmol/g of attached bromophenyl groups and 0.08 mmol/g of attached chloroethoxy groups.

Example 79

Preparation of a Carbon Black Product Containing Aryl and Alkoxy Groups

This example illustrates another method for the preparation of a carbon black product containing aryl and alkoxy

| Example | Aryl amine | Carbon black product Surface Area m2/g | Carbon black product DBPA ml/100 g | Treatment Level, µmol/g CB | Cl Analysis µmol/g | N Analysis µmol/g | Fraction of bonded groups as % | Substituted phenyl groups µmol/g |
|---|---|---|---|---|---|---|---|---|
| 68 | 4-Chloro aniline | 230 | 64 | 300 | 196 | — | 65 | 196 |
| 69 | 4-Chloro-3-methyl aniline | 230 | 64 | 300 | 215 | — | 72 | 215 |
| 70 | 4-Chloro-2-methyl aniline | 230 | 64 | 300 | 170 | — | 57 | 170 |
| 71 | 4-Chloro-3-nitro aniline | 230 | 64 | 300 | 209 | — | 70 | 209 |
| 72 | 4-Chloro-2-nitro aniline | 230 | 64 | 300 | 123 | — | 41 | 123 |
| 73 | Sodium 3 Amino 6-chloro benzene sulfonate | 230 | 64 | 300 | 64 | — | 21 | 64 |
| 74 | 3-Amino Pyridine | 350* | 120 | 580 | — | 461 | 79 | 461 |
| 75 | 4-Amino benzonitrile | 230 | 70 | 300 | — | 263 | 88 | 263 |
| 76 | 4-Bromo-2-chloro aniline | 230 | 70 | 407 | 264 | — | 65 | 264 |

*CTAB Surface area groups. A carbon black with a surface area of 230 m2/g and a DBPA of 70 ml/100 g was used. A solution of 4-bromobenzene diazonium nitrate was prepared in an ice bath from 0.69 g bromoaniline, 0.33 g $NaNO_2$, 0.86 g concentrated $HNO_3$ and ca. 3 ml of water. The diazonium solution was added to a suspension of 10 g carbon black product, 5 g chloroethanol and 85 g water that was stirring at room temperature. After stirring for 30 minutes, the carbon black product was removed by filtration, washed with THF, and dried in an oven at about 125° C. A sample that had been subjected to Soxhlet extraction overnight with THF contained 1.08% bromine and 0.16% chlorine. A control carbon black sample was prepared by stirring the same untreated carbon black in a 5.6% chloroethanol/water solution, washing with THF, drying and extracting with THF. The control contained 0.02% bromine and 0.082% chlorine. The carbon black product therefore had 0.13 mmol/g of attached bromophenyl groups and 0.022 mmol/g of attached chloroethoxy groups.

Example 80

Preparation of a Carbon Black Product

This example further illustrates the preparation of a carbon black product of the present invention. Concentrated HCl (16.2 g) was diluted with 40 g water and added to 9.30 g 4-aminophenyldisulfide. The mixture was stirred in an ice bath. A cold solution of 6.21 g $NaNO_2$ in 30 g water was added with stirring, keeping the mixture below 10° C. 4-Diazophenyl disulfide dichloride is formed. The mixture was added to a suspension of 250 g of pelleted carbon black (iodine number of 120 mg/g and a DBPA of 125 ml/100 g) in 1.3 L of water at 10° C. with stirring. Bubbles were released. After stirring for 2½ hours, the product is filtered, washed with ethanol, washed with additional water and then dried at 125° C. to a constant weight. A sample of the carbon black product that was extracted overnight with THF and dried contained 1.75% sulfur, compared to 1.08% for the untreated carbon black. Therefore, the carbon black product had 0.10 mmol/g of attached dithiodi-4,1-phenylene groups.

Example 81

Preparation of a Carbon Black Product

This example illustrates the preparation of a carbon black product of the present invention. Concentrated HCl (5.4 g) was diluted with 40 g water and added to 3.1 g 4-aminophenyldisulfide. The mixture was stirred in an ice bath, and 50 g additional cold water was added. A cold solution of 2.07 g $NaNO_2$ in 30 g water was added with stirring, keeping the mixture below 10° C. 4-Diazophenyl disulfide dichloride was formed. The mixture was added to a suspension of 125 g of pelleted carbon black (iodine number of 120 mg/g and a DBPA of 125 ml/100 g) in about 800 g of water at 10–15° C. with stirring. Bubbles were released. After stirring for 2 hours, the resulting carbon black product was filtered, washed with ethanol, washed with additional water and then dried at 125° C. to a constant weight. A sample of the carbon black product that was extracted overnight with THF and dried contained 1.56% sulfur, compared to 1.08% for the untreated carbon black. Therefore, the carbon black product had 0.075 mmol/g of attached dithiodi4,1-phenylene groups.

Example 82

Preparation of a Carbon Black Product

This example further illustrates the preparation of a carbon black product of the present invention. A pelleted carbon black with an iodine number of 120 mg/g and a DBPA of 125 ml/100 g was used. Butyl lithium (50 mL of a 1.0 M solution in hexane) was added to 200 mL of dry DMSO under nitrogen. A solution of 11.1 g of 4-aminophenyl disulfide in 100 mL dry DMSO was prepared and added under nitrogen with cooling from an ice bath. A dark violet colored developed. $S_2Cl_2$ (3.3 mL) was added over 10 minutes with stirring and continued cooling. A solution of 1.7 g NaOH in water was added. After addition of more water, the product was extracted with 450 mL of ether. The ether was removed under vacuum, and the residue was dissolved in $CH_2Cl_2$, washed with water, dried and concentrated under vacuum to give 4-aminophenyltetrasulfide as an oil.

4-Aminophenyl tetrasulfide (5.85 g) was stirred with 150 g of water in an ice bath. A cold solution of 8.1 g concentrated HCl in 50 g water was added, followed gradually by a solution of 3.2 g $NaNO_2$ in 40 g water, forming 4-diazophenyl tetrasulfide dichloride. After stirring, the resulting suspension was added to a stirring slurry of 125 g of the pelleted carbon black in about 800 g of water. Bubbles were released. After stirring for 2½ hours, the resulting carbon black product was filtered off, washed with ethanol, washed with water and dried at 140° C. A sample of the carbon black product that had been extracted with THF overnight and dried contained 1.97% sulfur, compared to 1.08% for the untreated black. Therefore, the carbon black product had 0.07 mmol/g of attached tetrathiodi-4,1-phenylene groups.

Example 83

Preparation of a Carbon Black Product

This example illustrates the preparation of a carbon black product of the present invention. A carbon black with an iodine number of 120 mg/g and a DBPA of 125 ml/100 g was used. A cold solution of 2.65 g concentrated HCl and 30 g water was added to a mixture of 2.85 g 4-aminophenyl phenyl disulfide in 50 g water that was stirring in an ice bath. A cold solution of 1.04 g $NaNO_2$ in 30 g of water was added over a period of 10 minutes. 4-Diazophenyl phenyl disulfide chloride was formed. The diazonium suspension was added to a suspension of 122 g carbon black in about 800 g water that was stirring at 15° C. Bubbles were released. After stirring for about two hours, the carbon black product was filtered off, washed with isopropanol, washed with water, and dried in an oven at about 125° C. A sample of the carbon black product that had been subjected to Soxhlet extraction overnight with THF and dried had a sulfur content of 1.32%, compared to 1.08% for the untreated carbon black. Therefore, the carbon black product had 0.038 mmol/g of attached phenyldithiophenylene groups.

Example 84

Preparation of a Carbon Black Product

This example further illustrates the preparation of a carbon black product of the present invention. Nitrogen dioxide (4.1 g) was bubbled into 40 g water that was cooled in an ice bath. The resulting solution was added slowly to a cold (10° C.), stirring suspension of 4.65 g of 4-aminophenyl disulfide in 100 g water. The resulting solution of 4-diazophenyl disulfide dinitrate was added to a cold stirring suspension of 125 g of carbon black (iodine number of 120 mg/g and a DBPA of 125 ml/100 g) in 800 g cold (12–14° C.) water. The reaction mixture was stirred for 3 days, and allowed to warm to room temperature in the process. The resulting carbon black product was recovered by filtration and was dried. A sample of the carbon black product extracted with THF overnight had 1.81% sulfur, compared to 1.07% sulfur in the untreated carbon black product. Therefore, the carbon black product had 0.12 mmol/g of attached dithiodi-4,1-phenylene groups.

Example 85

Preparation of a Carbon Black Product

This example further illustrates the preparation of a carbon black product of the present invention. The procedure of Example 80 was followed, except that a carbon black with an iodine number of 90 mg/g and a DBPA of 114 ml/100 g was used, and except that an additional 50 ml of water was used to form the aminophenyl disulfide dihydrochloride suspension. A sample of the resulting carbon black product that had been extracted overnight with THF and dried contained 2.12% sulfur, compared to 1.45% for the untreated carbon black. Therefore, the carbon black product had 0.10 mmol/g of attached dithiodi-4,1-phenylene groups.

Example 86

Preparation of a Carbon Black Product

This example illustrates the preparation of a carbon black product of the present invention. A carbon black with an iodine number of 120 mg/g and a DBPA of 125 ml/100 g was used. A cold solution of 4-diazo-2-chlorophenyl disulfide dichloride was prepared by adding a cold solution of 3.59 g of $NaNO_2$ in 40 g water to a suspension of 6.6 g 4-amino-2-chlorophenyl disulfide, 9.12 g concentrated HCl and about 150 g water that was stirring in an ice bath. After stirring for five minutes, the diazonium solution was then added to a stirred suspension of 140 g of carbon black in 1 liter of water at 10–14° C. After stirring for two hours, the resulting carbon black product was filtered off, washed with ethanol, washed with water, and then dried in an oven at 125° C. A sample of the carbon black product that was subjected to Soxhlet extraction overnight with THF and dried had a sulfur content of 1.60%, compared to 1.08% for the untreated carbon black. Therefore, the carbon black product had 0.081 mmol/g of attached dithiodi-4,1-(3-chlorophenylene) groups.

Example 87

Preparation of a Carbon Black Product With a Diazonium Salt Generated in Situ

This example illustrates the preparation of a carbon black product of the present invention with a diazonium salt that is generated in situ. A carbon black with an iodine number of 120 mg/g and a DBPA of 125 ml/100 g was used. 4-Aminophenyl disulfide (8.38 g) was dissolved in a solution of 14.65 g of concentrated HCl and about 150 g of water, and added to a stirred slurry of 225 g of carbon black in about 1.4 L of water. A solution of 5.28 g $NaNO_2$ in about 50 g water was added, forming 4-diazophenyl disulfide in situ, which reacted with the carbon black. After stirring for two hours, the resulting carbon black product was removed by filtration, washed with ethanol, washed with water, and dried at about 125° C. A sample of the carbon black product that had been subjected to Soxhlet extraction overnight with THF and dried contained 1.89% sulfur, compared against 1.08% for the untreated carbon black. Therefore, the carbon black product had 0.13 mmol/g of attached dithiodi-4,1-phenylene groups.

Example 88

Preparation of a Carbon Black Product

A carbon black product having attached dithiodi-4,1-phenylene groups was prepared by following the method of Example 80 and using a suspension of 8.38 g 4-aminophenyl disulfide in about 100 g of water, a solution of 13.65 g concentrated HCl in 40 g of water, a solution of 5.04 g $NaNO_2$ in 30 g of water, and a slurry of 225 g of the same carbon black in 1.4 L of water. The carbon black slurry was stirred at 10–14° C. when the diazonium solution was added.

Examples 89 and 90

Comparative Carbon Black Products

In these comparative examples, the carbon blacks used in Examples 80 and 85 were washed with water, ethanol and water, and subsequently dried to give the comparative carbon black products of Examples 88 and 89, respectively.

Examples 91–99

Use of Different Carbon Blacks for the Preparation of Carbon Black Products That are Water Dispersible This example shows the use of a variety of carbon blacks in the preparation of carbon black products of the present invention. This example also shows that the carbon black products were more readily dispersible in water than the corresponding unreacted carbon blacks. Sulfanilic acid was dissolved in 200 g of hot water. The carbon black product (30 g) was added and the mixture was allowed to cool to 25 to 30° C. Concentrated HCl was added (2.15 equivalents based on the sulfanilic acid used) and then a 9.65M solution of $NaNO_2$ in water was added (1.2 equivalents based on the sulfanilic acid used), forming 4-sulfobenzenediazonium hydroxide in situ, which reacted with the carbon black. After stirring for 30 minutes, the resulting dispersion was dried in an oven at 100° C., giving the resulting carbon black product.

| Example | Original Carbon Black Surface Area m2/g | Original Carbon black product DBPA ml/100 g | Sulfanilic acid g | Residue of a carbon black product, % | Residue of untreated carbon black product, % |
|---|---|---|---|---|---|
| 91 | 350** | 120 | 6.98 | 1.0 | 97 |
| 92 | 140 | 114 | 3.03 | 0.6* | 45 |
| 93 | 1500 | 330 | 32.55 | 0.6* | 35 |
| 94 | 42 | 121 | 0.91 | 0.1 | 26 |
| 95 | 80 | 85 | 1.73 | <0.1 | 81 |
| 96 | 24 | 132 | 0.44 | 4.6 | 31 |
| 97 | 24 | 132 | 1.50 | 0.2 | 31 |
| 98 | 254 | 178 | 5.43 | <0.1 | 23 |
| 99 | 18 | 39 | 0.93 | 4.4 | 40 |

*Filtered through a 20 micron filter.
**CTAB surface area

Example 100

Preparation of a Carbon Black Product and its Use in the Preparation of Black Paper This example shows the preparation of a carbon black product of the present invention and the use of that product in the preparation of black paper. A carbon black (300 g) with a surface area of 80 m2/g and a DBPA of 85 ml/100 g was added to a pin pelletizer with 18.2 g of sulfanilic acid. After mixing briefly, 150 g of water, 11.2 g of concentrated nitric acid, 30 g of water and a solution of 8.78 g of NaNO2 in 35 g of water were added in succession with 15 seconds of mixing after each addition. 4-Sulfobenzenediazonium hydroxide inner salt was formed in situ and it reacted with the carbon black. The resulting carbon black product was dried in an oven at 125° C. A dispersion of this carbon black product was prepared by dispersing it in water in a laboratory homogenizer for 30 seconds.

A comparative dispersion was made by grinding 200 g of the same unreacted carbon black in a solution of 7 g of a lignosulfonate dipsersant, 5 ml concentrated $NH_4OH$ and 770 g water with grinding media in a ball mill for 4 hours, at which point a Hegman gauge reading of 7 was obtained.

Penobscott bleached hardwood kraft pulp (160 g) and St. Felician bleached softwood kraft pulp (240 g) were dispersed in water in a Cowles dissolver. The stock solution was transferred into a TAPPI standard laboratory beater and diluted to a volume of 23 liters. The stock solution was circulated in the beater for five minutes, and then placed under load and beaten for 50 minutes to a corrected Canadian Standard Freeness of 355 ml.

Sufficient pulp to make three 2.75 g hand sheets was diluted to 3 L, and the appropriate amount of carbon black dispersion was incorporated. A suspension was prepared for each carbon black loading level. Each suspension was divided into three portions. The first portion was used as is. Rosin and alum were added to the second portion at the rates of 80 pounds and 60 pounds per bone dry ton, respectively. HERCON 79 (AKD) size and BL 535 retention aid were added to the third portion at the rates of four pounds and three pounds per bone dry ton, respectively. One 8"×8" Noble & Wood handsheet was made from each sample. The resulting handsheets were evaluated for TAPPI brightness using 45°/0° geometry.

HERCON is a registered trademark for sizes produced and sold by Hercules Inc., Wilmington Del. BL 535 is available from Buckman Laboratories, Inc., Memphis Tenn.

The following table shows the brightness of handsheets made with the carbon black product dispersion and with the control dispersion. These data show that the carbon black product can be used to color paper. These data also show that when the paper was made with an acidic rosin size and an alum retention aid, the carbon black product was retained more efficiently and advantageously at low loading levels when compared against the unreacted carbon black. These data further show that when the paper was made with an alkaline AKD size and BL 535 retention aid, the carbon black product was retained more efficiently and advantageously at low loading levels when compared against the unreacted carbon black.

| Carbon black product, pounds per bone dry ton | None | AKD | Alum | Brightness, Treated carbon black product | | Brightness, Untreated carbon black product | |
|---|---|---|---|---|---|---|---|
| 10 | X | | | 67 | 69 | 46 | 50 |
| 15 | X | | | 67 | 67 | 43 | 50 |
| 25 | X | | | 59 | 61 | 34 | 41 |
| 50 | X | | | 44 | 47 | 18 | 24 |

-continued

| Carbon black product, pounds per bone dry ton | None | AKD | Alum | Brightness, Treated carbon black product | | Brightness, Untreated carbon black product | |
|---|---|---|---|---|---|---|---|
| 100 | X | | | 33 | 36 | 9 | 13 |
| 200 | X | | | 20 | 23 | 0 | 5 |
| 10 | | X | | 16 | 18 | 21 | 23 |
| 15 | | X | | 12 | 13 | 19 | 21 |
| 25 | | X | | 11 | 13 | 14 | 16 |
| 50 | | X | | 7 | 8 | 10 | 11 |
| 100 | | X | | 7 | 7 | 7 | 8 |
| 200 | | X | | 4 | 5 | 5 | 5 |
| 10 | | | X | 16 | 20 | 22 | 24 |
| 15 | | | X | 13 | 16 | 19 | 21 |
| 25 | | | X | 11 | 12 | 13 | 14 |
| 50 | | | X | 8 | 10 | 9 | 11 |
| 100 | | | X | 7 | 9 | 6 | 7 |
| 200 | | | X | 6 | 8 | 4 | 5 |

Example 101

Use of a Carbon Black Product in the Preparation of an Aqueous Ink

This example illustrates the advantages of using a carbon black product of the present invention in an aqueous ink formulation. Ink composition A was prepared by adding 3.13 parts of the carbon black product of Example 13 to a vehicle made by mixing 2.92 parts JONCRYL 61LV resin, 0.21 parts isopropanol, 0.31 parts ARROWFLEX defoamer, 7.29 parts JONCRYL 89 resin and 6.98 parts water, and shaking the composition for 10 minutes on a paint shaker. The table below shows the 635 mesh residue level.

JONCRYL is a registered trademark for resins produced and sold by S C Johnson Polymer, Racine, Wis. ARROWFLEX is a registered trademark for defoamers produced and sold by Witco, New York, N.Y.

Ink composition B was prepared by grinding a mixture of 120 parts of the carbon black product used in Example 13, 112 parts of JONCRYL 61LV resin, 8 parts of isopropanol, 4 parts of ARROWFLEX defoamer, 156 parts of water and 400 g of grinding media. In order to check the grind level, samples were periodically let down to composition C that contained 15.0 parts carbon black product, 14.0 parts JONCRYL 61LV resin, 1.0 parts isopropanol, 1.7 parts ARROWFLEX DEFOAMER, 35.1 parts Joncryl 89 and 33.4 parts water.

Ink composition D was prepared by grinding a mixture of 120 parts of the untreated carbon black used in Example 13, 112 parts of JONCRYL 61LV resin, 8 parts of isopropanol, 4 parts of ARROWFELX defoamer, 156 parts of water and 400 g of grinding media. In order to check the grind level, samples were periodically let down to composition E that contained 15.0 parts carbon black product, 14.0 parts JONCRYL 61LV resin, 1.0 parts isopropanol, 1.7 parts ARROWFLEX defoamer, 35.1 parts JONCRYL 89 resin and 33.4 parts water.

The residues from ink compositions A, C and E as a function of grinding time are provided in the following table, and clearly show that a carbon black product of the present invention disperses more readily than the corresponding unreacted carbon black in these aqueous inks.

| Dispersion time | Ink A 635 Mesh Residue, % | Ink C 635 Mesh Residue, % | Ink E 635 Mesh Residue, % |
|---|---|---|---|
| 10 Minutes shaking | 2.6 | — | — |
| 20 Minutes Ball Mill | — | 0.3 | — |
| 40 Minutes Ball Mill | — | 0.2 | — |
| 1 Hour Ball Mill | — | 0.02 | about 100 |
| 2 Hours Ball Mill | — | — | 10.8 |
| 3 Hours Ball Mill | — | — | 5.8 |
| 4 Hours Ball Mill | — | — | 0.9 |
| 10 Hours Ball Mill | — | — | 0.5 |
| 14 Hours Ball Mill | — | — | 0.3 |
| 15 Hours Ball Mill | — | — | 1.0 |
| 16 Hours Ball Mill | — | — | 1.0 |
| 14 Hours Ball Mill | — | — | 0.3 |
| 15 Hours Ball Mill | — | — | 1.0 |
| 16 Hours Ball Mill | — | — | 1.0 |

Example 102

Use of a Carbon Black Product in the Preparation of an Aqueous Coating

This example shows that carbon black products of the present invention are useful for the preparation of aqueous coatings. The carbon black product from Example 9 (10 g) was dispersed in 90 g of water by stirring for 10 minutes. Coating composition A was prepared by stirring 4.3 g of this dispersion into a mixture of 7.53 g of CARGILL 17-7240 acrylic resin, 0.80 g of dimethylethanolamine (DMEA), 19.57 g water, 0.37 g SURFYNOL CT136 surfactant, 1.32 g CARGILL 23-2347 melamine resin, 0.53 g ethylene glycol monobutyl ether and 0.075 g BYK-306 surfactant. CARGILL 17-7240 acrylic resin and CARGILL 23-2347 melamine resin are available from Cargill Inc., Minneapolis, Minn. SURFYNOL CT136 is a registered trademark for surfactants produced and sold by Air Products and Chemicals, Inc., Allentown, Pa. BYK-306 is a registered trademark for surfactants produced and sold by BYK-Chemie USA, Wallingford.

A millbase was prepared by grinding an oxidized carbon black product (15 g) with a surface area of 560 m2/g, a DBPA of 80 ml/100 g and a volatile content of 9% in a mixture of 74.6 g of CARGILL 17-7240 acrylic resin, 9.53 g DMEA, 236.5 g water and 16.35 g CT-136 surfactant until its mean volume particle size was 0.18 microns. Comparative coating composition B was prepared by mixing 24.4 g of this millbase with a mixture of 17.51 g CARGILL 17-7240 acrylic resin, 1.74 g DMEA, 50.56 g water, 3.97 g CARGILL 23-2347 melamine resin, 1.59 g ethylene glycol monobutyl ether and 0.23 g BYK-306 surfactant. Glossy lenetta paper coated with compositions A and B was dried at 350° F. for 10 minutes. A clear coat was applied, and the samples were dried again. The paper coated with composition A had Hunter L,a,b values of 1.0, 0.01 and 0.03, respectively, compared to 1.1, 0.01 and −0.06, respectively for the paper coated with comparative composition B.

Example 103

Preparation of a Carbon Black Product and its Use in an Aqueous Coating

This example illustrates the preparation of a carbon black product of the present invention and the use of this carbon black product in an aqueous coating. A carbon black (200 g) with a CTAB surface area of 350 m2/g and a DBPA of 120 ml/100 g was added to a stirred solution of 42.4 g sulfanilic acid in 2800 g of water. Nitrogen dioxide (25.5 g) was dissolved in 100 g of cold water and added to the carbon black product suspension. Bubbles were released. 4-Sulfobenzenediazonium hydroxide inner salt was formed in situ, which reacted with the carbon black. After stirring for one hour, 5 g of additional $NO_2$ was added directly to the carbon black dispersion. The dispersion was stirred for an additional 15 minutes, and left overnight. The resulting carbon black product was recovered by drying the dispersion in an oven at 130° C.

A dispersion of this carbon black product was prepared by stirring 10 g of the carbon black product in 90 g of water. Coating composition C was prepared by stirring 4.3 g of this dispersion into a mixture of 7.53 g of CARGILL 17-7240 acrylic resin, 0.80 g of DMEA, 19.57 g water, 0.37 g SURFYNOL CT136 surfactant, 1.32 g CARGILL 23-2347 melamine resin, 0.53 g ethylene glycol monobutyl ether and 0.075 g BYK-306 surfactant.

A millbase was prepared by grinding (in an attritor) an oxidized carbon black product (15 g) with a surface area of 560 m2/g, a DBPA of 91 ml/100 g and a volatile content of 9.5% in a mixture of 74.6 g of CARGILL 17-7240 acrylic resin, 9.53 g DMEA, 236.5 g water and 16.35 g SURFYNOL CT-136 surfactant for 24 hours. Comparative coating composition D was prepared by mixing 24.4 g of this millbase with a mixture of 17.51 g CARGILL 17-7240 acrylic resin, 1.74 g DMEA, 50.56 g water, 3.97 g CARGILL 23-2347 melamine resin, 1.59 g ethylene glycol monobutyl ether and 0.23 g BYK-306 surfactant.

Glossy lenetta paper coated with compositions A and B was dried at 350° F. for 10 minutes. A clear coat was applied, and the samples were dried again. The paper coated with composition C had Hunter L, a, and b values of 1.0, 0.01 and 0.03, respectively, compared to 1.1, 0.01 and −0.06, respectively for the paper coated with comparative composition D.

Examples 104–108

Use of Carbon Black Products in Rubber Formulations

This example illustrates the use of the carbon black products of examples 80 to 84 and the comparative example 89 in rubber formulations. The polymer is milled in a Brabender mixer for 1 minute at 100° C. A mixture of ZnO and the carbon black product was added and mixed for 2 additional minutes. The stearic acid and FLEXZONE 7P anti-degradant were added and mixed for 2 additional minutes. The sample was dumped, cooled and mixed at 80° C. for 1 minute, the curatives were added, and the mixing was continued for an additional minute. The sample was then passed through a two roll mill three times. The recipes and performance data in each case are given in the tables below. NS 114 is a chemically modified tin coupled solution SBR available from Nippon Zeon, Japan. FLEXZONE is a registered trademark for antidegradant products available from Uniroyal Chemical, Naugatuck, Conn.

| Example | 104 | 105 | 106 | 107 | 108 | Comparative |
|---|---|---|---|---|---|---|
| NS 114 | 100 | 100 | 100 | 100 | 100 | 100 |
| CB Product Example 80 | 50 | | | | | |
| CB Product Example 81 | | 50 | | | | |
| CB Product | | | 50 | | | |

-continued

| Example | 104 | 105 | 106 | 107 | 108 | Comparative |
|---|---|---|---|---|---|---|
| Example 82 CB Product | | | 50 | | | |
| Example 83 CB Product | | | | 50 | | |
| Example 84 Control CB | | | | | 50 | |
| Example 89 | | | | | | |
| ZnO | 3 | 3 | 3 | 3 | 3 | 3 |
| Stearic Acid | 2 | 2 | 2 | 2 | 2 | 2 |
| FLEXZONE 7P product | 1 | 1 | 1 | 1 | 1 | 1 |
| CBS* | 1.25 | 1.25 | 1.25 | 1.25 | 1.25 | 1.25 |
| MBT** | 0.2 | 0.2 | 0.2 | 0.2 | 0.2 | 0.2 |
| Sulfur | 1.75 | 1.75 | 1.75 | 1.75 | 1.75 | 1.75 |
| Total | 159.2 | 159.2 | 159.2 | 159.2 | 159.2 | 159.2 |

*CBS = cyclohexylbenzothiazylsulfenamide
**MBT = mercaptobenzothiazole

| | 100% Modulus Mpa | 300% Modulus Mpa | Tensile Mpa | Elong. % | Hardness Shore A | Bound rubber % | Tan δ 0° C. | Tan δ 70° C. | Abrader index 14% slip | Abrader index 21% slip |
|---|---|---|---|---|---|---|---|---|---|---|
| Example 104 | 4.18 | — | 19.5 | 290 | 60 | 44.5 | 0.244 | 0.114 | 122 | 142 |
| Example 105 | 3.93 | — | 16.7 | 274 | 60 | 39.6 | 0.265 | 0.137 | 114 | 141 |
| Example 106 | 4.33 | 19.1 | 20.9 | 314 | 61 | 35.2 | 0.277 | 0.131 | 110 | 132 |
| Example 107 | 3.44 | 15.2 | 19.6 | 372 | 61 | 30.8 | 0.304 | 0.170 | 103 | 105 |
| Example 108 | 3.67 | 17.6 | 19.6 | 335 | 60 | 40.9 | 0.251 | 0.122 | 113 | 129 |
| Comparative | 3.25 | 14.1 | 18.4 | 385 | 60 | 28.1 | 0.327 | 0.173 | 100 | 100 |

These data show that carbon black products of the present invention are useful in rubber formulations. They further show that significant increases in modulus, bound rubber and abrasion resistance are obtained, as are significant decreases in Tan δ. The magnitude of the effect depends on the treatment level as well as on the specific groups attached to the carbon black product.

Examples 109–112

Use of a Carbon Black Product in Rubber Formulations

This example illustrates the use of a carbon black product of the present invention in several different rubber formulations. Rubber compounds were prepared from the carbon black product of Example 85 and of the comparative carbon black product of Example 90 by the method described for examples 104–108 using the recipes below. DURADENE 715 is a solution SBR. DURADENE is a registered trademark for SBR products available from Firestone, Akron Ohio.

| Example | 109 | Comparative | 110 | Comparative | 111 | Comparative | 112 | Comparative |
|---|---|---|---|---|---|---|---|---|
| SBR 1500 | 100 | 100 | | | | | | |
| Duradene 715 | | | 100 | 100 | | | 50 | 50 |
| NR | | | | | 100 | 100 | 50 | 50 |
| CB Product Example 85 | 50 | | 50 | | 50 | | 50 | |
| Control CB Example 90 | | 50 | | 50 | | 50 | | 50 |
| ZnO | 3 | 3 | 3 | 3 | 4 | 4 | 3 | 3 |
| Stearic Acid | 2 | 2 | 2 | 2 | 2 | 2 | 2 | 2 |
| Flexzone 7P | 1 | 1 | 1 | 1 | 1 | 1 | 1 | 1 |
| CBS | 1.25 | 1.25 | 1.25 | 1 | 1 | 1 | 1.25 | 1.25 |
| MBT | 0.2 | 0.2 | 0.2 | 0.2 | | | | |
| Sulfur | 1.75 | 1.75 | 1.75 | 1.75 | 1.5 | 1.5 | 1.5 | 1.5 |
| Total | 159.2 | 159.2 | 159.2 | 159.2 | 159.5 | 159.5 | 158.75 | 158.75 |

The performance data in the table below show that carbon black products according to the invention are useful in several different rubber formulations.

| | 100% Modulus Mpa | 300% Modulus Mpa | Tensile Mpa | Elong. % | Hardness Shore A | Bound rubber % | Tan δ 0 C. | Tan δ 70 C. | Abrader index 14% slip | Abrader index 21% slip |
|---|---|---|---|---|---|---|---|---|---|---|
| Example 109 | 4.12 | 19.3 | 21.9 | 338 | 60 | 29.8 | 0.241 | 0.155 | 84 | 117 |
| Comparative | 3.70 | 17.3 | 23.0 | 393 | 62 | 28.0 | 0.280 | 0.182 | 100 | 100 |
| Example 110 | 4.79 | — | 14.4 | 233 | 63 | 32.4 | 0.477 | 0.146 | 81 | 175 |
| Comparative | 4.10 | — | 16.3 | 282 | 61 | 28.6 | 0.544 | 0.173 | 100 | 100 |
| Example 111 | 3.32 | 15.1 | 24.4 | 456 | 55 | 39.1 | 0.221 | 0.142 | 98 | 135 |
| Comparative | 3.48 | 17.1 | 27.3 | 468 | 57 | 43.6 | 0.240 | 0.138 | 100 | 100 |
| Example 112 | 3.77 | 15.7 | 19.0 | 358 | 58 | 33.3 | 0.296 | 0.156 | 100 | 176 |
| Comparative | 3.39 | 15.4 | 23.3 | 441 | 58 | 35.1 | 0.335 | 0.175 | 100 | 100 |

Example 113

Use of Treated Carbon Black in a Rubber Formulation

This example illustrates the use of a treated carbon black of the present invention in a rubber formulation. Rubber compounds were prepared from the treated carbon black of example 86 and the comparative carbon black of example 89 by the method described in examples 104–108. The formulations and performance data are shown in the following tables. These results show that the treated carbon black is useful in this rubber formulation. NS 116 is a chemically modified tin coupled solution SBR and is available from Nippon Zeon, Japan.

| Example | 113 | Comparative |
|---|---|---|
| NS 116 | 100 | 100 |
| CB Product Example 86 | 50 | |
| Control CB Example 89 | | 50 |
| ZnO | 3 | 3 |
| Stearic Acid | 2 | 2 |
| FLEXZONE 7P product | 1 | 1 |
| CBS | 1.25 | 1.25 |
| MBT | 0.2 | 0.2 |
| Sulfur | 1.75 | 1.75 |
| Total | 159.2 | 159.2 |

Example 114

Use of a Carbon Black Product in a Rubber Formulation

This example illustrates the use of a carbon black product of the present invention in a rubber formulation. Rubber compounds were prepared from the carbon black product of Example 87 and the comparative carbon black of Example 89 by the method described in Examples 104–108. The formulations and performance data are shown in the following tables. These results show that the carbon black product is useful in this rubber formulation.

| Example | 113 | Comparative |
|---|---|---|
| NS 116 | 100 | 100 |
| CB Product Example 87 | 50 | |
| Control CB Example 89 | | 50 |
| ZnO | 3 | 3 |
| Stearic Acid | 2 | 2 |
| FLEXZONE 7P product | 1 | 1 |
| CBS | 1.25 | 1.25 |
| MBT | 0.2 | 0.2 |
| Sulfur | 1.75 | 1.75 |
| Total | 159.2 | 159.2 |

| | 100% Modulus Mpa | 300% Modulus Mpa | Tensile Mpa | Elong. % | Hardness Shore A | Bound rubber % | Tan δ 0 C. | Tan δ 70 C. | Abrader index 14% slip | Abrader index 21% slip |
|---|---|---|---|---|---|---|---|---|---|---|
| Example 113 | 4.46 | 17.3 | 18.3 | 316 | 64 | 28.0 | 0.787 | 0.190 | 72 | 110 |
| Comparative | 4.12 | 16.7 | 21.2 | 367 | 63 | 26.2 | 0.818 | 0.219 | 100 | 100 |

|  | 100% Modulus Mpa | 300% Modulus Mpa | Tensile Mpa | Elong. % | Hardness Shore A | Bound rubber % | Tan δ 0 C. | Tan δ 70 C. | Abrader index 14% slip | Abrader index 21% slip |
|---|---|---|---|---|---|---|---|---|---|---|
| Example 114 | 5.04 | — | 16.6 | 242 | 60 | 39.0 | 0.816 | 0.145 | 88 | 137 |
| Comparative | 4.12 | 16.7 | 21.2 | 367 | 63 | 26.2 | 0.818 | 0.219 | 100 | 100 |

Examples 115–116

Use of Carbon Black Product in Rubber Formulations

These examples illustrate the use of a carbon black product of the present invention in two rubber formulations that are peroxide cured. Rubber compounds were prepared from the carbon black product of Example 88 and from an untreated comparative carbon black with an iodine number of 120 mg/g and a DBPA of 125 ml/100 g. The method described in Examples 104–108 was used with the recipies below.

| Example | 115 | Comparative | 116 | Comparative |
|---|---|---|---|---|
| NS-114 | 100 | 100 |  |  |
| Duradene 715 |  |  | 100 | 100 |
| CB Product Example 88 | 50 |  | 50 |  |
| Control CB |  | 50 |  | 50 |
| ZnO | 3 | 3 | 3 | 3 |
| Stearic Acid | 2 | 2 | 2 | 2 |
| Flexzone 7P | 1 | 1 | 1 | 1 |
| Dicumyl peroxide | 2 | 2 | 2 | 2 |
| Total | 158 | 158 | 158 | 158 |

The performance data in the table below show that this carbon black product is useful in rubber formulations using a peroxide cure.

Example 117

Use of a Carbon Black Product to Color Textiles

This example illustrates the use of a carbon black of the present invention to color textiles. Samples of textiles were placed for the time indicated below in a stirring dispersion of the carbon black product of Example 16 having attached $C_6H_4SO_3-$ groups at the indicated concentrations at 100° C. The pH was adjusted as shown. The samples were removed, allowed to drain briefly, and posttreated by placing for about 30 seconds in hot water, a hot 1 M solution of NaCl or a hot 0.015 M solution of $Al_2(SO_4)_3$. When the pH of the carbon dispersion was adjusted, the pH of the NaCl and $Al_2(SO_4)_3$ posttreatment solutions were adjusted to match. The samples were then washed with water and dried. The L values below show that the textiles were effectively colored with the carbon black product. Lower L values represent darker materials.

| Textile | Carbon conc. M | pH | Time Min. | Post treatment H2O | Post treatment NaCl | Post treatment Al2(SO4)3 | Hunter L |
|---|---|---|---|---|---|---|---|
| Cotton | 0.1 | A | 15 |  |  | X | 34.1 |
| Cotton | 0.1 | A | 45 | X |  |  | 33.6 |
| Cotton | 0.1 | A | 45 |  | X |  | 30.3 |
| Cotton | 0.1 | A | 45 |  |  | X | 29.1 |
| Cotton | 0.01 | A | 45 |  |  | X | 67.4 |
| Linen | 0.1 | A | 45 | X |  |  | 43.2 |
| Linen | 0.1 | A | 45 |  | X |  | 37.3 |
| Linen | 0.1 | A | 45 |  |  | X | 37.8 |
| Wool | 0.1 | 3.5 | 15 |  |  | X | 22.2 |
| Wool | 0.1 | 3.5 | 45 | X |  |  | 18.6 |
| Wool | 0.1 | 3.5 | 45 |  | X |  | 20.0 |

|  | 100% Modulus Mpa | 300% Modulus Mpa | Tensile Mpa | Elong. % | Hardness Shore A | Bound rubber % | Tan δ 0 C. | Tan δ 70 C. | Abrader index 14% slip | Abrader index 21% slip |
|---|---|---|---|---|---|---|---|---|---|---|
| Example 115 | 3.66 | 10.4 | 23.9 | 356 | 61 | 3.3 | 0.208 | 0.119 | 98 | 101 |
| Comparative | 2.94 | 8.1 | 21.8 | 398 | 62 | 18 | 0.284 | 0.156 | 100 | 100 |
| Example 116 | 5.11 | 11.5 | 13.9 | 233 | 67 | 17.5 | 0.299 | 0.152 | 65 | 74 |
| Comparative | 4.07 | 11.3 | 20.3 | 321 | 61 | 22.1 | 0.343 | 0.180 | 100 | 100 |

-continued

| Textile | Carbon conc. M | pH | Time Min. | H2O | NaCl | Al2(SO4)3 | Hunter L |
|---|---|---|---|---|---|---|---|
| Wool | 0.1 | 3.5 | 45 | | | X | 17.8 |
| Wool | 0.1 | 5.5 | 45 | | | X | 28.0 |
| Silk | 0.1 | 5.5 | 15 | | | X | 34.9 |
| Silk | 0.1 | 5.5 | 45 | X | | | 34.9 |
| Silk | 0.1 | 5.5 | 45 | | X | | 41.4 |
| Silk | 0.1 | 5.5 | 45 | | | X | 22.2 |
| Polyester | 0.1 | A | 45 | | | X | 45.1 |
| Nylon | 0.1 | 3.5 | 15 | | | X | 41.6 |
| Nylon | 0.1 | 3.5 | 45 | X | | | 35.3 |
| Nylon | 0.1 | 3.5 | 45 | | X | | 35.4 |
| Nylon | 0.1 | 3.5 | 45 | | | X | 27.8 |
| Nylon | 0.1 | 5.5 | 45 | | | X | 34.8 |

A: pH not adjusted

CARBON BLACK PRODUCTS

Example 118

This example further illustrates the in situ preparation of a carbon black product of the present invention. A carbon black with an iodine number of 120 mg/g and a DBPA of 125 mL/100 g was used.

4-aminophenyl-2-benzothiazolyl disulfide was prepared according to the method described in Brzezinska, E.; Ternay, Jr., A. L. J. Org. Chem. 1994, vol. 59, pp. 8239–8244. 4-aminophenyl-2-benzothiazolyl disulfide (9.79 g) was dissolved in 300 mL of ethanol at 75° C. and added to a stirred slurry containing 225 g of carbon black pellets in 1 liter of ethanol and 6.37 g of 70% nitric acid. To the resulting slurry was added a 10 mL solution of $NaNO_2$ (2.64 g). Gas was evolved. After stirring for 48 hours most of the ethanol had evaporated and the resulting carbon black product was collected washed with water and dried at 125° C. to a constant weight.

A sample of the carbon black product which had been extracted with THF overnight and dried contained 1.77% sulfur, compared to 1.12% for the untreated black. Therefore, the carbon black product had 0.07 mmol/g of attached -(4-$C_6H_4$)—S—S-(2-$C_7H_5NS$) groups.

Example 119

This example further illustrates the in situ preparation of a carbon black product of the present invention. A carbon black with an iodine number of 120 mg/g and a DBPA of 125 mL/100 g was used.

4-aminophenyl-2-benzothiazolyl disulfide (14.1 g) was prepared as in Example 118 and was dissolved in a solution consisting of 10.1 g of 37% HCl, 360 mL of water and 560 mL of acetone. The orange solution was then added to a stirred slurry of carbon black pellets in 0.8 liters of water and 1.2 liters of acetone. A solution of $NaNO_2$ (3.81 g) in 60 mL of water and 90 mL of acetone was added to the slurry in one portion. Gas was evolved. The slurry was stirred overnight and filtered to collect the carbon black product. The carbon black product was washed with water, collected by filtration and dried at 125° C. to a constant weight.

A sample of the carbon black product which had been extracted with THF overnight and dried contained 1.77% sulfur, compared to 1.09% for the untreated black. Therefore, the carbon black product had 0.07 mmol/g of attached -(4-$C_6H_4$)—S—S-(2-$C_7H_5NS$) groups.

Example 120

This example further illustrates the in situ preparation of a carbon black product of the present invention. A carbon black with an iodine number of 120 mg/g and a DBPA of 125 mL/100 g was used. 4-aminophenyl-4'-hydroxyphenyl disulfide was prepared as follows. 4-aminophenyl-2-benzothiazolyl disulfide (14.5 g) was dissolved in 325 mL of chloroform yielding an orange solution. Over the course of 30 minutes a solution of 4-hydroxythiophenol (6.78 g) in 60 mL of chloroform was added dropwise. After addition was complete, the reaction mixture was stirred overnight. The chloroform solution was extracted in a separatory funnel with a solution of 5.3 g of 37% HCl diluted in 200 mL of water. The aqueous layer was collected, neutralized with 5% NaOH, and extracted with ethyl acetate. The ethyl acetate layer was isolated, dried over $MgSO_4$ and filtered. Removal of the ethyl acetate gave 10.5 g of 4-aminophenyl-4'-hydroxyphenyl disulfide as a yellow oil.

To a stirred slurry of 4-aminophenyl-4'-hydroxyphenyl disulfide (8.13 g), prepared as described above, in 300 mL of water was added a solution of 6.99 g of 37% HCl in 75 mL of water. The resulting white suspension was added to a slurry of 225 g of carbon black pellets in 1.5 liters of water and the mixture stirred for 5 minutes. A solution of $NaNO_2$ (2.64 g) in 100 mL of water was added to the slurry. Gas was evolved. After stirring the slurry overnight, the carbon black product was isolated by filtration and washed with water. The carbon black product was then dried at 125° C. to constant weight.

A sample of the carbon black product which had been extracted with THF overnight and dried contained 1.67% sulfur, compared to 1.11% for the untreated black. Therefore, the carbon black product had 0.09 mmol/g of attached -(4-$C_6H_4$)—S—S-(4-$C_6H_4$)—OH groups.

Example 121

This example further illustrates the in situ preparation of a carbon black product of the present invention. A carbon black with an iodine number of 120 mg/g and a DBPA of 125 mL/100 g was used.

To a stirred slurry of 237 g of carbon black pellets in 1.4 liters of water was added a solution of 4.44 g of 4-aminothiophenol and 7.36 g of 37% HCl in 250 mL of water. To the resulting slurry was added a solution of $NaNO_2$ (2.78 g) in 75 mL of water. Gas was evolved. The slurry was stirred for 2.5 hours, filtered, and washed with water. The carbon black product was then dried at 125° C. to constant weight.

A sample of the carbon black product which had been extracted with THF overnight and dried contained 1.63% sulfur, compared to 1.11% for the untreated black. Therefore, the carbon black product had 0.15 mmol/g of attached -(4-$C_6H_4$)—SH groups.

Example 122

This example further illustrates the preparation of a carbon black product of the present invention. A carbon black with an iodine number of 120 mg/g and a DBPA of 125 mL/100 g was used.

To a stirred slurry of 6-amino-2-mercaptobenzothiazole (6.14 g) in 300 mL of water was added 6.99 g of 37% HCl in 75 mL of water. The resulting slurry was cooled to 10° C., and a similarly cooled solution of $NaNO_2$ (2.64 g) in 50 mL of water was added. The resulting orange slurry was stirred for 30 seconds then added to a stirred slurry of 225 g of carbon black pellets in 1.4 liters of water and 300 g of ice. Gas was evolved. The slurry was stirred for 2.5 hours and then filtered. The carbon black product was then washed with water and dried at 125° C. to a constant weight.

A sample of the carbon black product which had been extracted with THF overnight and dried contained 1.98% sulfur, compared to 1.11% for the untreated black. Therefore, the carbon black product had 0.135 mmol/g of attached -6-(2-$C_7H_4NS$)—SH groups.

Example 123

This example further illustrates the in situ preparation of a carbon black product of the present invention. A carbon black with an iodine number of 120 mg/g and a DBPA of 125 mL/100 g was used.

Bis[2-(4-aminophenyl)ethyl]disulfide was prepared as follows. To a refluxing solution of 4-nitrophenylethylbromide (23 g) in a mixture of 280 mL of methanol and 70 mL of water was added a solution of $Na_2S_2O_3.5H_2O$ (31 g) in 75 mL of water. A further 60 mL of water was then added to the reaction mixture. Refluxing conditions were continued for 5 hours. The resulting pale yellow solution was allowed to cool to room temperature. Methanol was removed from the solution on a rotary evaporator leaving a white crystalline aqueous slurry. Addition of 300 mL of water to the slurry yielded a slightly cloudy solution. To this aqueous solution of sodium 4-nitrophenylethylthiosulfate was added a solution of $Na_2S.9H_2O$ (120 g) in 300 mL of water. The reaction mixture rapidly grew cloudy and slightly yellow and, after several minutes of stirring, a white precipitate formed. This slurry was heated to reflux for 18 hours then cooled. An orange oil was present which was extracted with several portions of ethyl acetate. The ethyl acetate extracts were combined, dried over $MgSO_4$, and filtered. Removal of the ethyl acetate yielded 12 g of bis[2-(4-aminophenyl)ethyl] disulfide as an orange oil.

To a stirred slurry of bis[2-(4-aminophenyl)ethyl] disulfide (5.02 g), prepared as described above, in 200 mL of water was added a solution of 6.67 g of 37% HCl in 100 mL of water. After stirring for 20 minutes an orange solution was obtained and was added to a stirred slurry of carbon black pellets in 1 liter of water. To the resulting slurry was added a solution of $NaNO_2$ (2.46 g) in 100 mL of water. Gas was evolved. After stirring the slurry overnight, the carbon black product was filtered, washed with water, and dried at 125° C. to a constant weight.

A sample of the carbon black product which had been extracted with THF overnight and dried contained 1.81% sulfur, compared to 1.11% for the untreated black. Therefore, the carbon black product had 0.11 mmol/g of attached -(4-$C_6H_4$)—$CH_2CH_2$—S—S—$CH_2CH_2$-(4-$C_6H_4$)— groups.

Example 124

This example further illustrates the in situ preparation of a carbon black product of the present invention. A carbon black with an iodine number of 120 mg/g and a DBPA of 125 mL/ 100 g was used.

Bis[2-(4-aminophenyl)ethyl]trisulfide was prepared as follows. To a slurry of iron powder (28.4 g) in 300 mL of water at 100° C. in a 500 mL Erlenmeyer flask was added 1.42 g of $FeSO_4.7H_2O$. 4-nitrophenylethylthiosulfate (29 g), prepared according to the procedure outlined in Example 123, was added to the iron slurry in 1 gram portions over the course of 5 minutes while maintaining a temperature of 96–98° C. During the addition, the flask was manually shaken to ensure good mixing. After the addition of 4-nitrophenylethylthiosulfate was complete, a further 9.5 g of Fe was added and heating continued for 5 minutes. Once the flask had cooled to room temperature, several drops of conc. $NH_4OH$ were added to adjust the pH of the reaction mixture from 5 to 9.5. The mixture was then filtered and the iron and iron salts washed with two 50 mL portions of water. The yellow filtrate was acidified with 37% HCl to a pH of 1. At about a pH of 5, a white precipitate began to form. After cooling the acidified filtrate at 5° C. overnight, the solid was collected by filtration, washed with water then acetone, and air dried. Approximately 14.3 g of S-(4-aminophenylethyl)thiosulfuric acid was isolated.

To a slurry of 16 g S-(4-aminophenylethyl)thiosulfuric acid in 500 mL of water was added solid $NaHCO_3$ to adjust to pH to 8. As the pH was raised the solid dissolved yielding a solution of sodium S-(4-aminophenylethyl)thiosulfate. To this was added a solution of $Na_2S.9H_2O$ (12.3 g) in 150 mL of water dropwise over the course of 30 minutes with the concomitant formation of a precipitate. After the addition was complete, the reaction mixture was stirred for 15 minutes and then extracted twice in a separatory funnel with first 200 mL then 100 mL of ethyl acetate. The ethyl acetate extracts were combined and dried over $MgSO_4$. The ethyl acetate was evaporated leaving a yellow solid. Final isolated yield of bis[2-(4-aminophenyl)ethyl]trisulfide was 11.3 g.

To a stirred slurry of bis[2-(4-aminophenyl)ethyl] trisulfide (11.3 g), prepared as described above, in 300 mL of water was added a solution 13.7 g of 37% HCl diluted in 100 mL of water. After stirring for 20 minutes, an additional 200 mL of water was added and the mixture gently heated to 45° C. and stirred for 15 minutes to obtain a solution. The resulting solution was cooled to room temperature and added to a stirred slurry of carbon black pellets (225 g) in 1.2 liters of water. Next, a solution of $NaNO_2$ (5.04 g) in 100 mL of water was added to the carbon black slurry. Gas was evolved. The reaction mixture was stirred overnight and the carbon black product isolated by filtration, washed with water, and dried at 125° C. to a constant weight.

A sample of the carbon black product which had been extracted with THF overnight and dried contained 2.09% sulfur, compared to 1.11% for the untreated black. Therefore, the carbon black product had 0.10 mmol/g of attached -(4-$C_6H_4$)—$CH_2CH_2$—S—S—S—$CH_2CH_2$-(4-$C_6H_4$)— groups.

Example 125

This example further illustrates the in situ preparation of a carbon black product of the present invention. A carbon black with an iodine number of 120 mg/g and a DBPA of 125 mL/100 g was used.

To a stirred slurry of bis(2-aminophenyl)disulfide in 500 mL of water was added a solution of 13.6 g of 37% HCl in 80 mL of water. The resulting slurry was heated to 65° C. yielding a gold solution with a brown solid. After filtering the hot solution to remove the solid, the solution was then added with stirring to a room temperature slurry of carbon black pellets (225 g) in 1.2 liters of water. A solution of $NaNO_2$ (5.04 g) in 90 mL of water was then added to the carbon black slurry over the course of a minute. Gas was evolved. The mixture was stirred for 2 hours, filtered and washed with water, and dried at 125° C. to a constant weight.

A sample of the carbon black product which had been extracted with THF overnight and dried contained 1.44% sulfur, compared to 1.12% for the untreated black. Therefore, the carbon black product had 0.05 mmol/g of attached -(2-$C_6H_4$)—S—S-(2-$C_6H_4$)— groups.

Example 126

This example further illustrates the preparation of a carbon black product of the present invention. A carbon black with an iodine number of 120 mg/g and a DBPA of 125 mL/100 g was used.

Bis(3-aminophenyl)disulfide was prepared as follows from bis(3-nitrophenyl)disulfide following a procedure similar to the one described by W. A. Sheppard in Organic Syntheses, Coll. Vol. 5, p. 843. To 13.7 g of solid 3-nitrobenzenesulfonyl chloride was added 46 mL of 47% hydriodic acid (HI) yielding a dark brown mixture. The mixture was refluxed for 2.5 hours. During the course of the reaction, the iodine by-product sublimed into the water condenser and was removed at appropriate intervals to prevent clogging of the condenser. When the reaction mixture had cooled, $NaHSO_3$ was added to neutralize the remaining iodine. The resulting slurry was filtered to collect the solid, and the solid was washed with 200 mL of water. The solid was then extracted on the filter with 300 mL of acetone yielding an orange solution. Removal of the acetone gave 8.4 g of bis(3-nitrophenyl)disulfide as a orange solid.

To a stirred slurry bis(3-nitrophenyl)disulfide (8.4 g) in 100 mL of water was added a solution of $Na_2S.9H_2O$ (20.4 g) in 100 mL of water. The reaction mixture was heated to reflux at which point a dark red solution was obtained. After refluxing for 18 hours, an additional 5 g of $Na_2S.9H_2O$ was added to the reaction mixture and heating continued for 2 hours. To the cooled reaction mixture was added 3.5 g of 30% $H_2O_2$ in a dropwise manner. The white precipitate which formed was extracted twice with 100 mL of ethyl acetate. The ethyl acetate extracts were combined and dried over $MgSO_4$. Removal of the ethyl acetate gave 5.9 g of bis(3-aminophenyl)disulfide.

To a stirred slurry of of bis(3-aminophenyl)disulfide (10.2 g), prepared as described above, in 0.7 liters of water was added a solution of 18 g of 37% HCl in 50 mL of water. This solution was cooled to 10° C., and a similarly cooled solution of $NaNO_2$ (6.1 g) in 75 mL of water then added. This mixture was then added to a stirred slurry of carbon black pellets (225 g) in 1.8 liters of water. Gas was evolved. After stirring for 2 hours, the carbon black product was isolated by filtration, washed with water and dried at 115° C. to a constant weight.

A sample of the carbon black product which had been extracted with THF overnight and dried contained 1.71% sulfur, compared to 1.11% for the untreated black. Therefore, the carbon black product had 0.09 mmol/g of attached -(3-$C_6H_4$)—S—S-(3-$C_6H_4$)— groups.

Example 127

This example further illustrates the preparation of a carbon black product of the present invention. A carbon black with an iodine number of 120 mg/g and a DBPA of 125 mL/100 g was used.

6-amino-1,2,3-benzothiadiazole was prepared according to the method described in Ward, E. R.; Poesche, W. H.; Higgins, D.; and Heard, D. D. J. Chem. Soc. 1962, pp. 2374–2379. A solution of 3.5 g HCl in 50 mL water was added to solid 6-amino-1,2,3-benzothiadiazole (2.38 g), and the resulting solution cooled to 10° C. Next, a cold solution of $NaNO_2$ (1.1 g) in 50 mL was added, and this mixture was then added to a stirred slurry of carbon black pellets (105 g) in 500 mL of water and 100 g of ice. Gas was evolved. After stirring the mixture for 3 hours, the carbon black product was collected by filtration, washed with water and isopropanol, and air dried to a constant weight.

A sample of the carbon black product which had been extracted with THF overnight and dried contained 1.50% sulfur, compared to 1.06% for the untreated black. Therefore, the carbon black product had 0.14 mmol/g of attached -6-($C_7H_5N_2S$) groups.

Example 128

This example further illustrates the in situ preparation of a carbon black product of the present invention. A carbon black with an iodine number of 120 mg/g and a DBPA of 125 ml/100 g was used.

N-morpholino-(6-aminobenzothiazole)-2-sulfenamide was prepared as follows. A solution of $NaI_3$ was prepared by adding I2 (35.5 g) to an aqueous solution consisting of NaI (47 g) dissolved in 150 mL of water. Next, 6-amino-2-mercaptobenzothiazole (6.5 g) was added to a solution consisting of NaOH (2.84 g) in 50 mL of water. After stirring for 15 minutes, a red-brown solution was obtained to which morpholine (9.28 g) was added. To this mixture was added the previously prepared $NaI_3$ solution. A brown precipitate formed and the slurry was stirred for 4 hours. The solid was isolated by filtration and air dried. The solid was slurried in 75 mL of ethanol and 3.34 g of morpholine. To this slurry was added dropwise a solution of 3.24 g of I2 in 60 mL of ethanol over the course of 20 minutes. After stirring the mixture at room temperature overnight, the ethanol was removed on a rotary evaporator and the residue washed with an aqueous solution of NaI to remove unreacted iodine. The product was collected by filtration, washed with 250 mL of water, and then dried in a vacuum oven at 60° C. for 6 hours. 9.2 g of N-morpholino-6-aminobenzothiazole)-2-sulfenamide was isolated in 80% purity.

To a stirred slurry containing carbon black pellets (175 g), N-morpholino-(6-aminobenzothiazole)-2-sulfenamide (7.01 g) and $NaNO_2$ (1.96 g) in 1 liter of water was added a solution consisting of 5.43 g of 37% HCl diluted in 75 mL of water. Gas was evolved. After stirring the slurry for 48 hours, the carbon black product was filtered, washed with water, and dried at 100° C. to a constant weight.

A sample of the carbon black product which had been extracted with THF overnight and dried contained 1.62% sulfur, compared to 1.12% for the untreated black. Therefore, the carbon black product had 0.08 mmol/g of attached -6-(2-$C_7H_4NS$)—S—NRR' groups, where RR' is —$CH_2CH_2OCH_2CH_2$—.

Example 129

This example further illustrates the preparation of a carbon black product of the present invention. A carbon black with an iodine number of 120 mg/g and a DBPA of 125 mL/100 g was used.

Bis(4-aminophenyl)tetrasulfide was prepared as follows. Under a nitrogen atmosphere, a solution of 9.74 g of 4-aminothiophenol in 150 mL of anhydrous tetrahydrofuran (THF) was prepared. The solution was then cooled in a dry ice/ethanol bath. Butyl lithium was added to the flask and a thick yellow precipitate formed. Another 125 mL of THF was added to the flask and the flask warmed in an ice water bath to 5° C. Sulfur monochloride, $S_2Cl_2$, (2.80 mL) was added to the slurry over the course of 5 seconds resulting in a red solution. After standing overnight at −15° C., the reaction mixture was warmed to room temperature and the THF removed using a rotary evaporator. The orange oil was redissolved in $CH_2Cl_2$, filtered through Celite to remove insoluble LiCl and dried over $MgSO_4$. After filtering the solution to remove the $MgSO_4$, $CH_2Cl_2$ was removed yielding 11.4 g of bis(4-aminophenyl)tetrasulfide as an orange oil.

A solution of 13 g of 37% HCl in 75 mL of water was added to a slurry of bis(4-aminophenyl)tetrasulfide (10 g), prepared as described above, in 200 mL of water, and the resulting mixture was stirred for 15 minutes. The orange-red suspension was cooled to 10° C., and a similarly cooled solution of $NaNO_2$ (4.8 g) in 60 mL of water was added over the course of 1–2 minutes. The resulting orange-yellow slurry was combined with a stirred slurry of carbon black pellets (213 g) in 1 liter of water and 200 g of ice. Gas was evolved. After stirring the mixture overnight, the carbon black product was isolated by filtration, washed with water, and dried at 120° C. to a constant weight.

A sample of the carbon black product which had been extracted with THF overnight and dried contained 2.40% sulfur, compared to 1.23% for the untreated black. Therefore, the carbon black product had 0.09 mmol/g of attached -(4-$C_6H_4$)—S—S—S—S-(4-$C_6H_4$)— groups.

Example 130

This example further illustrates the in situ preparation of a carbon black product of the present invention. A carbon black with an iodine number of 120 mg/g and a DBPA of 125 mL/100 g was used.

Bis(4-aminophenyl)tetrasulfide was prepared as follows. To a stirred slurry of 4-nitrochlorobenzene (59 g) in 600 mL of water was added a solution consisting of $Na_2S.9H_2O$ (240 g) dissolved in 200 mL of water. The resulting mixture was heated to reflux over the course of 45 minutes and continued for 17 hours. At the end of 17 hours a small amount of oil was present in the flask. After allowing the reaction mixture to cool to room temperature, the aqueous solution was decanted from the oil and then filtered. Next, elemental sulfur powder (72 g) was added to the aqueous filtrate and the resulting slurry heated to reflux. After 22 hours, a large amount of orange oil was present in the reaction. Heat was removed and the reaction mixture cooled to room temperature. The orange oil was extracted into 500 mL of ethyl acetate. Once the ethyl acetate solution had been filtered and dried over $MgSO_4$, the ethyl acetate was removed to give bis(4-aminophenyl)tetrasulfide as an orange oil.

Bis(4-aminophenyl)tetrasulfide (10.5 g), prepared as described above, was stirred in 300 mL of water, and to this was added a solution of 13.7 g of 37% HCl diluted in 100 mL of water. After stirring 15 minutes, an additional 200 mL of water was added. Stirring for another 45 minutes yielded a finely divided suspension. The suspension was filtered to remove the solid, and the filtrate was combined with a stirred slurry of carbon black pellets (225 g) in 1.2 liters of water. Next, a solution of $NaNO_2$ (5.04 g) in 50 mL of water was added to the carbon black slurry. Gas was evolved. After stirring the mixture overnight, the carbon black product was isolated by filtration, washed with water and dried at 120° C. to a constant weight.

A sample of the carbon black product which had been extracted with THF overnight and dried contained 2.36% sulfur, compared to 1.09% for the untreated black. Therefore, the carbon black product had 0.10 mmol/g of attached -(4-$C_6H_4$)—S—S—S—S-(4-$C_6H_4$)— groups.

Example 131

A carbon black product having attached -(4-$C_6H_4$)—S—S—S—S-(4-$C_6H_4$)— groups was prepared by following the method of Example 130 and using a suspension of 7.03 g of 4-aminophenyl tetrasulfide in 200 mL of water, a solution 9.09 g of 37% HCl in 75 mL, a solution of 3.36 g of $NaNO_2$ in 100 mL of water, and a slurry 225 g of the same carbon black pellets in 1.2 liters of water.

A sample of the carbon black product which had been extracted with THF overnight and dried contained 1.63% sulfur, compared to 1.00% for the untreated black. Therefore, the carbon black product had 0.05 mmol/g of attached -(4-$C_6H_4$)—S—S—S—S-(4-$C_6H_4$)— groups.

Example 132

A carbon black product having attached -(4-$C_6H_4$)—S—S—S—S-(4-$C_6H_4$)— groups was prepared by following the method of Example 130 and using a suspension of 5.27 g of 4-aminophenyl tetrasulfide in 200 mL of water, a solution 6.82 g of 37% HCl in 75 mL, a solution of 2.52 g of $NaNO_2$ in 100 mL of water, and a slurry 225 g of the same carbon black pellets in 1.2 liters of water.

A sample of the carbon black product which had been extracted with THF overnight and dried contained 1.54% sulfur, compared to 1.00% for the untreated black. Therefore, the carbon black product had 0.03 mmol/g of attached -(4-$C_6H_4$)—S—S—S—S-(4-$C_6H_4$)— groups.

Example 133

A carbon black product having attached -(4-$C_6H_4$)—S—S—S—S-(4-$C_6H_4$)— groups was prepared by following the method of Example 130 and using a suspension of 3.22 g of 4-aminophenyl tetrasulfide in 200 mL of water, a solution 4.16 g of 37% HCl in 75 mL, a solution of 1.54 g of $NaNO_2$ in 100 mL of water, and a slurry 206 g of the same carbon black pellets in 1.2 liters of water.

A sample of the carbon black product which had been extracted with THF overnight and dried contained 1.26% sulfur, compared to 1.00% for the untreated black. Therefore, the carbon black product had 0.02 mmol/g of attached -(4-$C_6H_4$)—S—S—S—S-(4-$C_6H_4$)— groups.

Example 134

This example further illustrates the in situ preparation of a carbon black product of the present invention. A carbon black with an iodine number of 120 mg/g and a DBPA of 125 mL/100 g was used.

Liquid 4-aminostyrene (4.02 g) was added to a dilute aqueous acid solution previously prepared by adding 7.33 g of 37% HCl to 150 mL of water. After stirring the mixture for 5 minutes, a yellow solution was obtained and added to stirred slurry of carbon black pellets (225 g) in 1.2 liters of water. Addition of a solution of $NaNO_2$ (2.94 g) dissolved in 50 mL of water resulted in the formation of gas. After stirring the mixture for 3 hours, the carbon black product was isolated by filtration, washed with water, and dried at 125° C. to a constant weight.

A sample of the carbon black product which had been extracted with THF overnight and dried contained 0.46% hydrogen, compared to 0.37% for the untreated black. Therefore, the carbon black product had 0.06 mmol/g of attached -(4-$C_6H_4$)—CH=$CH_2$ groups.

Example 135

This example further illustrates the in situ preparation of a carbon black product of the present invention. A carbon black with an iodine number of 120 mg/g and a DBPA of 125 mL/100 g was used.

S-(4-aminophenyl)thiosulfuric acid (6.60 g) was prepared by the method described in Tanaka et al, Chem. Pharm. Bull. 1974, vol. 22, p. 2725, and was dissolved in 600 mL of water containing 3.50 g of 37% HCl. This solution was added to a stirred slurry of carbon black pellets (215 g) in 1.2 liters of water. Next, an aqueous solution of $NaNO_2$ (2.52 g) in 30 mL of water was added to the slurry. Gas was evolved. After stirring the mixture for 2 hours then standing overnight, the carbon black product was isolated by filtration, washed with water, and dried at 125° C. to a constant weight.

A sample of the carbon black product which had been extracted with THF overnight and dried contained 1.58% sulfur, compared to 1.23% for the untreated black. Therefore, the carbon black product had 0.05 mmol/g of attached -(4-$C_6H_4$)—S—$SO_3H$ groups.

Example 136

This example further illustrates the preparation of a carbon black product of the present invention. A carbon black with an iodine number of 120 mg/g and a DBPA of 125 mL/100 g was used.

Bis[4-(4'-aminobenzenesulfonamido)phenyl]disulfide was prepared as follows. To N-acetylsulfanilyl chloride (20.0 g) stirring in acetone (500 mL) at room temperature was added 4-aminophenyl disulfide (10.12 g) followed by pyridine (7.09 g). The cloudy yellow-orange reaction mixture was allowed to stir for 20 hours, during which time a clear, golden yellow solution formed. 7.5 mL of 37% HCl was added to 45 mL of water, and this acid solution was added to the reaction mixture. The acetone was removed, and the remaining mixture was diluted with 100 mL of water and extracted with ethyl acetate (2×200 mL). The combined ethyl acetate extracts were washed with water (5×100 mL), washed with a saturated brine solution (1×100 mL), dried over $Na_2SO_4$, and filtered. Removal of the ethyl acetate yielded 29.37 g of crude product as a tan foam. This material was added to a flask containing THF (150 mL), and 2N HCl (150 mL) was added. The resulting slurry was heated to reflux. After 24 hours at reflux, 48 mL of 2N HCl were added, and the reaction was continued at reflux for 22 hours. The clear orange solution was allowed to cool to room temperature and carefully made basic with solid $NaHCO_3$, and the resulting mixture extracted with ethyl acetate (3×200 mL). The combined ethyl acetate extracts were washed with water (4×200 mL) until neutral, dried over $Na_2SO_4$, and filtered. Removal of the ethyl acetate yielded 20.2 g of the desired product as a yellow solid.

Bis[4-(4'-aminobenzenesulfonamido)phenyl]disulfide (18.83 g), prepared as described above, was dissolved in a mixture of 500 mL of water, 632.4 g of acetone, and 13.65 g of 37% HCl. This yellow solution was cooled in an ice water bath, and $NaNO_2$ (13.65 g) was added, yielding a deep red solution containing an orange precipitate. This mixture was added in one portion to a rapidly stirring slurry of carbon black pellets (225 g) in 1/1 acetone/water (1.5 liters total). Gas was evolved. The slurry was stirred overnight and filtered to collect the carbon black product. The carbon black product was washed with water, collected by filtration, and dried at 125° C. to a constant weight.

A sample of the carbon black product which had been extracted with THF overnight and dried contained 2.21% sulfur, compared to 1.14% for the untreated black. Therefore, the carbon black product had 0.084 mmol/g of attached -(4-$C_6H_4$)—$SO_2NH$-(4-$C_6H_4$)—S—S-(4-$C_6H_4$)—$NHSO_2$-(4-$C_6H_4$)— groups

Example 137

This example further illustrates the preparation of a carbon black product of the present invention. A carbon black with an iodine number of 120 mg/g and a DBPA of 125 mL/100 g was used.

p-Phenylenediamine (4.87 g) was dissolved in 250 mL of water containing 9.11 g of 37% HCl. This was cooled in an ice bath, and a solution of 3.36 g $NaNO_2$ dissolved in 125 mL of water was added. The resulting blue-green solution was added in one portion to a rapidly stirring slurry of carbon black pellets (225 g) in 2 liters of water containing 280 g of ice. The slurry was stirred overnight and filtered to collect the carbon black product. This product was washed with water, collected by filtration, and dried at 125° C. to a constant weight.

Example 138

This example further illustrates the preparation of a carbon black product of the present invention. A carbon black with an iodine number of 120 mg/g and a DBPA of 125 mL/ 100 g was used.

p-Phenylenediamine (2.43 g) was dissolved in 250 mL of water containing 9.11 g of 37% HCl. This was cooled in an ice bath, and a solution of 3.36 g $NaNO_2$ dissolved in 125 mL of water was added. This blue-green solution was added in one portion to a rapidly stirring slurry of carbon black pellets (225 g) in 2 liters of water containing 280 g of ice. The slurry was stirred overnight and filtered to collect the carbon black product. This product was washed with water, collected by filtration, and dried at 125° C. to a constant weight.

Example 139

This example further illustrates the preparation of a carbon black product of the present invention. A carbon black with an iodine number of 120 mg/g and a DBPA of 125 mL/100 g was used.

2,2'-bis(6-aminobenzothiazolyl)disulfide was prepared as follows. 6-Amino-2-mercaptobenzothiazole (15.0 g) was added to 500 mL of water. To this slurry was added a solution of NaOH (3.3 g) dissolved in 1 liter of water, and the mixture stirred for 1 hour at room temperature until most of the thiol was dissolved. A solution containing NaI (24.73 g) and I2 (10.47 g) in 750 mL of water was added to the thiolate solution gradually over 1.5 hours with vigorous stirring. During the addition, a thick slurry containing a yellowish solid formed. After the addition and continued stirring for an additional 45 minutes, the solid was isolated by filtration.

2,2'-bis(6-aminobenzothiazolyl)-disulfide (12.23 g), prepared as described above, was added to 600 mL of water containing 13.66 g of 37% HCl. This yellow slurry was cooled in an ice bath, and a solution of 5.04 g NaNO2 dissolved in 50 mL of water was added. The resulting dark brown mixture was added in one portion to a rapidly stirring slurry of carbon black pellets (225 g) in 2 liters of water containing 280 g of ice. The slurry was stirred overnight and filtered to collect the carbon black product. The product was washed with water and isopropanol, collected by filtration, and dried at 125° C. to a constant weight.

A sample of the carbon black product which had been extracted with THF overnight and dried contained 1.69% sulfur, compared to 1.00% for the untreated black. Therefore, the carbon black product had 0.054 mmol/g of attached -6-(2-$C_7H_4NS$)—S—S-2-(6-$C_7H_4NS$)— groups.

Example 140

This example further illustrates the preparation of a carbon black product of the present invention. A carbon black with an iodine number of 120 mg/g and a DBPA of 125 mL/100 g was used.

4-aminophenyl-4-aminobenzyl sulfide was prepared as follows. A solution of NaOH (7.1 g) in water (200 mL) was added to a mixture of 4-aminothiophenol (19.8 g) in 190 mL of water. The mixture was stirred until most of the thiophenol was dissolved. To this mixture was added 4-nitrobenzyl chloride (25.8 g) in portions with good stirring. The resulting yellow solution was then stirred at reflux for 1.5 hours, during which time a thick red oil separated. At the end of the reaction, the mixture was allowed to cool to room temperature, and the red oil separated as a waxy solid. The solid was extracted with ethyl acetate (400 mL followed by 100 mL), and the combined ethyl acetate extracts were dried over $Na_2SO_4$ and filtered. Removal of the ethyl acetate yielded 38.65 g of 4-aminophenyl-4-nitrobenzyl sulfide.

All of the above product was dissolved in a mixture of ethanol (235 mL) and water (780 mL). To this solution was added 37% HCl (27.83 g) and iron powder (49.78 g), and the slurry stirred at reflux for 3 hours. After cooling to room temperature, 200 mL of water were added, and the mixture was extracted with ethyl acetate (600 mL followed by 200 mL). The combined ethyl acetate extracts were dried over $Na_2SO_4$ and filtered. Removal of the ethyl acetate yielded 31.53 g of the desired product.

4-aminophenyl-4-aminobenzyl sulfide (7.77 g), prepared as described above, was added to 250 mL of water containing 13.7 g of 37% HCl. The resulting solution was cooled in an ice bath and a solution of 5.04 g $NaNO_2$ dissolved in 125 mL of water added. The resulting mixture was added in one portion to a rapidly stirring slurry of carbon black pellets (225 g) in 2 liters of water containing 280 g of ice. The slurry was stirred overnight and filtered to collect the carbon black product. This product was collected by filtration, washed with water then with ethanol, collected by filtration, and dried at 125° C. to a constant weight.

A sample of the carbon black product which had been extracted with THF overnight and dried contained 1.38% sulfur, compared to 1.00% for the untreated black. Therefore, the carbon black product had 0.12 mmol/g of attached -(4-$C_6H_4$)—S—$CH_2$-(4-$C_6H_4$)— groups.

Example 141

This example further illustrates the preparation of a carbon black product of the present invention. A carbon black with an iodine number of 120 mg/g and a DBPA of 125 mL/100 g was used.

Bis(4-aminophenyl)thiosulfonate was prepared following a modified procedure to the one described in Leitch, L.; Baker, B.; Brickman, L. Can. J. Res. Sect. B 1945, 23, 139. To a well-stirred mixture of thiourea (11.4 g) in acetone (175 mL) was added pyridine (16.85 mL) followed by N-acetylsulfanilyl chloride (35.05 g). A yellow color developed. This mixture was heated to reflux and stirred under these conditions for 80 minutes. The reaction was then allowed to cool to room temperature, and a fluffy solid precipitated. After removing the acetone, 500 mL of hot water were added. A pale yellow precipitate formed, which was isolated by filtration, yielding 22.7 g of bis(4-acetamidophenyl)thiosulfonate.

The desired final product was obtained following a modification to the procedure described in Bere, C.; Smiles, S. J. Chem. Soc. 1924, 2359. All of the bis-(4-acetamidophenyl)thiosulfanate prepared above (22.7 g) was dissolved in 250 mL of THF, and 250 mL of 2N HCl was added. The mixture was heated to reflux and stirred for 5 hours. After allowing the reaction to cool to room temperature, most of the THF was removed and solid $NaHCO_3$ added carefully until no further gas evolution was seen. An orange precipitate formed, which was isolated by filtration, yielding the desired bis(4-aminophenyl)thiosulfonate (10.3 g).

Bis(4-aminophenyl)thiosulfonate (9.46 g), prepared as described above, was added to 250 mL of water containing 13.65 g of 37% HCl, and the cloudy yellow mixture cooled in an ice bath. To this was added a solution of 5.04 g $NaNO_2$ dissolved in 125 mL of water. A yellow colloidal suspension formed. The resulting mixture was added in one portion to a rapidly stirring slurry of carbon black pellets (225 g) in 2 liters of water containing 280 g of ice. The slurry was stirred overnight and filtered to collect the carbon black product. The product was washed with water and collected by filtration. This was then washed with ethanol, collected by filtration, and dried at 125° C. to a constant weight.

A sample of the carbon black product which had been extracted with THF overnight and dried contained 1.85% sulfur, compared to 1.30% for the untreated black. Therefore, the carbon black product had 0.086 mmol/g of attached -(4-$C_6H_4$)—$SO_2$—S-(4-$C_6H_4$)— groups.

Example 142

This example further illustrates the preparation of a carbon black product of the present invention. A carbon black with an iodine number of 120 mg/g and a DBPA of 125 mL/100 g was used.

Bis(4-aminobenzyl)sulfide was prepared as follows. A solution of 4-nitrobenzyl chloride (55.0 g) in 500 mL of THF was added slowly, with good stirring, to a solution of $Na_2S.9H_2O$ (43.2 g) in 1 liter of water. The mixture was stirred at room temperature for 18 hours. Removal of the THF and filtration yielded 46.8 g of bis(4-nitrobenzyl)sulfide.

All of this material was dissolved in 530 mL of ethanol. Water (1.1 liters) was added followed by 530 mL of 2N HCl and 69.1 g of iron powder. While stirring vigorously, the mixture was heated at reflux for 3 hours. After cooling to room temperature, 800 mL of water were added, and the reaction mixture was extracted with 1900 mL of ethyl acetate in several portions. The combined ethyl acetate extracts were dried over $Na_2SO_4$, and filtered. Removal of the ethyl acetate yielded 28.9 g of the desired bis(4-aminobenzyl)sulfide.

Bis(4-aminobenzyl)sulfide (12.8 g), prepared as described above, was added to 700 mL of water containing 21.3 g of 37% HCl. The resulting solution was stirred for 2 hours and then cooled in an ice bath. A solution of 7.84 g $NaNO_2$ dissolved in 75 mL of water was added. The resulting brown colloidal suspension was added in one portion to a rapidly stirring slurry of carbon black pellets (350 g) in 2.5 liters of water containing 280 g of ice. The slurry was stirred overnight and then filtered to collect the carbon black product. This product was washed with ethanol then with water, collected by filtration, and dried at 125° C. to a constant weight.

A sample of the carbon black product which had been extracted with THF overnight and dried contained 1.34% sulfur, compared to 1.00% for the untreated black. Therefore, the carbon black product had 0.11 mmol/g of attached -(4-$C_6H_4$)—$CH_2$—S—$CH_2$-(4-$C_6H_4$)— groups.

Example 143

This example further illustrates the preparation of a carbon black product of the present invention. A carbon black with an iodine number of 120 mg/g and a DBPA of 125 mL/100 g was used.

Bis(4-aminobenzyl)sulfide (10.99 g), prepared as described for Example 142 ove, was added to 700 mL of water containing 18.2 g of 37% HCl. After stirring for 2 hours, the solution was cooled in an ice bath. A solution of 6.72 g $NaNO_2$ dissolved in 75 mL of water was added. The resulting brown colloidal suspension was added in one portion to a rapidly stirring slurry of carbon black pellets (225 g) in 2 liters of water containing 280 g of ice. The slurry was stirred overnight and filtered to collect the carbon black product. This product was washed with ethanol then with water, collected by filtration, and dried at 125° C. to a constant weight.

A sample of the carbon black product which had been extracted with THF overnight and dried contained 1.40% sulfur, compared to 1.00% for the untreated black. Therefore, the carbon black product had 0.125 mmol/g of attached $-(4-C_6H_4)-CH_2-S-CH_2-(4-C_6H_4)-$ groups.

Example 144

This example further illustrates the preparation of a carbon black product of the present invention. A carbon black with an iodine number of 120 mg/g and a DBPA of 125 mL/100 g was used.

Bis(3-aminobenzyl)sulfide was prepared as follows. A solution of 3-nitrobenzyl chloride (55.0 g) in 500 mL of THF was added to a solution of $Na_2S.9H_2O$ (43.2 g) in 1 liter of water slowly with good stirring. This mixture was stirred at room temperature for 18 hours. Removal of the THF and filtration yielded 45.8 g of bis(3-nitrobenzyl)sulfide.

All of this material was dissolved in 530 mL of ethanol. 1.1 liters of water was added followed by 140 mL of 2N HCl and 67.64 g of iron powder. While stirring vigorously, the mixture was heated to reflux for 4.5 hours. More iron powder (15.0 g) was added, and the reaction was continued at reflux for an additional 1 hour. After cooling to room temperature, the reaction mixture was extracted several times with ethyl acetate. The combined ethyl acetate extracts were dried over $Na_2SO_4$, and filtered. Removal of the ethyl acetate yielded 33.1 g of the desired bis(3-aminobenzyl) sulfide.

Bis(3-aminobenzyl)sulfide (10.99 g), prepared as described above, was added to 400 mL of water containing 18.2 g of 37% HCl. After stirring for 2 hours, the solution was cooled in an ice bath. A solution of 6.72 g $NaNO_2$ dissolved in 75 mL of water was added. The resulting brown colloidal suspension was added in one portion to a rapidly stirring slurry of carbon black pellets (225 g) in 2 liters of water containing 280 g of ice. The slurry was stirred overnight and filtered to collect the carbon black product. The product was washed with ethanol then with water, collected by filtration, and dried at 125° C. to a constant weight.

A sample of the carbon black product which had been extracted with THF overnight and dried contained 1.50% sulfur, compared to 1.21% for the untreated black. Therefore, the carbon black product had 0.09 mmol/g of attached $-(3-C_6H_4)-CH_2-S-CH_2-(3-C_6H_4)-$ groups.

Example 145

This example further illustrates the preparation of a carbon black product of the present invention. A carbon black with an iodine number of 120 mg/g and a DBPA of 125 mL/100 g was used.

Bis(3-aminobenzyl)sulfide (16.48 g), prepared as described for Example 144 above, was added to 500 mL of water containing 27.32 g of 37% HCl. After stirring for 2 hours, the solution was cooled in an ice bath. A solution of 10.1 g $NaNO_2$ dissolved in 75 mL of water was added. The resulting brown colloidal suspension was added in one portion to a rapidly stirring slurry of carbon black pellets (450 g) in 3 liters of water containing 300 g of ice. The slurry was stirred overnight and filtered to collect the carbon black product. This product was washed with ethanol then with water, collected by filtration, and dried at 125° C. to a constant weight.

A sample of the carbon black product which had been extracted with THF overnight and dried contained 1.30% sulfur, compared to 1.00% for the untreated black. Therefore, the carbon black product had 0.094 mmol/g of attached $-(3-C_6H_4)-CH_2-S-CH_2-(3-C_6H_4)-$ groups.

Example 146

This example further illustrates the preparation of a carbon black product of the present invention. A carbon black with an iodine number of 120 mg/g and a DBPA of 125 mL/100 g was used.

Bis(4-aminobenzyl)disulfide was prepared as follows. A mixture of 4-nitrobenzyl chloride (40.0 g) in 933 mL of methanol and 233 mL or water was heated until a solution formed. To this was added slowly, with good stirring, a solution of $Na_2S_2O_3.5H_2O$ (72.34 g) in 233 mL of water. This mixture was then stirred at reflux for 4 hours. After cooling to room temperature, most of the methanol was removed, and to the aqueous solution (approximately 300 mL) was added a solution of $Na_2CO_3$ in 600 mL of water. This was stirred at room temperature for 18 hours, during which time a cream colored opaque mixture formed. The precipitate was isolated by filtration and washed with water yielding 37.1 g of bis(4-nitrobenzyl)disulfide.

Bis(4-nitrobenzyl)disulfide (10.0 g) was dissolved in 1.5 liters of ethanol (heating to approximately 73° followed by filtration was needed in order to obtain a clear solution). To this heated solution was added 0.5 liters of water, 30 mL of 2N HCl, and 16.4 g of iron powder. The temperature was then allowed to drop to approximately 45°, and the reaction was continued at this temperature for 8 hours. The reaction mixture was then heated to reflux and allowed to continue for 3.5 hours. After cooling to room temperature, the mixture was then extracted several times with ethyl acetate. The combined ethyl acetate extracts were dried over $Na_2SO_4$, and filtered. Removal of the ethyl acetate yielded 4.69 g of the desired bis(4-aminobenzyl)disulfide.

Bis(4-aminobenzyl)disulfide (9.32 g), prepared as described above, was added to 250 mL of water containing 13.66 g of 37% HCl. After stirring for 2 hours, the solution was cooled in an ice bath. A solution of 5.04 g $NaNO_2$ dissolved in 125 mL of water was added. This mixture was added in one portion to a rapidly stirring slurry of carbon black pellets (225 g) in 2 liters of water containing 280 g of ice. The slurry was stirred overnight and filtered to collect the carbon black product. The product was washed with ethanol then with water, collected by filtration, and dried at 125° C. to a constant weight.

A sample of the carbon black product which had been extracted with THF overnight and dried contained 1.55% sulfur, compared to 1.00% for the untreated black. Therefore, the carbon black product had 0.086 mmol/g of attached $-(4-C_6H_4)-CH_2-S-S-CH_2-(4-C_6H_4)-$ groups.

Example 147

This example further illustrates the preparation of a carbon black product of the present invention. A carbon black with an iodine number of 120 mg/g and a DBPA of 125 mL/100 g was used.

Bis(3-aminobenzyl)disulfide was prepared as follows. A solution of $Na_2S_2O_3 \cdot 5H_2O$ (72.34 g) in 233 mL of water was added slowly, with good stirring, to a solution of 3-nitrobenzyl chloride (40.0 g) in 933 mL of methanol and 233 mL of water. The resulting mixture was then stirred at reflux for 4 hours. After cooling to room temperature, most of the methanol was removed, and the aqueous layer was extracted with ethyl acetate. Removal of the water from the aqueous layer yielded 69.04 g of the sodium salt of 3-nitrobenzyl thiosulfate.

A solution of $Na_2CO_3$ (124.83 g) in 1 liter of water was gradually added to a solution of the sodium salt of 3-nitrobenzyl thiosulfate (39.21 g) in 800 mL of water with good stirring. After stirring at room temperature for 18 hours, a cream colored opaque mixture formed. The precipitate was isolated by filtration and washed with water yielding 16.8 g of bis(3-nitrobenzyl)disulfide.

Bis(3-nitrobenzyl)disulfide (7.5 g) was dissolved in 1.5 liters of ethanol (this was heated and then filtered while warm in order to obtain a clear solution). To this heated solution was added 750 mL of water, 22.5 mL of 2N HCl, and 12.3 g of iron powder. The reaction was then further heated to just below the reflux temperature, and heating was continued for 5 hours. After cooling to room temperature, 400 mL of water was added, and the mixture was then extracted several times with ethyl acetate. The combined ethyl acetate extracts were dried over $Na_2SO_4$, and filtered. Removal of the ethyl acetate yielded 5.15 g of the desired bis(3-aminobenzyl)disulfide.

Bis(3-aminobenzyl)disulfide (9.99 g), prepared as described above, was added to 250 mL of water containing 14.6 g of 37% HCl. After stirring for 2 hours, the solution was cooled in an ice bath. A solution of 5.4 g $NaNO_2$ dissolved in 125 mL of water was added. This mixture was added in one portion to a rapidly stirring slurry of carbon black pellets (241 g) in 2 liters of water containing 280 g of ice. The slurry was stirred overnight and filtered to collect the carbon black product. This product washed with ethanol then with water, collected by filtration, and dried at 125° C. to a constant weight.

A sample of the carbon black product which had been extracted with THF overnight and dried contained 1.62% sulfur, compared to 1.00% for the untreated black. Therefore, the carbon black product had 0.097 mmol/g of attached $-(3-C_6H_4)-CH_2-S-S-CH_2-(3-C_6H_4)-$ groups.

Example 148

This example further illustrates the in situ method of preparation of a carbon black product of the present invention. A carbon black with an iodine number of 120 mg/g and a DBPA of 125 mL/100 g was used.

N-morpholino-(4-aminophenyl)sulfenamide was prepared as follows. A solution of I2 (14.2 g) in ethanol (300 mL) was added to a well-stirred solution containing 4-diaminophenyl disulfide (13.9 g) and morpholine (24.4 g) in ethanol (300 mL). The reaction mixture was stirred at room temperature for 3 hours. Removal of the ethanol gave a thick, nearly black oil. It was redissolved in 750 mL of ethyl acetate and washed several times with water. The ethyl acetate layer was dried over $Na_2SO_4$, and filtered. Removal of the ethyl acetate yielded 19.6 g of the desired N-morpholino-(4-aminophenyl)sulfenamide.

N-morpholino-(4-aminophenyl)sulfenamide (9.46 g), prepared as described above, was added to a well-stirred mixture of carbon black (225 g), ice (280 g), and water (2 liters). To this was added a solution of 3.36 g NaNO2 dissolved in 75 mL of water followed by addition of a solution of 37% HCl (4.66 g) in 75 mL of water. The slurry was stirred for 5 hours, filtered to collect the carbon black product, and dried at 125° C. to a constant weight.

A sample of the carbon black product which had been extracted with THF overnight and dried contained 1.26% sulfur, compared to 1.21% for the untreated black. Therefore, the carbon black product had 0.02 mmol/g of attached $-(4-C_6H_4)-S-NRR'$ groups where RR' is $-CH_2CH_2OCH_2CH_2-$.

Example 149

This example further illustrates the in situ method of preparation of a carbon black product of the present invention. A carbon black with an iodine number of 120 mg/g and a DBPA of 125 mL/100 g was used.

N-morpholino-(4-aminophenyl)sulfenamide (9.46 g), prepared as described for Example 148 above, was added to a well-stirred mixture of carbon black (225 g), ice (280 g), and water (2 liters). To this was added a solution of 3.36 g $NaNO_2$ dissolved in 75 mL of water followed by addition of a solution of 37% HCl (9.32 g) in 75 mL of water. The slurry was stirred for 5 hours, filtered to collect the carbon black product, and dried at 125° C. to a constant weight.

A sample of the carbon black product which had been extracted with THF overnight and dried contained 1.34% sulfur, compared to 1.21% for the untreated black. Therefore, the carbon black product had 0.04 mmol/g of attached $-(4-C_6H_4)-S-NRR'$ groups where RR' is $-CH_2CH_2OCH_2CH_2-$.

Example 150

This example further illustrates the method of preparation of a carbon black product of the present invention. A carbon black with an iodine number of 120 mg/g and a DBPA of 125 mL/100 g was used.

Bis[2-(4-aminobenzenesulfonamido)ethyl]disulfide was prepared as follows. To a well-stirred mixture of N-acetylsulfanilyl chloride (1.26 g) in 50 mL of $CH_2Cl_2$ in an ice bath was added triethylamine (559 mg) followed by cystamine (2,2'-diaminoethyl disulfide, 400 mg). The ice bath was removed, and the reaction was stirred for 18 hours at room temperature. Removal of the $CH_2Cl_2$ gave a brownish-yellow solid, which was stirred vigorously in 50 mL of water for 3 hours and filtered to give 1.24 g of bis[2-(4-acetamidobenzenesulfonamido)ethyl]disulfide.

A sample of bis[2-(4-acetamidobenzenesulfonamido)ethyl]disulfide (1.00 g) was heated to reflux in a mixture of 40 mL of ethanol and 40 mL of 2 N HCl, and stirred at this temperature for 3 hours. After cooling to room temperature, 200 mL of water were added and the mixture made basic by carefully adding solid $NaHCO_3$. A white precipitate formed which was isolated by extraction of the basic aqueous layer with ethyl acetate (2×150 mL). The combined ethyl acetate extracts were dried over $Na_2SO_4$ and filtered. Removal of the ethyl acetate yielded 735 mg of the desired bis[2-(4-aminobenzenesulfonamido)ethyl]disulfide.

Bis[2-(4-aminobenzenesulfonamido)ethyl]disulfide (15.6 g), prepared as described above, was added to 275 mL of water containing 13.6 g of 37% HCl and the mixture cooled in an ice bath. Next, a solution of 5.04 g $NaNO_2$ dissolved in 60 mL of water was added to the mixture. The resulting yellow slurry was added in one portion to a rapidly stirring slurry of carbon black pellets (225 g) in 1.2 liters of water. The slurry was stirred overnight and filtered to collect the carbon black product. This product was washed with water, collected by filtration, and dried at 100° C. to a constant weight.

A sample of the carbon black product which had been extracted with THF overnight and dried contained 2.06% sulfur, compared to 1.21% for the untreated black. Therefore, the carbon black product had 0.07 mmol/g of attached -(4-$C_6H_4$)—$SO_2NH$—$CH_2CH_2$—S—S—$CH_2CH_2$—$NHSO_2$-(4-$C_6H_4$)— groups.

Example 151

This example further illustrates the preparation of a carbon black product of the present invention. A carbon black with an iodine number of 120 mg/g and a DBPA of 125 mL/100 g was used.

2-(4-aminophenyl)-1,3-dithiane was prepared following a modification to the procedure described in Truce, W.; Roberts, F J. Org. Chem. 1963, 28, 961. To a well-stirred mixture of 4-acetamidobenzaldehyde (12.7 g) in 200 mL of acetic acid was added $MgCl_2$ (5.57 g) followed by 1,3-propane dithiol (8.44 g). The reaction mixture turned white upon addition of the dithiol. This mixture was stirred at room temperature for 2 hours. The white precipitate was isolated by filtration, washed several times with water, and dried to give 12.5 g of 2-(4-acetamidophenyl)-1,3-dithiane.

All 12.5 g of 2-(4-acetamidophenyl)-1,3-dithiane was dissolved in 150 mL of ethanol. A total of 150 mL of 2N HCl was added, and the reaction mixture was heated to reflux. After reacting at this temperature for 6 hours, the clear yellow solution was allowed to cool to room temperature and then made basic with a dilute NaOH solution. The resulting light yellow precipitate was isolated by filtration, washed with water until neutral, and dried to yield 14.8 g of the desired 2-(4-aminophenyl)-1,3-dithiane.

2-(4-aminophenyl)-1,3-dithiane (7.13 g), prepared as described above, was added to 250 mL of water containing 6.83 g of 37% HCl and was cooled in an ice bath. A solution of 2.52 g $NaNO_2$ dissolved in 125 mL of water was added. This mixture was added in one portion to a rapidly stirring slurry of carbon black pellets (225 g) in 2 liters of water containing 200 g of ice. The slurry was stirred for 4.5 hours and filtered to collect the carbon black product. This product was washed with water, collected by filtration, and dried at 125° C. to a constant weight.

A sample of the carbon black product which had been extracted with THF overnight and dried contained 1.65% sulfur, compared to 1.21% for the untreated black. Therefore, the carbon black product had 0.07 mmol/g of attached -(4-$C_6H_4$)-2-(1,3-dithiane) groups.

Example 152

This example further illustrates the preparation of a carbon black product of the present invention. A carbon black with an iodine number of 120 mg/g and a DBPA of 125 mL/100 g was used.

2-(4-aminophenyl)-1,3-dithiane (4.75 g), prepared as described in Example 151 above, was added to 250 mL of water containing 4.55 g of 37% HCl. Next, the mixture was cooled in an ice bath and a solution of 1.68 g $NaNO_2$ dissolved in 125 mL of water was added. The resulting mixture was added in one portion to a rapidly stirring slurry of carbon black pellets (112.5 g) in 2 liters of water containing 100 g of ice. The slurry was stirred for 4.5 hours and filtered to collect the carbon black product. This product was washed with water, collected by filtration, and dried at 125° C. to a constant weight.

A sample of the carbon black product which had been extracted with THF overnight and dried contained 1.47% sulfur, compared to 1.21% for the untreated black. Therefore, the carbon black product had 0.04 mmol/g of attached -(4-$C_6H_4$)-2-(1,3-dithiane) groups.

Example 153

This example further illustrates the in situ preparation of a carbon black product of the present invention. A carbon black with an iodine number of 120 mg/g and a DBPA of 125 mL/100 g was used.

N,N'-bis-(4-aminophenyl)piperazinosulfenamide was prepared as follows. A solution of I2 (21.6 g) in 800 mL of ethanol was added to a well-stirred solution of 4,4-diaminophenyldisulfide (21.3 g) and piperazine (36.7 g) in 1 liter of ethanol at room temperature. The dark colored reaction mixture was stirred at this temperature for 16 hours and then filtered. The cream colored precipitate was washed with water and filtered to yield 25.1 g of the desired N,N'-bis-(4-aminophenyl)-piperazinosulfenamide.

N,N'-bis-(4-aminophenyl)-piperazinosulfenamide (11.2 g), prepared as described above, was added to a well-stirred mixture of carbon black (225 g), ice (280 g), and water (2 liters). To this was added a solution of 5.04 g $NaNO_2$ dissolved in 75 mL of water followed by a solution of 37% HCl (13.65 g) in 75 mL of water. The slurry was stirred overnight and filtered to collect the carbon black product. The product was washed with water, filtered, and dried at 125° C. to a constant weight.

A sample of the carbon black product which had been extracted with THF overnight and dried contained 1.91% sulfur, compared to 1.21% for the untreated black. Therefore, the carbon black product had 0.11 mmol/g of attached -(4-$C_6H_4$)—S-(1,4-$C_4H_8N_2$)—S-(4-$C_6H_4$)— groups.

Example 154

This example further illustrates the preparation of a carbon black product of the present invention. A carbon black with an iodine number of 120 mg/g and a DBPA of 125 mL/100 g was used.

Bis(4-aminophenyl)disulfide (4.19 g) was dissolved in 230 mL of water containing 7.32 g of 37% HCl. The solution was then cooled in an ice bath and a solution of 2.64 g $NaNO_2$ dissolved in 40 mL of water added. This mixture was added in one portion to a rapidly stirring slurry of carbon black pellets (225 g) in 1200 mL of water containing a small amount of ice. The slurry was stirred for 2 hours and filtered to collect the carbon black product. This product was washed with ethanol, then with water, collected by filtration, and dried at 125° C. to a constant weight.

A sample of the carbon black product which had been extracted with THF overnight and dried contained 1.55% sulfur, compared to 1.10% for the untreated black. Therefore, the carbon black product had 0.07 mmol/g of attached -(4-$C_6H_4$)—S—S-(4-$C_6H_4$)— groups.

Example 155

This example further illustrates the preparation of a carbon black product of the present invention. A carbon black with an iodine number of 120 mg/g and a DBPA of 125 mL/100 g was used.

Bis(4-aminophenyl)disulfide (8.55 g) was dissolved in 180 mL of water containing 14.65 g of 37% HCl. The solution was then cooled in an ice bath and 50 mL of ethanol was added followed by addition of a solution of 5.28 g NaNO2 dissolved in 35 mL of water. This mixture was added in several portions to a rapidly stirring slurry of carbon black pellets (225 g) in 1200 mL of water containing a small amount of ice. The slurry was stirred for 2 hours and filtered to collect the carbon black product. This product was washed with ethanol, then with water, collected by filtration, and dried at 125° C. to a constant weight.

A sample of the carbon black product which had been extracted with THF overnight and dried contained 1.82% sulfur, compared to 1.10% for the untreated black. Therefore, the carbon black product had 0.11 mmol/g of attached -(4-$C_6H_4$)—S—S-(4-$C_6H_4$)— groups.

Example 156

This example further illustrates the preparation of a carbon black product of the present invention. A carbon black with an iodine number of 120 mg/g and a DBPA of 125 mL/100 g was used.

Bis(4-aminophenyl)disulfide (11.18 g) was dissolved in 560 mL of water containing 19.53 g of 37% HCl. The solution was cooled in an ice bath and a solution of 7.04 g NaNO2 dissolved in 60 mL of water added. An additional 150 mL of water was added, and the mixture added in one portion to a rapidly stirring slurry of carbon black pellets (225 g) in 1200 mL of water containing a small amount of ice. The slurry was stirred for 2 hours and filtered to collect the carbon black product. This product was washed with ethanol, then with water, collected by filtration, and dried at 125° C. to a constant weight.

A sample of the carbon black product which had been extracted with THF overnight and dried contained 2.26% sulfur, compared to 1.10% for the untreated black. Therefore, the carbon black product had 0.18 mmol/g of attached -(4-$C_6H_4$)—S—S-(4-$C_6H_4$)— groups.

Example 157

This example further illustrates the preparation of a carbon black product of the present invention. A carbon black with an iodine number of 120 mg/g and a DBPA of 125 mL/100 g was used.

Bis(4-aminophenyl)disulfide (13.97 g) was dissolved in 560 mL of water containing 24.4 g of 37% HCl. The solution was cooled in an ice bath and a solution of 8.80 g NaNO2 dissolved in 60 mL of water added. An additional 150 mL of water was added and the resulting mixture added in one portion to a rapidly stirring slurry of carbon black pellets (225 g) in 1200 mL of water containing a small amount of ice. The slurry was stirred for 3.5 hours and filtered to collect the carbon black product. This product was washed with ethanol, then with water, collected by filtration, and dried at 125° C. to a constant weight.

A sample of the carbon black product which had been extracted with THF overnight and dried contained 2.50% sulfur, compared to 1.10% for the untreated black. Therefore, the carbon black product had 0.22 mmol/g of attached -(4-$C_6H_4$)—S—S-(4-$C_6H_4$)— groups.

Example 158

This example further illustrates the preparation of a carbon black product of the present invention. A carbon black with an iodine number of 120 mg/g and a DBPA of 125 mL/100 g was used.

Bis(4-aminophenyl)disulfide (17.1 g) was dissolved in 175 mL of water containing 29.30 g of 37% HCl. The resulting solution was cooled in an ice bath and a solution of 10.6 g NaNO2 dissolved in 60 mL of water added. 100 mL of ethanol was added, and this mixture was added in one portion to a rapidly stirring slurry of carbon black pellets (225 g) in 1200 mL of water containing a small amount of ice. The slurry was stirred for 2 hours and filtered to collect the carbon black product. This product was washed with ethanol, then with water, collected by filtration, and dried at 125° C. to a constant weight.

A sample of the carbon black product which had been extracted with THF overnight and dried contained 2.55% sulfur, compared to 1.10% for the untreated black. Therefore, the carbon black product had 0.23 mmol/g of attached -(4-$C_6H_4$)—S—S-(4-$C_6H_4$)— groups.

Example 159

Comparative Carbon Black Products

In this comparative example, the carbon black used in Example 118–158 was washed with water, ethanol and water and subsequently dried to give the comparative carbon black product.

Example 160

Comparative Carbon Black Products

In this comparative example, the carbon black used in Examples 118–158 was used without modification and serves as the comparative carbon black product. Use of carbon black products in rubber formulations The carbon black products described in Examples 118–158 can be used in a variety of elastomers. The elastomers include, but are not limited to, the following types: solution SBR, functionalized (tin coupled and/or chemically modified and/or other functionalization) solution SBR, natural rubber, emulsion SBR, polybutadiene, and terpolymers. These elastomers may appear in rubber formulations alone or as blends.

NS 116 and NS 114 are chemically modified tin coupled solution SBRs available from Nippon Zeon, Japan. Duradene 715 is a solution SBR. Duradene is a registered trademark for SBR products available from Firestone, Akron Ohio. S 1216 is a solution SBR available from Goodyear Tire and Rubber Co., Akron Ohio. SBR-1500 is an emulsion SBR available from Copolymer Rubber and Chemical Corp., Baton Rouge, La. SL-574 is a tin coupled solution SBR available from Japan Synthetic Rubber Co. (JSR), Japan. RCT0586 and T0587 are chemically modified solution SBRs also available from JSR. Flexzone is a registered trademark for antidegradent products available from Uniroyal Chemical, Naugatuck, Conn. CBS is N-cyclohexylbenzothiazylsulfenamide, MBT is 2-mercaptobenzothiazole and DTDM is N,N'-dithiodimorpholine.

Examples 161–166

These examples illustrate the use of the carbon black products of Examples 118, 121, 122 and the comparative Example 160 in two different rubber formulations. The polymer was milled in a Brabender mixer for 1 minute at 100° C. The carbon black product or comparative carbon black was added and mixed for 3 additional minutes or until a temperature of 160° C. was reached. The mixture was then dumped and passed through an open mill 3 times. After allowing the compound to stand at room temperature for 2 hours, it was transferred back into the Brabender and mixed for 1 minute at 100° C. After 1 minute, ZnO and stearic acid were added and mixed for 2 minutes and then Flexzone 7P antidegradent was added and mixed for an additional minute or until a temperature of 160° C. was reached. The sample was then dumped, passed through an open mill 3 times and allowed to stand at room temperature for 2 hours. The sample was placed back into the Brabender and mixed for 1 minute at 100° C. The curatives were then added and mixed for 1 minute and the sample then dumped and passed through an open mill 3 times. The formulations used were selected from Table I.

The data in Table II show that carbon black products of the present invention are useful in rubber formulations. In the case where a blend of NS-116 and NS-114 was used, significant increases in 100% modulus, bound rubber, tensile strength, hardness and abrasion resistance can be obtained, as can significant decreases in Tan δ. In Duradene 715, higher modulus, hardness, and bound rubber are obtained, while tensile strength, elongation at break and 70° C. Tan δ are reduced. The magnitude of the effect depends on the specific groups attached to the carbon black product.

Examples 167–180

These examples illustrate the use of the carbon black products of Examples 121–124 and the comparative Example 160 in several different rubber formulations. With the exception of those formulations containing DTDM, rubber compounds were prepared by the method described for Examples 161–166 using formulations selected from Table I. A slight change in the mixing procedure was made for those rubber compounds containing DTDM. In this case, the samples with DTDM were mixed for 3 minutes after addition of the Flexzone 7P, after which, the mixing procedure described for Examples 161–166 was followed.

The performance data in Table III show that carbon black products according to the invention are useful in several different rubber formulations. In particular, carbon black products described in Examples 4 and 5 reduce 70° C. Tan δ when using natural rubber, SBR-1500, or Duradene 715 in the formulation. Furthermore, addition of 0.8 phr of DTDM to the rubber formulations containing carbon black products of Examples 4 and 5 gives vulcanizates with higher hardness, modulus, and bound rubber, relative to the formulation without DTDM. It also results in lower elongation and 70° C. Tan δ and, in general, gives greater tensile strength and improved abrasion resistance.

Examples 181–188

These examples illustrate the use of the carbon black products of Examples 120, 126, 139 and 140 and the comparative Example 160 in several different rubber formulations. The rubber compounds were prepared by the method described for Examples 161–166 using formulations ma selected Table I.

The performance data in Table IV show that carbon black products according to the invention are useful in several different rubber formulations. Specifically, in a blend of NS-116 and NS-114, use of carbon black products from Examples 120, 126, 139 and 140 gave increased bound rubber and significant reductions in 70° C. Tan δ. In Duradene, carbon black products described in Examples 9 and 23 are especially useful in reducing 70° C. Tan δ.

Examples 189–196

These examples illustrate the use of the carbon black products of Examples 123, 127, 134 and 136 and the comparative Example 159 in several different rubber formulations. The rubber compounds were prepared by the following method using formulations selected from Table I.

The polymer was milled in a Brabender mixer for 1 minute at 100° C. A mixture of ZnO and the carbon black product or comparative carbon black was added and mixed for 2 additional minutes. The stearic acid and Flexzone 7P antidegradent were added and mixed for 2 additional minutes. The sample was dumped and passed through an open mill 3 times. The sample was allowed to cool and then transferred back into the Brabender mixer and mixed for 1 minute at 100° C. The curative package was then added, mixing continued for 1 minute, and the sample dumped then passed through a open mill 3 times.

Table V shows that these carbon black products are useful in several rubber formulations including functionalized and unfunctionalized solution SBRs. Furthermore, use of carbon black product described in Example 123 in S-1216, Duradene 715, and NS-116 results in lower 70° C. Tan δ values as well as increased bound rubber. When compounded with NS-114, the carbon black product from Example 127 gave higher modulus, bound rubber and abrasion resistance, lower elongation and 70° C. Tan δ, and equal tensile strength and hardness.

Examples 197–200

These examples illustrate the use of the carbon-black products of Examples 129 and 135 and the comparative Example 160 in two different rubber formulations. The rubber compounds were prepared by the the method described in Examples 189–196 using formulations selected from Table I.

Table VI shows that these carbon black products are useful in these rubber formulations using functionalized or unfunctionalized solution SBRs. When using a blend of NS-116 and NS-114, increases in modulus, hardness, and bound rubber were observed. Sizable decreases in 70° C. Tan δ and elongation are also seen. In Duradene 715, modulus was increased while tensile strength, elongation at break, and 70° C. Tan δ are all substantially reduced.

Examples 201–205

These examples illustrate the use of the carbon black products of Example 155 and the comparative Example 160 in different rubber formulations. The rubber compounds were prepared by the the method described in Examples 189–196 using formulations selected from Table I.

Table VII shows that this carbon black product was useful in a number of rubber formulations, specifically formulations that contained NR, emulsion SBR, or a functionalized solution SBRs selected from SL-574, RCTO-586, or TO-587.

Examples 206–215

These examples illustrate the use of the carbon black products of Examples 154–158 and the comparative Example 159 in two rubber formulations. The rubber compounds were prepared by the the method described in Examples 189–196 using formulations selected from Table I.

As can be seen by inspection of the data in Table VIII below, a wide range of treatment levels as exemplified by the carbon black products in Examples 154–158 can have an impact on rubber performance properties.

Examples 216–221

These examples illustrate the use of the carbon black products of Examples 137, 138, and 141 and the comparative Example 160 in two rubber formulations. The rubber compounds were prepared by the the method described in Examples 161–166 using formulations selected from Table I.

Table IX shows that these carbon black products were useful in several rubber formulations including functionalized and unfunctionalized solution SBRs. In particular, the carbon black products in Examples 137, 138, and 141 all showed lower. 70° C. Tan δ values as well as increased bound rubber in both rubber systems. In addition, the products in Example 137 and 138 also showed improvements in abrasion resistance.

Examples 222–235

These examples illustrate the use of the carbon black products of Examples 142–147 and the comparative Example 160 in three rubber formulations. The rubber compounds were prepared by the the method described in Examples 161–166 using formulations selected from Table I.

Table X shows that these carbon black products were useful in the rubber formulations studied. In particular, all of the blacks studied showed reductions in 70° C. Tan δ values and increased bound rubber in both functionalized and unfunctionalized solution SBRs with comparable hardness. Comparable hardness and 70° C. Tan δ values were found in natural rubber, with the carbon black product of Example 146 showing the greatest reduction in Tan δ.

Examples 236–246

These examples illustrate the use of the carbon black products of Examples 148–153 and the comparative Example 160 in two rubber formulations. The rubber compounds were prepared by the the method described in Examples 161–166 using formulations selected from Table I.

Table XI shows that these carbon black products were useful in rubber formulations. For example, when the carbon black products of Example 148, 149, and 153 were compounded in Duradene 715 or a 70/30 blend of NS-116 and NS-114, in general, abrasion resistance is either unchanged or improved while 70° C. Tan δ values were reduced.

Examples 247–262

These examples illustrate the use of the carbon black products of Examples 119, 125, 128 and 130–133 and the comparative Example 160 in various rubber formulations. The rubber compounds were prepared by the the method described in Examples 161–166 using formulations selected from Table I.

Table XII shows that these carbon black products were useful in rubber formulations. For example, when the carbon black product of Example 119 was compounded with Duradene 715, SBR-1500, or a blend of NS-116 and NS-114, abrasion resistance was improved while 70° C. Tan δ values were reduced and the percentage of bound rubber increased. Use of carbon black products from Examples 130–133 in Duradene 715 and Natural Rubber showed that a wide range of carbon black treatment levels of this type can have an impact on rubber performance properties.

Example 263

Preparation of a Carbon Black Product

Ten grams of a carbon black with a surface area of 230 m2/g and a DBPA of 70 m2/g was added to a stirring solution of 3.06 g of 3-amino-N-ethylpyridinium bromide in 72 g of water. Concentrated nitric acid (1.62 g) was added, and the mixture was stirred and heated to about 70° C. A solution of 1.07 g NaNO$_2$ in about 5 g of water was added over a few minutes. The diazonium salt N$_2$C$_5$H$_4$N(C$_2$H$_5$)$^{+-}$ was formed in situ, which reacted with the carbon black. After the reaction mixture was stirred for one hour, the sample was dried in an oven at 125°. The product had a mean volume particle size of 0.18 microns. The product had attached 3-C$_5$H$_4$N(C$_2$H$_5$)$^+$ groups.

Example 264

Preparation of a Carbon Black Product

3-Amino-N-methylpyridinium iodide (3.92 g) was dissolved in 70 g of water. A solution of 2.58 g AgNO$_3$ in 6 g of water was added. After stirring for 15 minutes, the precipitate was removed by filtration and 10 g of a carbon black with a surface area of 230 m2/g and a DBPA of 70 m2/g was added. Concentrated nitric acid (1.62 g) was added, and the mixture was stirred and heated to about 70°. A solution of 1.07 g NaNO$_2$ in about 5 g of water was added over a few minutes. The diazonium salt N$_2$C$_5$H$_4$CH$_2$N(CH$_3$)$^{++}$ was formed in situ, which reacted with the carbon black. Bubbles were released. After the reaction mixture was stirred for about 40 minutes at 70° and then boiled for about 15 minutes. The sample was dried in an oven at 125°. The product had a mean volume particle size of 0.23 microns. The product had a 325 mesh residue of 0.0% compared to 94% for the untreated carbon black. The product had attached 3-C$_5$H$_4$N(CH$_3$)$^+$ groups.

Example 265

Preparation of a Carbon Black Product

Fifty grams of benzyltrimethylammonium chloride was added over 25 minutes to cold 90% nitric acid. The mixture was kept below 10° C. for five hours. Ice (500 g) was added, and the mixture was neutralized with KOH. The precipitate was removed by filtration. Ethanol (1 L) was added and the mixture was filtered again. 3-Nitrobenzyltrimethylammonium nitrate was recovered from the filtrate. This material was 75% pure by NMR. A mixture of 10 g of 3-Nitrobenzyltrimethylammonium nitrate, 14 g Fe filings, 2 g of concentrated HCl and 400 g of water was boiled for 2.5 hr. The mixture was neutralized with KOH and filtered to give an aqueous solution of 3-aminobenzyltrimethylammonium nitrate/chloride.

Fourteen grams of carbon black with a surface area of 230 m2/g and a DBPA of 70 m2/g was added to a stirring solution of 3.06 g of 3-aminobenzyltrimethylammonium nitrate/chloride in 72 g of water. Concentrated nitric acid (1.62 g) was added, and the mixture was stirred and heated to about 70° C. A solution of 1.07 g NaNO$_2$ in about 5 g of water was added over a few minutes. The diazonium salt 3-N$_2$C$_6$H$_4$N(CH$_3$)$^+$ was formed in situ, which reacted with the carbon black. After the reaction mixture was stirred for one hour, the sample was dried in an oven at 125° C. The product had a mean volume particle size of 0.18 microns. The product had attached 3-N$_2$C$_6$H$_4$CH$_2$N(CH$_3$)$^+$ groups.

Example 266

Preparation of a Carbon Black Product

Silver nitrite (30.9 g) was added to a solution of 41.4 g of N-(4-aminophenyl)pyridinium chloride in 700 g of water and the mixture was stirred at 70° for 1½ hours. The mixture was filtered and 200 g of a carbon black with a surface area of 200 m2/g and a DBPA of 122 mL/100 g was added. An additional one liter of water and 20 g of concentrated HCl were added. The diazonium salt $N_2C_6H_4NC_5H_5^{++}$ was formed in situ, which reacted with the carbon black. Bubbles were released. The dispersion was stirred at 70–80° for 2½ hours and then dried in an oven at 125° C. The product had attached $C_6H_4NC_5H_5^+$ groups.

Example 267

Preparation of a Carbon Black Product

In a modification of a procedure from U.S. Pat. No. 2,821,526, a mixture of 250 g p-acetaminophenacyl chloride, 65 g of trimethylamine and about 600 g of water was stirred for three days at room temperature. An additional 5 g of trimethylamine in 15 g water was added and the mixture was heated at 60° for two hours. After cooling and filtering, 201 g concentrated HCl was added and the solution was boiled for an hour. After cooling, 4 L of acetone was added and 4-aminophenacyltrimethylammonium chloride hydrochloride was collected as a solid. 4-Aminophenacyltrimethylammonium chloride hydrochloride (10.1 g) was suspended in 50 mL of ethanol. After addition of 4.1 g triethylamine, the mixture was stirred for 40 minutes and heated at reflux for one hour. 4-Aminophenacyl-trimethylammonium chloride was collected by filtration and washed with ethanol.

4-Aminophenacyltrimethylammonium chloride (2.51 g) was dissolved in water. Silver nitrite (1.69 g) was added, and the mixture was heated at 70° for one hour. After filtering off the precipitate, 10 g of a carbon black with a surface area of 230 m2/g and a DBPA of 70 mL/100 g was added. Water was added to bring the volume up to about 100 mL. Concentrated HCl (1.1 g) was added and the dispersion was heated with stirring at 70° for one hour. The diazonium salt $N_2C_6H_4COCH_2N(CH_3)_3^{++}$ was formed in situ, which reacted with the carbon black. Bubbles were released. The product had attached $C_6H_4COCH_2N(CH_3)_3^+$ groups.

Example 268

Preparation of a Carbon Black Product

A solution of 2.12 g of 4-acetaminophenacyl chloride, 0.83 g of pyridine and 6.4 g of dimethylsulfoxide was stirred overnight. After addition of an additional 0.8 g of pyridine and 1 g of dimethylsulfoxide, the solution was stirred an additional 5 hours. Ether (50 mL) was added, and acetamidophenacylpyridinium chloride was collected by filtration. The acetamidophenacylpyridinium chloride was dissolved in water, the solution filtered and 1.7 g concentrated HCl was added. After boiling for one hour, the solution was cooled, acetone was added, and 4-aminophenacylpyridinium chloride hydrochloride was collected by filtration. Two grams of 4-aminophenacylpyridinium chloride hydrochloride was dissolved in 15 g water and 4.5 g of a basic ion exchange resin (Amberlite IRA400-OH) was added. After stirring, the resin was removed by filtration and 4-aminophenacylpyridinium chloride was collected as an aqueous solution.

A solution of 1.3 g of 4-aminophenacylpyridinium chloride in 25 g of water was heated at reflux with 1 g silver nitrite for about 90 minutes. The precipitate was removed by filtration. Five grams of a carbon black with a surface area of 200 m2/g and a DBPA of 122 mL/100 g were added and the mixture was heated to about 80°. Concentrated HCl (0.52 g) was added and the dispersion was stirred an additional 1½ hours. The diazonium salt $N_2C_6H_4COCH_2(NC_5H_5)^{++}$ was formed situ, which reacted with the carbon black. The product had attached $C_6H_4COCH_2(NC_5H_5)^+$ groups.

TABLE I

| | | | | | | Rubber Formulations | | | | | | | | |
|---|---|---|---|---|---|---|---|---|---|---|---|---|---|---|
| Formulation | A | B | C | D | E | F | G | H | I | J | K | L | M | N |
| NS-116 | 100 | | 80 | 70 | | | | | | | | | | |
| NS-114 | | 100 | 20 | 30 | | | | | | | | | | |
| Duradene 715 | | | | | 100 | 100 | | | | | | | | |
| Natural Rubber | | | | | | | 100 | 100 | | | | | | |
| SBR-1500 | | | | | | | | | 100 | 100 | | | | |
| S-1216 | | | | | | | | | | | 100 | | | |
| SL-574 | | | | | | | | | | | | 100 | | |
| RCTO-586 | | | | | | | | | | | | | 100 | |
| TO-587 | | | | | | | | | | | | | | 100 |
| CB Product or Comparative | 50 | 50 | 50 | 50 | 50 | 50 | 50 | 50 | 50 | 50 | 50 | 50 | 50 | 50 |
| DTDM | | | | | 0.8 | | | 0.8 | | 0.8 | | | | |
| ZnO | 3 | 3 | 3 | 3 | 3 | 3 | 3 | 3 | 3 | 3 | 3 | 3 | 3 | 3 |
| Stearic Acid | 2 | 2 | 2 | 2 | 2 | 2 | 2 | 2 | 2 | 2 | 2 | 2 | 2 | 2 |
| Flexzone 7P | 1 | 1 | 1 | 1 | 1 | 1 | 1 | 1 | 1 | 1 | 1 | 1 | 1 | 1 |
| CBS | 1.25 | 1.25 | 1.25 | 1.25 | 1.25 | 1.25 | 1.25 | 1.25 | 1.25 | 1.25 | 1.25 | 1.25 | 1.25 | 1.25 |
| MBT | 0.2 | 0.2 | 0.2 | 0.2 | 0.2 | 0.2 | 0.2 | 0.2 | 0.2 | 0.2 | 0.2 | 0.2 | 0.2 | 0.2 |
| Sulfur | 1.75 | 1.75 | 1.75 | 1.75 | 1.75 | 1.75 | 1.75 | 1.75 | 1.75 | 1.75 | 1.75 | 1.75 | 1.75 | 1.75 |
| Total | 159.2 | 159.2 | 159.2 | 159.2 | 159.2 | 160 | 159.2 | 160 | 159.2 | 160 | 159.2 | 159.2 | 159.2 | 159.2 |

TABLE II

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 161 | 118 | D | 4.41 | 21.38 | 21.54 | 305 | 74 | 44 | 0.640 | 0.126 | 124 | 153 |
| 162 | 121 | D | 4.14 | — | 20.96 | 278 | 73 | 54.7 | 0.642 | 0.106 | 137 | 189 |
| 163 | 122 | D | 4.18 | 20.01 | 20.72 | 309 | 74 | 44.3 | 0.634 | 0.117 | 108 | 139 |
| Comp. | 160 | D | 3.69 | — | 14.34 | 257 | 71 | 35.7 | 0.613 | 0.160 | 100 | 100 |
| 164 | 118 | E | 4.20 | — | 15.07 | 242 | 74 | 46.8 | 0.455 | 0.142 | 81 | 106 |
| 165 | 121 | E | 5.66 | — | 15.62 | 214 | 77 | 53.8 | 0.439 | 0.135 | 75 | 107 |
| 166 | 122 | E | 4.10 | — | 14.98 | 254 | 74 | 46.7 | 0.416 | 0.135 | 73 | 106 |
| Comp. | 160 | E | 2.89 | 15.14 | 24.02 | 435 | 70 | 45.4 | 0.414 | 0.178 | 100 | 100 |

TABLE III

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 167 | 121 | G | 3.66 | 18.21 | 27.59 | 472 | 69 | 48.0 | 0.235 | 0.121 | 104 | 101 |
| 168 | 121 | H | 3.87 | 19.32 | 28.16 | 436 | 71 | 51.9 | 0.210 | 0.102 | 100 | 115 |
| 169 | 122 | G | 3.47 | 16.60 | 28.94 | 516 | 70 | 46.0 | 0.249 | 0.111 | 87 | 90 |
| 170 | 123 | H | 3.16 | 15.57 | 28.30 | 518 | 70 | 42.6 | 0.241 | 0.146 | 91 | 90 |
| 171 | 124 | G | 3.55 | 16.75 | 29.67 | 519 | 71 | 42.4 | 0.244 | 0.155 | 102 | 96 |
| Comp. | 160 | G | 3.55 | 17.87 | 29.56 | 489 | 70 | 47.3 | 0.257 | 0.123 | 100 | 100 |
| 172 | 121 | I | 3.42 | 18.82 | 25.11 | 386 | 72 | 40.7 | 0.297 | 0.159 | 107 | 116 |
| 173 | 121 | J | 3.90 | 21.38 | 22.72 | 316 | 74 | 46.9 | 0.281 | 0.143 | 105 | 140 |
| 174 | 122 | I | 3.09 | 15.41 | 25.73 | 464 | 73 | 37.2 | 0.294 | 0.173 | 91 | 114 |
| 175 | 122 | J | 3.85 | 20.57 | 21.07 | 317 | 74 | 45.2 | 0.275 | 0.135 | 98 | 127 |
| 176 | 124 | I | 3.98 | 18.60 | 22.40 | 354 | 73 | 35.7 | 0.279 | 0.172 | 90 | 103 |
| Comp. | 160 | I | 2.91 | 15.76 | 25.36 | 438 | 70 | 34.7 | 0.322 | 0.180 | 100 | 100 |
| 177 | 121 | E | 4.62 | — | 14.57 | 283 | 77 | 44.1 | 0.365 | 0.135 | 66 | 108 |
| 178 | 121 | F | 4.11 | — | 16.15 | 241 | 74 | 49.8 | 0.458 | 0.130 | 104 | 130 |
| 179 | 122 | E | 3.89 | — | 16.72 | 287 | 74 | 43.5 | 0.410 | 0.140 | 79 | 117 |
| 180 | 122 | F | 4.26 | — | 16.91 | 257 | 75 | 46.3 | 0.406 | 0.127 | 94 | 139 |
| Comp. | 160 | E | 3.17 | 16.88 | 20.52 | 350 | 72 | 39.6 | 0.421 | 0.161 | 100 | 100 |

TABLE IV

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 181 | 120 | D | 3.68 | — | 16.32 | 278 | 73 | 45.3 | 0.640 | 0.135 | 80 | 93 |
| 182 | 126 | D | 3.16 | 16.20 | 19.55 | 349 | 73 | 55.8 | 0.630 | 0.122 | 87 | 94 |
| 183 | 139 | D | 3.56 | 15.87 | 18.09 | 334 | 74 | 47.1 | 0.648 | 0.124 | 98 | 81 |
| 184 | 140 | D | 3.02 | 15.13 | 19.97 | 373 | 72 | 46.3 | 0.662 | 0.135 | 103 | 95 |
| Comp. | 160 | D | 3.60 | 16.88 | 20.58 | 354 | 75 | 39.9 | 0.622 | 0.166 | 100 | 100 |
| 185 | 120 | E | 3.03 | 14.74 | 16.92 | 334 | 74 | 45.7 | 0.459 | 0.162 | 99 | 94 |
| 186 | 126 | E | 3.87 | — | 12.84 | 238 | 75 | 49.9 | 0.460 | 0.146 | 84 | 120 |
| 187 | 139 | E | 3.30 | — | 14.76 | 296 | 75 | 46.4 | 0.396 | 0.137 | 63 | 100 |
| 188 | 140 | E | 2.41 | 11.60 | 18.34 | 428 | 72 | 45.5 | 0.409 | 0.170 | 70 | 101 |
| Comp. | 160 | E | 3.15 | — | 15.06 | 283 | 73 | 44.1 | 0.468 | 0.163 | 100 | 100 |

TABLE V

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 189 | 123 | K | 4.85 | 18.31 | 18.56 | 312 | 65 | 30.2 | 0.373 | 0.168 | 85 | 99 |
| 190 | 134 | K | 3.87 | 15.50 | 20.65 | 383 | 64 | 25.8 | 0.395 | 0.177 | 89 | 66 |
| Comp. | 159 | K | 4.01 | 17.03 | 19.64 | 336 | 62 | 27.3 | 0.450 | 0.176 | 100 | 100 |
| 191 | 123 | E | 4.25 | — | 15.07 | 260 | 62 | 32.3 | 0.375 | 0.175 | 88 | 110 |
| 192 | 134 | E | 4.61 | 18.50 | 21.80 | 349 | 60 | 29.4 | 0.401 | 0.198 | 90 | 91 |
| Comp. | 159 | E | 4.96 | 19.73 | 20.66 | 315 | 59 | 30.7 | 0.430 | 0.194 | 100 | 100 |
| 193 | 123 | B | 3.62 | — | 23.33 | 386 | 69 | 30.86 | 0.278 | 0.141 | 92 | 104 |
| Comp. | 159 | B | 3.42 | — | 23.41 | 402 | 69 | 28.36 | 0.297 | 0.146 | 100 | 100 |
| 194 | 127 | B | 4.04 | — | 18.52 | 294 | 60 | 35 | 0.289 | 0.137 | 110 | 113 |
| Comp. | 159 | B | 3.25 | 14.09 | 18.36 | 385 | 60 | 28.1 | 0.327 | 0.173 | 100 | 100 |
| 195 | 136 | B | 3.61 | — | 20.94 | 447 | 62 | 27.7 | — | 0.165 | 59 | 79 |
| Comp. | 159 | B | 3.53 | — | 22.08 | 387 | 63 | 24.2 | — | 0.157 | 100 | 100 |

TABLE V-continued

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 196 | 136 | E | 5.10 | — | 15.57 | 284 | 63 | 26.3 | — | 0.171 | 41 | 74 |
| Comp. | 159 | E | 4.54 | — | 20.56 | 316 | 63 | 21.4 | — | 0.179 | 100 | 100 |

TABLE VI

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 197 | 129 | C | 3.29 | 14.57 | 19.99 | 389 | 75 | 37.7 | 0.665 | 0.142 | 90 | 116 |
| 198 | 135 | C | 3.01 | 13.66 | 18.03 | 372 | 75 | 43.2 | 0.648 | 0.141 | 89 | 106 |
| Comp. | 160 | C | 2.85 | 12.78 | 19.13 | 408 | 74 | 32.8 | 0.668 | 0.173 | 100 | 100 |
| 199 | 129 | E | 3.24 | — | 12.90 | 272 | 77 | 36.1 | 0.405 | 0.162 | 80 | 117 |
| 200 | 135 | E | 4.36 | — | 11.08 | 239 | 79 | 31.0 | 0.379 | 0.165 | 49 | 81 |
| Comp. | 160 | E | 2.80 | 13.65 | 22.23 | 447 | 75 | 33.9 | 0.448 | 0.178 | 100 | 100 |

TABLE VII

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 201 | 155 | I | 3.56 | 14.91 | 23.63 | 468 | 74 | 33.8 | 0.291 | 0.192 | 83 | 85 |
| Comp. | 160 | I | 3.40 | 15.57 | 26.95 | 492 | 74 | 34.2 | 0.327 | 0.201 | 100 | 100 |
| 202 | 155 | G | 2.77 | 14.19 | 30.13 | 567 | 72 | 34.1 | 0.239 | 0.129 | 87 | 84 |
| Comp. | 160 | G | 3.76 | 17.91 | 31.15 | 504 | 72 | 43.2 | 0.241 | 0.117 | 100 | 100 |
| 203 | 155 | L | 3.77 | 13.36 | 19.14 | 325 | 75 | 39.1 | 0.273 | 0.124 | 92 | 114 |
| Comp. | 160 | L | 2.96 | 13.39 | 21.22 | 430 | 73 | 37.3 | 0.300 | 0.149 | 100 | 100 |
| 204 | 155 | M | 3.23 | 10.31 | 14.09 | 420 | 74 | 17.9 | 0.790 | 0.179 | 68 | 73 |
| Comp. | 160 | M | 2.61 | 9.50 | 17.64 | 525 | 71 | 17.5 | 0.819 | 0.246 | 100 | 100 |
| 205 | 155 | N | 3.22 | 13.19 | 23.12 | 536 | 78 | 33 | 0.332 | 0.185 | 104 | 103 |
| Comp. | 160 | N | 3.83 | 15.06 | 19.54 | 408 | 80 | 27.1 | 0.354 | 0.225 | 100 | 100 |

TABLE VIII

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 206 | 154 | A | 4.08 | 17.75 | 22.13 | 362 | 63 | 37.5 | 0.792 | 0.173 | 101 | 134 |
| 207 | 155 | A | 3.95 | 16.96 | 22.13 | 376 | 63 | 37.5 | 0.814 | 0.178 | 95 | 150 |
| 208 | 156 | A | 3.74 | 15.15 | 15.66 | 300 | 62 | 41.1 | 0.785 | 0.149 | 86 | 152 |
| 209 | 157 | A | 4.02 | — | 14.59 | 290 | 62 | 37.2 | 0.776 | 0.150 | 72 | 141 |
| 210 | 158 | A | 3.46 | — | 16.42 | 357 | 61 | 32.8 | 0.783 | 0.180 | 84 | 130 |
| Comp. | 159 | A | 3.76 | 15.25 | 19.94 | 375 | 67 | 24.6 | 0.777 | 0.233 | 100 | 100 |
| 211 | 154 | E | 6.08 | — | 14.39 | 212 | 63 | 30.7 | 0.377 | 0.160 | 71 | 128 |
| 212 | 155 | E | 6.78 | — | 12.30 | 178 | 66 | 24.9 | 0.325 | 0.148 | 51 | 91 |
| 213 | 156 | E | 6.28 | — | 11.10 | 175 | 66 | 25.2 | 0.322 | 0.156 | 54 | 100 |
| 214 | 157 | E | 5.90 | — | 10.62 | 187 | 68 | 23.4 | 0.309 | 0.166 | 47 | 83 |
| 215 | 158 | E | 5.95 | — | 11.06 | 190 | 66 | 27.0 | 0.315 | 0.168 | 53 | 91 |
| Comp. | 159 | E | 4.96 | 19.73 | 20.66 | 315 | 59 | 30.7 | 0.430 | 0.194 | 100 | 100 |

TABLE IX

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 216 | 137 | D | 4.21 | 22.24 | 23.04 | 310 | 73 | 44.3 | 0.591 | 0.127 | 94 | 111 |
| 217 | 138 | D | 4.11 | 21.64 | 26.69 | 323 | 74 | 44.0 | 0.670 | 0.123 | 99 | 111 |
| Comp. | 160 | D | 4.14 | — | 17.62 | 268 | 74 | 37.5 | 0.615 | 0.141 | 100 | 100 |
| 218 | 141 | D | 3.98 | 18.90 | 19.23 | 305 | 73 | 44.9 | 0.611 | 0.118 | 94 | 80 |
| Comp. | 160 | D | 4.05 | 19.56 | 22.38 | 337 | 72 | 38.3 | 0.586 | 0.142 | 100 | 100 |
| 219 | 137 | E | 3.81 | — | 16.55 | 251 | 73 | 46.3 | 0.450 | 0.135 | 127 | 141 |
| 220 | 138 | E | 4.00 | — | 16.16 | 241 | 74 | 46.1 | 0.440 | 0.138 | 114 | 131 |
| Comp. | 160 | E | 3.74 | — | 17.56 | 272 | 73 | 39.7 | 0.312 | 0.157 | 100 | 100 |

TABLE IX-continued

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 221 | 141 | E | 4.06 | — | 13.38 | 260 | 75 | 43.5 | 0.378 | 0.158 | 61 | 75 |
| Comp. | 160 | E | 3.30 | 17.38 | 20.65 | 344 | 71 | 42.5 | 0.481 | 0.163 | 100 | 100 |

TABLE X

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 222 | 142 | E | 3.82 | 18.49 | 19.75 | 319 | 73 | 42.7 | 0.488 | 0.152 | 76 | 101 |
| 223 | 143 | E | 3.49 | 16.70 | 18.96 | 332 | 73 | 42.2 | 0.466 | 0.164 | 77 | 108 |
| 224 | 144 | E | 3.57 | 17.49 | 18.68 | 316 | 73 | 42.4 | 0.477 | 0.150 | 66 | 120 |
| 225 | 145 | E | 3.35 | 17.23 | 18.56 | 328 | 73 | 41.6 | 0.531 | 0.160 | 64 | 97 |
| Comp. | 160 | E | 3.21 | 16.19 | 21.51 | 377 | 72 | 41.2 | 0.494 | 0.169 | 100 | 100 |
| 226 | 142 | D | 3.68 | 18.53 | 22.54 | 353 | 72 | 41.8 | 0.650 | 0.118 | 81 | 99 |
| 227 | 143 | D | 3.62 | 17.85 | 22.62 | 366 | 72 | 43.1 | 0.664 | 0.134 | 89 | 108 |
| 228 | 144 | D | 3.68 | — | 13.36 | 239 | 72 | 44.4 | 0.655 | 0.125 | 96 | 105 |
| 229 | 145 | D | 3.92 | — | 15.80 | 259 | 72 | 42.9 | 0.678 | 0.126 | 81 | 99 |
| 230 | 146 | D | 3.72 | 18.91 | 22.08 | 340 | 72 | 43.7 | 0.860 | 0.128 | 84 | 104 |
| 231 | 147 | D | 3.87 | — | 17.90 | 285 | 72 | 45.1 | 0.643 | 0.119 | 84 | 109 |
| Comp. | 160 | D | 3.73 | 17.51 | 20.16 | 336 | 73 | 40.0 | 0.682 | 0.155 | 100 | 100 |
| 232 | 142 | G | 3.47 | 16.49 | 27.76 | 489 | 70 | 43.3 | 0.281 | 0.148 | 74 | 86 |
| 233 | 145 | G | 3.44 | 16.45 | 27.80 | 495 | 70 | 43.8 | 0.251 | 0.145 | 74 | 46 |
| 234 | 146 | G | 3.44 | 16.57 | 27.53 | 488 | 70 | 44.0 | 0.248 | 0.139 | 72 | 85 |
| 235 | 147 | G | 3.89 | 17.81 | 28.28 | 478 | 71 | 44.4 | 0.267 | 0.156 | 76 | 92 |
| Comp. | 160 | G | 3.88 | 18.40 | 28.78 | 470 | 71 | 49.1 | 0.262 | 0.146 | 100 | 100 |

TABLE XI

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Index 14% Slip | Abrader Index 21% Slip |
|---|---|---|---|---|---|---|---|---|---|---|---|---|
| 236 | 148 | D | 3.65 | 18.36 | 21.30 | 339 | 73 | 43.6 | 0.603 | 0.122 | 120 | 101 |
| 237 | 149 | D | 3.60 | — | 17.24 | 287 | 73 | 43.7 | 0.635 | 0.124 | 120 | 114 |
| 238 | 150 | D | 3.67 | — | 15.47 | 280 | 73 | 36.7 | 0.647 | 0.120 | 85 | 76 |
| 239 | 151 | D | 3.74 | 17.65 | 20.99 | 348 | 73 | 38.9 | 0.618 | 0.149 | 133 | 115 |
| 240 | 152 | D | 3.36 | 16.50 | 20.77 | 358 | 73 | 40.1 | 0.651 | 0.148 | 117 | 94 |
| 241 | 153 | D | 3.83 | — | 16.08 | 263 | 73 | 51.0 | 0.589 | 0.111 | 104 | 108 |
| Comp. | 160 | D | 3.76 | 18.94 | 20.39 | 318 | 73 | 38.4 | 0.624 | 0.138 | 100 | 100 |
| 242 | 148 | E | 3.52 | 15.21 | 15.87 | 266 | 73 | 49.3 | 0.430 | 0.136 | 93 | 134 |
| 243 | 149 | E | 3.18 | — | 15.40 | 280 | 73 | 46.5 | 0.431 | 0.145 | 104 | 113 |
| 244 | 150 | E | 3.48 | — | 15.57 | 292 | 73 | 38.4 | 0.412 | 0.140 | 68 | 95 |
| 245 | 151 | E | 2.81 | 14.35 | 19.54 | 382 | 71 | 43.5 | 0.446 | 0.172 | 95 | 112 |
| 246 | 153 | E | 4.96 | — | 10.63 | 173 | 78 | 39.8 | 0.406 | 0.136 | 53 | 100 |
| Comp. | 160 | E | 2.79 | — | 12.87 | 261 | 70 | 45.6 | 0.462 | 0.164 | 100 | 100 |

TABLE XII

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Abrader Index 14% Slip | Abrader Abrader Index 21% Slip |
|---|---|---|---|---|---|---|---|---|---|---|---|---|
| 247 | 119 | E | 3.63 | — | 14.43 | 246 | 74 | 46.1 | 0.439 | 0.142 | 107 | 126 |
| 248 | 125 | E | 3.06 | 16.33 | 19.15 | 342 | 72 | 40.2 | 0.446 | 0.150 | 111 | 102 |
| 249 | 130 | E | 4.38 | — | 14.69 | 247 | 76 | 42.0 | 0.439 | 0.134 | 75 | 105 |
| 250 | 131 | E | 3.93 | — | 17.69 | 289 | 74 | 43.2 | 0.389 | 0.136 | 88 | 107 |
| 251 | 132 | E | 4.17 | — | 16.88 | 266 | 74 | 47.4 | 0.460 | 0.136 | 101 | 177 |
| 252 | 133 | E | 3.52 | — | 19.18 | 318 | 73 | 43.3 | 0.475 | 0.142 | 103 | 105 |
| Comp. | 160 | E | 3.26 | 17.08 | 22.91 | 383 | 71 | 38.6 | 0.439 | 0.164 | 100 | 100 |
| 253 | 119 | D | 3.70 | — | 19.08 | 299 | 73 | 45.6 | 0.691 | 0.127 | 109 | 133 |
| 254 | 128 | D | 3.88 | 18.01 | 20.4 | 333 | 74 | 39.4 | 0.462 | 0.129 | 77 | 110 |
| Cornp. | 160 | D | 3.41 | 17.06 | 20.35 | 344 | 73 | 37.6 | 0.622 | 0.152 | 100 | 100 |
| 255 | 119 | I | 3.38 | 18.8 | 22.68 | 350 | 72 | 41.1 | 0.272 | 0.151 | 113 | 114 |
| 256 | 130 | I | 3.55 | 16.93 | 23.73 | 396 | 71 | 37.2 | 0.293 | 0.169 | 104 | 111 |
| Comp. | 160 | I | 3.09 | 16.08 | 23.46 | 407 | 71 | 34.7 | 0.327 | 0.179 | 100 | 100 |

TABLE XII-continued

| Ex. | Carbon Black Prod. | Form. | 100% Modulus Mpa | 300% Modulus Mpa | Tensile Mpa | Elong. | Hardness Shore A | Bound Rubber | Tan_δ 0° C. | Tan_δ 70° C. | Abrader Abrader Index 7% Slip | Abrader Abrader Index 14% Slip |
|---|---|---|---|---|---|---|---|---|---|---|---|---|
| 257 | 119 | G | 3.56 | 17.13 | 29.20 | 505 | 71 | 37.9 | 0.256 | 0.132 | 96 | 105 |
| 258 | 125 | G | 3.21 | 15.94 | 28.87 | 529 | 69 | 37.9 | 0.249 | 0.139 | 92 | 92 |
| 259 | 130 | G | 3.27 | 16.55 | 27.70 | 505 | 69 | 41.5 | 0.233 | 0.115 | 97 | 106 |
| 260 | 131 | G | 3.20 | 16.58 | 29.30 | 509 | 69 | 42.0 | 0.236 | 0.123 | 103 | 110 |
| 261 | 132 | G | 3.32 | 16.65 | 26.82 | 485 | 70 | 43.6 | 0.250 | 0.153 | 103 | 108 |
| 262 | 133 | G | 3.19 | 16.36 | 28.72 | 508 | 69 | 42.4 | 0.251 | 0.128 | 93 | 93 |
| Comp. | 160 | G | 3.57 | 18.29 | 28.09 | 472 | 70 | 41.7 | 0.252 | 0.127 | 100 | 100 |

Example 269

Preparation of a Carbon Black Product

A cold solution of 3.56 g $NaNO_2$ in water was added to a solution of 10.2 g 4,4'-methylenedianiline, 140 g of water and 19.7 g of concentrated HCl that was stirring in an ice bath. After stirring for about 15 minutes, the resulting solution of the diazonium salt was added to a suspension of 200 g of a carbon black in 1.6 L of water that was stirring at room temperature. The carbon black had a surface area of 55 m2/g and DBPA of 46 mL/100 g. After stirring for 1½ hours, the mixture was neutralized with NaOH and filtered. The carbon black product was washed with water and dried in an oven at 125° C. The carbon black product contained 0.332% nitrogen after Soxhlet extraction overnight with THF, compared to 0.081% nitrogen for the untreated carbon black. Therefore, the carbon black product had 0.18 mmol/g of attached $C_6H_4CH_2C_6H_4NH_2$ groups.

The claimed invention is:

1. A carbon black product having an organic group attached to the carbon black, obtained by a process comprising the step of reacting at least one diazonium salt with a carbon black in a protic reaction medium, wherein said diazonium salt is generated in situ from a primary amine, the protic medium is an aqueous medium, and the primary amine is an amine of the formula $A_yArNH_2$, in which:

Ar is an aromatic or heteroaromatic radical;

y is an integer from 1 to the total number of —CH radicals present in the aromatic radical; and A, which can be the same or different when y is greater than 1, is independently a substituent on the aromatic radical selected from:

a functional group selected from the group consisting of a branched or unbranched $C_1$–$C_{20}$ substituted alkyl, branched or unbranched $C_3$–$C_{20}$ unsubstituted alkyl, unsubstituted or substituted alkenyl, unsubstituted or substituted alkynyl, unsubstituted or substituted heteroaryl, unsubstituted or substituted alkylaryl, and unsubstituted or substituted arylalkyl;

a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, N=NR, $N_2^+X^-$, $NR_3^+X^-$, $PR_3^+X^-$, $S_kR$, $SO_2NRR'$, $SO_2SR$, SNRR', $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and a linear, branched, aromatic, or cyclic hydrocarbon radical, substituted with one or more of said functional groups and/or halogen(s);

wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO(CH_2)_z$, $(CH_2)_xNR(CH_2)_z$ or $(CH_2)_xS(CH_2)_z$, wherein x is 1 to 6, z is 1 to 6;

and w is 2 to 6; and wherein Ar is optionally further substituted with alkyl(s) and/or halogen(s).

2. The carbon black product of claim 1, wherein

Ar is an aromatic or heteroaromatic radical;

y is an integer from 1 to the total number of —CH radicals present in the aromatic radical; and A, which can be the same or different when y is greater than 1, is independently a substituent on the aromatic radical selected from:

a functional group selected from the group consisting of a branched or unbranched $C_1$–$C_{20}$ substituted alkyl, unsubstituted or substituted alkenyl, unsubstituted or substituted alkynyl, unsubstituted or substituted heteroaryl, unsubstituted or substituted alkylaryl, and unsubstituted or substituted arylalkyl;

a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, N=NR, $N_2^+X^-$, $NR_3^+X^-$, $PR_3^+X^-$, $S_kR$, $SO_2NRR'$, $SO_2SR$, SNRR', $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and a linear, branched, aromatic, or cyclic hydrocarbon radical, substituted with one or more of said functional groups and/or halogen(s);

wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO(CH_2)_z$, $(CH_2)_xNR(CH_2)_z$ or $(CH_2)_xS(CH_2)_z$, wherein x is 1 to 6, z is 1 to 6, and w is 2 to 6;

and wherein Ar is optionally further substituted with alkyl(s) and/or halogen(s).

3. The carbon product of claim 1, wherein

Ar is an aromatic or heteroaromatic radical;

y is an integer from 1 to the total number of —CH radicals present in the aromatic radical; and A, which can be the same or different when y is greater than 1, is independently a substituent on the aromatic radical selected from:

a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, N=NR, $N_2^+X^-$, $NR_3^+X^-$, $PR_3^+X^-$, $S_kR$, $SO_2NRR'$, $SO_2SR$, $SNRR'$, $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and a linear, branched, aromatic, or cyclic hydrocarbon radical, substituted with one or more of said functional groups and/or halogen(s);

wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO(CH_2)_z$, $(CH_2)_xNR(CH_2)_z$ or $(CH_2)_xS(CH_2)_z$, wherein x is 1 to 6, z is 1 to 6, and w is 2 to 6;

and wherein Ar is optionally further substituted with alkyl(s) and/or halogen(s).

4. The carbon black product of claim 1, wherein

Ar is an aromatic or heteroaromatic radical;

y is an integer from 1 to the total number of —CH radicals present in the aromatic radical; and A, which can be the same or different when y is greater than 1, is a functional group selected from the group consisting of a branched or unbranched $C_1$–$C_{20}$ substituted alkyl, branched or unbranched $C_3$–$C_{20}$ unsubstituted alkyl, unsubstituted or substituted alkenyl, unsubstituted or substituted alkynyl, unsubstituted or substituted heteroaryl, unsubstituted or substituted alkylaryl, and unsubstituted or substituted arylalkyl.

5. A carbon black product, having an aromatic group attached to the carbon black, obtained by a process comprising the step of reacting at least one diazonium salt with a carbon black in a protic reaction medium, wherein said aromatic group is a group of the formula $A_yAr$, in which:

Ar is an aromatic or heteroaromatic radical;

y is an integer from 1 to the total number of —CH radicals present in the aromatic radical;

and A, which can be the same or different when y is greater than 1, is independently a substituent on the aromatic radical selected from:

a functional group selected from the group consisting of a branched or unbranched $C_1$–$C_{20}$ substituted alkyl, branched or unbranched $C_3$–$C_{20}$ unsubstituted alkyl, unsubstituted or substituted alkenyl, unsubstituted or substituted alkynyl, unsubstituted or substituted heteroaryl, unsubstituted or substituted alkylaryl, and unsubstituted or substituted arylalkyl;

a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, N=NR, $N_2^+X^-$, $NR_3^+X^-$, $PR_3^+X^-$, $S_kR$, $SO_2NRR'$, $SO_2SR$, $SNRR'$, $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and a linear, branched, aromatic, or cyclic hydrocarbon radical, substituted with one or more of said functional groups and/or halogen(s);

wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO(CH_2)_z$, $(CH_2)_xNR(CH_2)_z$ or $(CH_2)_xS(CH_2)_z$, wherein x is 1 to 6, z is 1 to 6, and w is 2 to 6;

and wherein Ar is optionally further substituted with alkyl(s) and/or halogen(s).

6. The carbon black product of claim 5, wherein

Ar is an aromatic or heteroaromatic radical;

y is an integer from 1 to the total number of —CH radicals present in the aromatic radical; and A, which can be the same or different when y is greater than 1, is independently a substituent on the aromatic radical selected from:

a functional group selected from the group consisting of a branched or unbranched $C_1$–$C_{20}$ substituted alkyl, unsubstituted or substituted alkenyl, unsubstituted or substituted alkynyl, unsubstituted or substituted heteroaryl, unsubstituted or substituted alkylaryl, and unsubstituted or substituted arylalkyl;

a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, N=NR, $N_2^+X^-$, $NR_3^+X^-$, $PR_3^+X^-$, $S_kR$, $SO_2NRR'$, $SO_2SR$, $SNRR'$, $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and a linear, branched, aromatic, or cyclic hydrocarbon radical, substituted with one or more of said functional groups and/or halogen(s);

wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO(CH_2)_z$, $(CH_2)_xNR(CH_2)_z$ or $(CH_2)_xS(CH_2)_z$, wherein x is 1 to 6, z is 1 to 6, and w is 2 to 6;

and wherein Ar is optionally further substituted with alkyl(s) and/or halogen(s).

7. The carbon black product of claim 5, wherein

Ar is an aromatic or heteroaromatic radical;

y is an integer from 1 to the total number of —CH radicals present in the aromatic radical; and A, which can be the same or different when y is greater than 1, is independently a substituent on the aromatic radical selected from:

a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, N=NR, $N_2^+X^-$, $NR_3^+X^-$, $PR_3^+X^-$, $S_kR$, $SO_2NRR'$, $SO_2SR$, SNRR', $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and a linear, branched, aromatic, or cyclic hydrocarbon radical, substituted with one or more of said functional groups and/or halogen(s);

wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO(CH_2)_z$, $(CH_2)_xNR(CH_2)_z$ or $(CH_2)_xS(CH_2)_z$, wherein x is 1 to 6, z is 1 to 6, and w is 2 to 6;

and wherein Ar is optionally further substituted with alkyl(s) and/or halogen(s).

8. The carbon black product of claim 5, wherein
Ar is an aromatic or heteroaromatic radical;
y is an integer from 1 to the total number of —CH radicals present in the aromatic radical; and
A, which can be the same or different when y is greater than 1, is a functional group selected from the group consisting of a branched or unbranched $C_1$–$C_{20}$ substituted alkyl, branched or unbranched $C_3$–$C_{20}$ unsubstituted alkyl, unsubstituted or substituted alkenyl, unsubstituted or substituted alkynyl, unsubstituted or substituted heteroaryl, unsubstituted or substituted alkylaryl, and unsubstituted or substituted arylalkyl.

9. The carbon black product of claim 5, wherein
Ar is an aromatic or heteroaromatic radical;
y is an integer from 1 to the total number of —CH radicals present in the aromatic radical; and
A, which can be the same or different when y is greater than 1, is independently a substituent on the aromatic radical selected from:
a functional group selected from the group, consisting of a branched or unbranched $C_1$–$C_{20}$ substituted alkyl, branched or unbranched $C_3$–$C_{20}$ unsubstituted alkyl, unsubstituted or substituted alkenyl, unsubstituted or substituted alkynyl, unsubstituted or substituted heteroaryl, unsubstituted or substituted alkylaryl, and unsubstituted or substituted arylalkyl;
a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, N=NR, $N_2^+X^-$, $NR_3^+X^-$, $PR_3^+X^-$, $S_kR$, $SO_2NRR'$, $SO_2SR$, SNRR', $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and
a linear, branched, aromatic, or cyclic hydrocarbon radical, substituted with one or more of said functional groups;
wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO(CH_2)_z$, $(CH_2)_xNR(CH_2)_z$ or $(CH_2)_xS(CH_2)_z$, wherein x is 1 to 6, z is 1 to 6, and w is 2 to 6.

10. The carbon black product of claim 5, wherein said aromatic group is a group of the formula $A_yAr$, in which:
Ar is an aromatic radical selected from the group consisting of phenyl, naphthyl, anthryl, phenanthyl, biphenyl, and pyridyl;
y is an integer from 1 to 5 when Ar is phenyl, 1 to 7 when Ar is naphthyl, 1 to 9 when Ar is anthryl, phenanthryl, or biphenyl, and 1 to 4 when Ar is pyridyl; and
A, which can be the same or different when y is greater than 1, is independently a substituent on the aromatic radical selected from:
a functional group selected from the group consisting of a branched or unbranched $C_1$–$C_{20}$ substituted alkyl, unsubstituted or substituted alkenyl, unsubstituted or substituted alkynyl, unsubstituted or substituted heteroaryl, unsubstituted or substituted alkylaryl, and unsubstituted or substituted arylalkyl;
a functional group selected from the group consisting of OR, COR, COOR, OCOR, COOLi, COONa, COOK, $COO^-NR_4^+$, CN, $NR_2$, $SO_3H$, $SO_3Li$, $SO_3Na$, $SO_3K$, $SO_3K$, $SO_3^-NR_4^+$, NR(COR), $CONR_2$, $NO_2$, $PO_3HNa$, $PO_3Na_2$, N=NR, $N_2^+X^-$, $PR_3^+X^-$, $S_kR$, SOR, and $SO_2R$; and
a linear, branched, aromatic, or cyclic hydrocarbon radical, substituted with one or more of said functional groups;
wherein R is hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; and $X^-$ is a halide or an anion derived from a mineral or organic acid.

11. The carbon black product of claim 5, wherein said aromatic group is a group of the formula $A_yAr$, in which:
Ar is an aromatic radical selected from the group consisting of phenyl, naphthyl, benzothiazolyl, and benzothiadiazolyl;
y is an integer from 1 to 5 when Ar is phenyl, 1 to 7 when Ar is naphthyl, 1 to 4 when Ar is benzothiazolyl, and 1 to 3 when Ar is benzothiadiazolyl; and
A, which can be the same or different when y is greater than 1, is independently a substituent on the aromatic radical selected from:
a functional group selected from the group consisting of $S_kR$, $SSO_3H$, $SO_2NRR'$, $SO_2SR$, SNRR', SNQ, $SO_2NQ$, $CO_2NQ$, S-(1,4-piperazinediyl)-SR, 2-(1,3-dithianyl), 2-(1,3-dithiolanyl); and
a linear, branched, aromatic, or cyclic hydrocarbon radical, substituted with one or more of said functional groups;
wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO(CH_2)_z$, $(CH_2)_xNR(CH_2)_z$ or $(CH_2)_xS(CH_2)_z$, wherein x is 1 to 6, z is 1 to 6, and w is 2 to 6.

12. The carbon black product of claim 5, wherein
Ar is an aromatic or heteroaromatic radical;
y is an integer from 1 to the total number of —CH radicals present in the aromatic radical; and
A, which can be the same or different when y is greater than 1, is independently a substituent on the aromatic radical selected from:
   a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, $N=NR$, $N_2^+X^-$, $NR_3^+X^-$, $PR_3^+X^-$, $S_kR$, $SO_2NRR'$, $SO_2SR$, $SNRR'$, $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and
   a linear, branched, aromatic, or cyclic hydrocarbon radical, substituted with one or more of said functional groups;
wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO(CH_2)_z$, $(CH_2)_xNR(CH_2)_z$ or $(CH_2)_xS(CH_2)_z$, wherein x is 1 to 6, z is 1 to 6, and w is 2 to 6.

13. The carbon black product of claim 12, wherein said aromatic group is a group of the formula $A_yAr$, in which:
Ar is an aromatic radical selected from the group consisting of phenyl, naphthyl, anthryl, phenanthryl, biphenyl, and pyridyl;
y is an integer from 1 to 5 when Ar is phenyl, 1 to 7 when Ar is naphthyl, 1 to 9 when Ar is anthryl, phenanthryl, or biphenyl, and 1 to 4 when Ar is pyridyl; and
A, which can be the same or different when y is greater than 1, is independently a substituent on the aromatic radical selected from:
   a functional group selected from the group consisting of OR, COR, COOR, OCOR, COOLi, COONa, COOK, $COO^-NR_4^+$, CN, $NR_2$, $SO_3H$, $SO_3Li$, $SO_3Na$, $SO_3K$, $SO_3^-NR_4^+$, NR(COR), $CONR_2$, $NO_2$, $PO_3HNa$, $PO_3Na_2$, $N=NR$, $N_2^+X^-$, $X^-$, $PR_3^+X^-$, $S_kR$, SOR, and $SO_2R$; and
   a linear, branched, aromatic, or cyclic hydrocarbon radical, substituted with one or more of said functional groups;
wherein R is hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; and $X^-$ is a halide or an anion derived from a mineral or organic acid.

14. The carbon black product of claim 12, wherein said aromatic group is a group of the formula $A_yAr$, in which:
Ar is an aromatic radical selected from the group consisting of phenyl, benzothiazolyl, and benzothiadiazolyl;
y is an integer from 1 to 5 when Ar is phenyl, 1 to 4 when Ar is benzothiazolyl, and 1 to 3 when Ar is benzothiadiazolyl; and
A, which can be the same or different when y is greater than 1, is independently a substituent on the aromatic radical selected from:
   a functional group selected from the group consisting of $S_kR$, $SSO_3H$, $SO_2NRR'$, $SO_2SR$, $SNRR'$, SNQ, $SO_2NQ$, $CO_2NQ$, S-(1,4-piperazinediyl)-SR, 2-(1,3-dithianyl), 2-(1,3-dithiolanyl); and
   a linear, branched, aromatic, or cyclic hydrocarbon radical, substituted with one or more of said functional groups;
wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO(CH_2)_z$, $(CH_2)_xNR(CH_2)_z$ or $(CH_2)_xS(CH_2)_z$, wherein x is 1 to 6, z is 1 to 6, and w is 2 to 6.

15. A carbon black product comprising a carbon black and at least one organic group attached to the carbon black, wherein the organic group is an aromatic group of the formula $A_yAr$, wherein:
Ar is an aromatic or heteroaromatic radical;
y is an integer from 1 to the total number of —CH radicals present in the aromatic radical; and
A, which can be the same or different when y is greater than 1, is independently a substituent on the aromatic radical selected from:
   a functional group selected from the group consisting of a branched or unbranched $C_1$–$C_{20}$ substituted alkyl, branched or unbranched $C_3$–$C_{20}$ unsubstituted alkyl, unsubstituted or substituted alkenyl, unsubstituted or substituted alkynyl, unsubstituted or substituted heteroaryl, unsubstituted or substituted alkylaryl, and unsubstituted or substituted arylalkyl;
   a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, $N=NR$, $N_2^+X^-$, $NR_3^+X^-$, $PR_3^+X^-$, $S_kR$, $SO_2NRR'$, $SO_2SR$, $SNRR'$, $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and
   a linear, branched, aromatic, or cyclic hydrocarbon radical, substituted with one or more of said functional groups and/or halogen(s);
wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO(CH_2)_z$, $(CH_2)_xNR(CH_2)_z$ or $(CH_2)_xS(CH_2)_z$, wherein x is 1 to 6, z is 1 to 6, and w is 2 to 6;
and wherein Ar is optionally further substituted with alkyl(s) and/or halogen(s).

16. The carbon black product of claim 15, wherein:
Ar is an aromatic or heteroaromatic radical;
y is an integer from 1 to the total number of —CH radicals present in the aromatic radical; and A, which can be the same or different when y is greater than 1, is independently a substituent on the aromatic radical selected from:
  a functional group selected from the group consisting of a branched or unbranched $C_1$–$C_{20}$ substituted alkyl, unsubstituted or substituted alkenyl, unsubstituted or substituted alkynyl, unsubstituted or substituted heteroaryl, unsubstituted or substituted alkylaryl, and unsubstituted or substituted arylalkyl;
  a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, N=NR, $N_2^+X^-$, $NR_3^+X^-$, $PR_3^+X^-$, $S_kR$, $SO_2NRR'$, $SO_2SR$, SNRR', $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and
  a linear, branched, aromatic, or cyclic hydrocarbon radical, substituted with one or more of said functional groups and/or halogen(s);
wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO$ $(CH_2)_z$, $(CH_2)_xNR(CH_2)_z$ or $(CH_2)_xS(CH_2)_z$, wherein x is 1 to 6, z is 1 to 6, and w is 2 to 6;
and wherein Ar is optionally further substituted with alkyl(s) and/or halogen(s).

17. The carbon black product of claim 15, wherein:
Ar is an aromatic or heteroaromatic radical;
y is an integer from 1 to the total number of —CH radicals present in the aromatic radical; and
A, which can be the same or different when y is greater than 1, is independently a substituent on the aromatic radical selected from:
  a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, N=NR, $N_2X^-$, $NR_3^+X^-$, $PR_3^+X^-$, $S_kR$, $SO_2NRR'$, $SO_2SR$, SNRR', $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and
  a linear, branched, aromatic, or cyclic hydrocarbon radical, substituted with one or more of said functional groups and/or halogen(s);
wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO$ $(CH_2)_z$, $(CH_2)_xNR(CH_2)_z$ or $(CH_2)_xS(CH_2)_z$, wherein x is 1 to 6, z is 1 to 6, and w is 2 to 6;
and wherein Ar is optionally further substituted with alkyl(s) and/or halogen(s).

18. The carbon black product of claim 15, wherein:
Ar is an aromatic or heteroaromatic radical;
y is an integer from 1 to the total number of —CH radicals present in the aromatic radical; and
A, which can be the same or different when y is greater than 1, is a functional group selected from the group consisting of a branched or unbranched $C_1$–$C_{20}$ substituted alkyl, branched or unbranched $C_3$–$C_{20}$ unsubstituted alkyl, unsubstituted or substituted alkenyl, unsubstituted or substituted alkynyl, unsubstituted or substituted heteroaryl, unsubstituted or substituted alkylaryl, and unsubstituted or substituted arylalkyl.

19. The carbon black product of claim 15, wherein:
Ar is an aromatic or heteroaromatic radical;
y is an integer from 1 to the total number of —CH radicals present in the aromatic radical; and
A, which can be the same or different when y is greater than 1, is independently a substituent on the aromatic radical selected from:
  a functional group selected from the group consisting of OR, COR, COOR, OCOR, a carboxylate salt, CN, $NR_2$, $SO_3H$, a sulfonate salt, $OSO_3H$, $OSO_3^-$ salts, NR(COR), $CONR_2$, $NO_2$, $OPO_3H_2$, a monobasic or dibasic phosphate salt, $PO_3H_2$, a monobasic or dibasic phosphonate salt, N=NR, $N_2^+X^-$, $NR_3^+X^-$, $PR_3^+X^-$, $S_kR$, $SO_2NRR'$, $SO_2SR$, SNRR', $SSO_3H$, a $SSO_3^-$ salt, SNQ, $SO_2NQ$, $CO_2NQ$, S-(1,4-piperazinediyl)-SR, 2-(1,3-dithianyl), 2-(1,3-dithiolanyl), SOR, and $SO_2R$; and
  a linear, branched, aromatic, or cyclic hydrocarbon radical, substituted with one or more of said functional groups;
wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid; and Q is $(CH_2)_w$, $(CH_2)_xO$ $(CH_2)_z$, $(CH_2)_xNR(CH_2)_z$ or $(CH_2)_xS(CH_2)_z$, wherein x is 1 to 6, z is 1 to 6, and w is 2 to 6.

20. The carbon black product of claim 15, wherein:
Ar is an aromatic radical selected from the group consisting of phenyl, naphthyl anthryl, phenanthryl, biphenyl, and pyridyl;
y is an integer from 1 to the total number of —CH radicals present in the aromatic radical; and
A, which can be the same or different when y is greater than 1, is independently a substituent on the aromatic radical selected from:
  a functional group selected from the group consisting of OR, COR, COOR, OCOR, COOLi, COONa, COOK, $COO^-NR_4^+$, CN, $NR_2$, $SO_3H$, $SO_3Li$, $SO_3Na$, $SO_3K$, $SO_3^-$ $NR_4^+$, NR(COR), $CONR_2$, $NO_2$, $PO_3H_2$, $PO_3HNa$, $PO_3Na_2$, N=NR, $N_2^+X^-$, $NR_3^+X^-$, $PR_3^+X^-$, $S_kR$, SOR, and $SO_2R$; and
  a linear, branched, aromatic, or cyclic hydrocarbon radical, substituted with one or more of said functional groups;
wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; $X^-$ is a halide or an anion derived from a mineral or organic acid.

21. The carbon black product of claim 15, wherein:

Ar is an aromatic radical selected from the group consisting of phenyl, benzothiazolyl, and benzothiadiazolyl;

y is an integer from 1 to the total number of —CH radicals present in the aromatic radical; and A, which can be the same or different when y is greater than 1, is independently a substituent on the aromatic radical selected from:
a functional group selected from the group consisting of $S_kR$, $SSO_3H$, $SO_2NRR'$, $SO_2SR$, $SNRR'$, $SNQ$, $SO_2NQ$, $CO_2NQ$, S-(1,4-piperazinediyl)-SR, 2-(1,3-dithianyl), 2-(1,3-dithiolanyl); and
a linear, branched, aromatic, or cyclic hydrocarbon radical, substituted with one or more of said functional groups;

wherein R and R', which can be the same or different, are hydrogen; branched or unbranched $C_1$–$C_{20}$ unsubstituted or substituted alkyl, alkenyl, or alkynyl; unsubstituted or substituted aryl; unsubstituted or substituted heteroaryl; unsubstituted or substituted alkylaryl; or unsubstituted or substituted arylalkyl; k is an integer from 1 to 8; and Q is $(CH_2)_w$, $(CH_2)_x(CH_2)_z$, $(CH_2)_x NR(CH_2)_z$ or $(CH_2)_xS(CH_2)_z$, wherein X is 1 to 6, z is 1 to 6, and w is 2 to 6.

22. A carbon black product comprising a carbon black and at least one organic group having a) an aromatic group and b) a cationic group, wherein at least one aromatic group of the organic group is attached to the carbon black and wherein the organic group is a N-substituted pyridinium group.

23. A carbon black product comprising a carbon black and at least one organic group ArOH attached to the carbon black, wherein Ar is arylene or heteroarylene.

24. A carbon black product comprising a carbon black and at least one organic group $Ar(CH_2)_qS_k(CH_2)_rAr'$ attached to the carbon black, wherein Ar and Ar' are arylene, k is an integer from 1 to 8, and q and rare 0.

25. A carbon black product comprising a carbon black and at least one organic group $Ar(CH_2)_qS_k(CH_2)_rAr'$ attached to the carbon black, wherein Ar and Ar' are heteroarylene, k is an integer from 1 to 8, and q and r are 0.

26. A process for preparing a carbon black product having an organic group attached to the carbon black comprising the step of:

reacting at least one diazonium salt with a carbon black in a protic reaction medium, wherein the diazonium salt is generated in situ from the primary amine $H_2NArS_kArNH_2$ wherein Ar is benzothiazolylene and k is 2.

27. A plastic composition comprising a plastic and the carbon product according to claim 1.

28. A paper product comprising paper pulp and the carbon product according to claim 1.

29. A fiber or textile composition comprising a fiber or textile and the carbon black product according to claim 1.

30. An elastomer composition obtained by mixing at least one elastomer and the carbon black product according to claim 1.

31. The elastomer composition of claim 30, wherein the elastomer comprises at least one synthetic or natural polymer of 1,3-butadiene, styrene, isoprene, isobutylene, 2,3-dimethyl-1,3-butadiene, acrylonitrile, ethylene, or propylene.

32. The elastomer composition of claim 31, further comprising at least one additive selected from the group consisting of: a curing agent, a coupling agent, a processing aid, an oil extender, and an antioxidant.

33. A cured elastomer composition obtained by curing the elastomer composition of claim 30.

34. A rubber composition obtained by mixing a rubber and the carbon black product according to claim 1.

35. The rubber composition of claim 34, wherein the rubber comprises a natural rubber, a synthetic rubber, or mixtures or a natural and synthetic rubber.

36. The rubber composition of claim 35, wherein the rubber is selected from the group consisting of: copolymers of from about 10 to about 70 percent by weight of styrene and from about 90 to about 30 percent by weight of butadiene, polymers of conjugated dienes, and copolymers of conjugated dienes with ethylenic group-containing monomers.

37. The rubber composition of claim 36, wherein the rubber is a rubber selected from the group consisting of: polybutadiene, polyisoprene, polychloroprene, and poly (styrene-butadiene).

38. The rubber composition of claim 37, further comprising at least one additive selected from the group consisting of: a curing agent, a coupling agent, a processing aid, an oil extender, and an antioxidant.

39. A cured rubber composition obtained by curing the rubber composition of claim 34.

40. A tire or tire component comprising the elastomer composition of claim 30.

41. A tire or tire component comprising the rubber composition of claim 34.

42. A method of decreasing the tan delta max at 70 deg C. of an elastomer composition comprising the step of combining an elastomer with at least one carbon black product of claim 1.

43. The method of claim 42, further comprising forming the elastomer composition into a tire or tire component.

44. A method of increasing the abrasion resistance of an elastomer composition comprising the step of combining an elastomer with at least one carbon black product of claim 1.

45. The method of claim 44, further comprising forming the elastomer composition into a tire or tire component.

* * * * *